(12) United States Patent
Archetti et al.

(10) Patent No.: US 9,580,653 B2
(45) Date of Patent: Feb. 28, 2017

(54) LIQUID-CRYSTALLINE MEDIUM

(71) Applicant: Merck Patent GmbH, Darmstadt (DE)

(72) Inventors: Graziano Archetti, Darmstadt (DE); Andreas Taugerbeck, Darmstadt (DE); Izumi Saito, Darmstadt (DE)

(73) Assignee: Merck Patent GmbH, Darmstadt (DE)

( * ) Notice: Subject to any disclaimer, the term of this patent is extended or adjusted under 35 U.S.C. 154(b) by 0 days.

(21) Appl. No.: 14/650,442

(22) PCT Filed: Nov. 14, 2013

(86) PCT No.: PCT/EP2013/003424
§ 371 (c)(1),
(2) Date: Jun. 8, 2015

(87) PCT Pub. No.: WO2014/090362
PCT Pub. Date: Jun. 19, 2014

(65) Prior Publication Data
US 2015/0322342 A1    Nov. 12, 2015

(30) Foreign Application Priority Data

Dec. 12, 2012    (EP) .................................. 12008302

(51) Int. Cl.
| | | |
|---|---|---|
| *G02F 1/1333* | (2006.01) | |
| *C09K 19/32* | (2006.01) | |
| *C09K 19/30* | (2006.01) | |
| *C09K 19/04* | (2006.01) | |
| *C09K 19/12* | (2006.01) | |
| *C09K 19/56* | (2006.01) | |

(52) U.S. Cl.
CPC ............. *C09K 19/32* (2013.01); *C09K 19/04* (2013.01); *C09K 19/0403* (2013.01); *C09K 19/12* (2013.01); *C09K 19/3003* (2013.01); *C09K 19/3098* (2013.01); *C09K 19/56* (2013.01); *C09K 2019/0444* (2013.01); *C09K 2019/0448* (2013.01); *C09K 2019/122* (2013.01); *C09K 2019/301* (2013.01); *C09K 2019/3004* (2013.01); *C09K 2019/3009* (2013.01); *C09K 2019/3016* (2013.01)

(58) Field of Classification Search
CPC  C09K 19/32; C09K 19/3003; C09K 19/3098; C09K 19/04; C09K 19/0403; C09K 19/12; C09K 19/56; C09K 2019/3004; C09K 2019/3009; C09K 2019/301; C09K 2019/3016; C09K 2019/0444; C09K 2019/0448; C09K 2019/122; G02F 1/1333
USPC ............................ 252/299.01, 299.6, 299.62
See application file for complete search history.

(56) References Cited

U.S. PATENT DOCUMENTS

| | | |
|---|---|---|
| 6,861,107 B2 | 3/2005 | Klasen-Memmer et al. |
| 2004/0011996 A1 | 1/2004 | Klasen-Memmer et al. |
| 2013/0182202 A1 | 7/2013 | Graziano et al. |
| 2015/0252265 A1* | 9/2015 | Archetti ............. C09K 19/3402 349/130 |

FOREIGN PATENT DOCUMENTS

| | | | |
|---|---|---|---|
| DE | 10 2011 108 708 A1 | 3/2012 | |
| JP | 4-18047 | * 1/1992 | ............. C09K 19/20 |
| WO | 92/13928 A1 | 8/1992 | |
| WO | 9213828 A1 | 8/1992 | |
| WO | 2012038026 A1 | 3/2012 | |

OTHER PUBLICATIONS

International Search Report from PCT/EP2013/003424 dated Feb. 21, 2014.
Brian D. Palmer, et al. "Synthesis and Structure-Activity Studies of Biphenyl Analogues of the Tuberculosis Drug (6S)-2-Nitro-6{[4-(trifluoromethoxy)benzyl]oxy}-6,7-dihydro-5    H-imidazo[2,1-b][1,3]oxazine ) (PA-824)" Journal of Medicinal Chemistry, (2010), vol. 53, No. 1, pp. 282-294.
V.K. Ol'Khovik et al. "Synthesis and properties of luminophores derived from fluorinated biphenyls" Russian Journal of Organic Chemistry, (2008), vol. 44, No. 8, pp. 1172-1179.
Chinese Office Action dated Jun. 23, 2016, issued in corresponding Chinese Application No. 201380064393.6, 9 pages.
English translation Abstract of WO2012038026A1 published Mar. 29, 2012 (1 page).
English translation Abstract of WO9213828A1 published Aug. 20, 1992 (1 page).

* cited by examiner

*Primary Examiner* — Geraldina Visconti
(74) *Attorney, Agent, or Firm* — Millen White Zelano and Branigan, PC; John Sopp; Anthony Zelano

(57) ABSTRACT

The invention relates to the compounds of the formula I and to a liquid-crystalline medium based on a mixture of polar compounds which contains at least one compound of the formula I

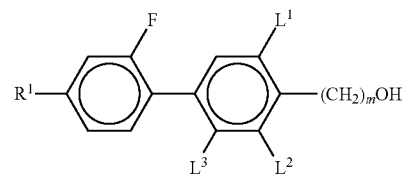

in which
$R^1$, $L^1$, $L^2$ and $L^3$ and m have the meanings indicated in claim 1
and to the use of the LC mixtures for an active-matrix display, in particular based on the VA, PSA and PS-VA effect.

20 Claims, No Drawings

LIQUID-CRYSTALLINE MEDIUM

The invention relates to a liquid-crystalline medium which comprises at least one self-aligning additive especially for VA- and PS-VA applications.

The self-aligning additives are selected from the compounds of the formula I

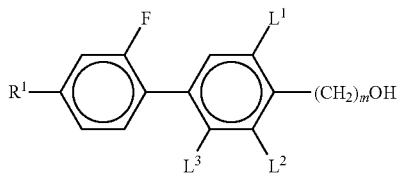

in which
R[1] denotes an alkyl or alkoxy radical having 1 to 15 C atoms, where, in addition, one or more $CH_2$ groups in these radicals may each be replaced, independently of one another, by —C≡C—, —$CF_2$O—, —CH=CH—,

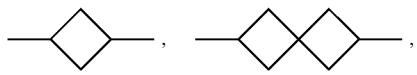

—O—, —CO—O—, —O—CO— in such a way that O atoms are not linked directly to one another, and in which, in addition, one or more H atoms may be replaced by halogen,
$L^1$, $L^2$ and $L^3$ each, independently of one another, denote H, F, Cl, $CF_3$, $CHF_2$ or alkyl with 1-5 carbon atoms, preferably F or alkyl, and
m denotes 0, 1, 2, 3, 4, 5 or 6.

Media of this type can be used, in particular, for electro-optical displays having active-matrix addressing based on the ECB effect.

The principle of electrically controlled birefringence, the ECB effect or also DAP (deformation of aligned phases) effect, was described for the first time in 1971 (M. F. Schieckel and K. Fahrenschon, "Deformation of nematic liquid crystals with vertical orientation in electrical fields", Appl. Phys. Lett. 19 (1971), 3912). This was followed by papers by J. F. Kahn (Appl. Phys. Lett. 20 (1972), 1193) and G. Labrunie and J. Robert (J. Appl. Phys. 44 (1973), 4869).

The papers by J. Robert and F. Clerc (SID 80 Digest Techn. Papers (1980), 30), J. Duchene (Displays 7 (1986), 3) and H. Schad (SID 82 Digest Techn. Papers (1982), 244) showed that liquid-crystalline phases must have high values for the ratio of the elastic constants $K_3/K_1$, high values for the optical anisotropy Δn and values for the dielectric anisotropy of Δε≤−0.5 in order to be suitable for use in high-information display elements based on the ECB effect. Electro-optical display elements based on the ECB effect have a homeotropic edge alignment (VA technology=vertically aligned).

Displays which use the ECB effect, as so-called VAN (vertically aligned nematic) displays, for example in the MVA (multi-domain vertical alignment, for example: Yoshide, H. et al., paper 3.1: "MVA LCD for Notebook or Mobile PCs . . . ", SID 2004 International Symposium, Digest of Technical Papers, XXXV, Book I, pp. 6 to 9, and Liu, C. T. et al., paper 15.1: "A 46-inch TFT-LCD HDTV Technology . . . ", SID 2004 International Symposium, Digest of Technical Papers, XXXV, Book II, pp. 750 to 753), PVA (patterned vertical alignment, for example: Kim, Sang Soo, paper 15.4: "Super PVA Sets New State-of-the-Art for LCD-TV", SID 2004 International Symposium, Digest of Technical Papers, XXXV, Book II, pp. 760 to 763), ASV (advanced super view, for example: Shigeta, Mitzuhiro and Fukuoka, Hirofumi, paper 15.2: "Development of High Quality LCDTV", SID 2004 International Symposium, Digest of Technical Papers, XXXV, Book II, pp. 754 to 757) modes, have established themselves as one of the three more recent types of liquid-crystal display that are currently the most important, in particular for television applications, besides IPS (in-plane switching) displays (for example: Yeo, S. D., paper 15.3: "An LC Display for the TV Application", SID 2004 International Symposium, Digest of Technical Papers, XXXV, Book II, pp. 758 & 759) and the long-known TN (twisted nematic) displays. The technologies are compared in general form, for example, in Souk, Jun, SID Seminar 2004, seminar M-6: "Recent Advances in LCD Technology", Seminar Lecture Notes, M-6/1 to M-6/26, and Miller, Ian, SID Seminar 2004, seminar M-7: "LCD-Television", Seminar Lecture Notes, M-7/1 to M-7/32. Although the response times of modern ECB displays have already been significantly improved by addressing methods with overdrive, for example: Kim, Hyeon Kyeong et al., paper 9.1: "A 57-in. Wide UXGA TFT-LCD for HDTV Application", SID 2004 International Symposium, Digest of Technical Papers, XXXV, Book I, pp. 106 to 109, the achievement of video-compatible response times, in particular on switching of grey shades, is still a problem which has not yet been satisfactorily solved.

Industrial application of this effect in electro-optical display elements requires LC phases, which have to satisfy a multiplicity of requirements. Particularly important here are chemical resistance to moisture, air and physical influences, such as heat, infrared, visible and ultraviolet radiation and direct and alternating electric fields.

Furthermore, industrially usable LC phases are required to have a liquid-crystalline mesophase in a suitable temperature range and low viscosity.

None of the hitherto-disclosed series of compounds having a liquid-crystalline mesophase includes a single compound which meets all these requirements. Mixtures of two to 25, preferably three to 18, compounds are therefore generally prepared in order to obtain substances which can be used as LC phases. However, it has not been possible to prepare optimum phases easily in this way since no liquid-crystal materials having significantly negative dielectric anisotropy and adequate long-term stability were hitherto available.

Matrix liquid-crystal displays (MLC displays) are known. Non-linear elements which can be used for individual switching of the individual pixels are, for example, active elements (i.e. transistors). The term "active matrix" is then used, where a distinction can be made between two types:
1. MOS (metal oxide semiconductor) transistors on a silicon wafer as substrate
2. thin-film transistors (TFTs) on a glass plate as substrate.

In the case of type 1, the electro-optical effect used is usually dynamic scattering or the guest-host effect. The use of single-crystal silicon as substrate material restricts the display size, since even modular assembly of various part-displays results in problems at the joints.

In the case of the more promising type 2, which is preferred, the electro-optical effect used is usually the TN effect.

A distinction is made between two technologies: TFTs comprising compound semiconductors, such as, for example, CdSe, or TFTs based on polycrystalline or amorphous silicon. The latter technology is being worked on intensively worldwide.

The TFT matrix is applied to the inside of one glass plate of the display, while the other glass plate carries the transparent counterelectrode on its inside. Compared with the size of the pixel electrode, the TFT is very small and has virtually no adverse effect on the image. This technology can also be extended to fully colour-capable displays, in which a mosaic of red, green and blue filters is arranged in such a way that a filter element is opposite each switchable pixel.

The term MLC displays here covers any matrix display with integrated non-linear elements, i.e. besides the active matrix, also displays with passive elements, such as varistors or diodes (MIM=metal-insulator-metal).

MLC displays of this type are particularly suitable for TV applications (for example pocket TVs) or for high-information displays in automobile or air-craft construction. Besides problems regarding the angle dependence of the contrast and the response times, difficulties also arise in MLC displays due to insufficiently high specific resistance of the liquid-crystal mixtures [TOGASHI, S., SEKIGUCHI, K., TANABE, H., YAMAMOTO, E., SORI-MACHI, K., TAJIMA, E., WATANABE, H., SHIMIZU, H., Proc. Eurodisplay 84, September 1984: A 210-288 Matrix LCD Controlled by Double Stage Diode Rings, pp. 141 ff., Paris; STROMER, M., Proc. Eurodisplay 84, September 1984: Design of Thin Film Transistors for Matrix Addressing of Television Liquid Crystal Displays, pp. 145 ff., Paris]. With decreasing resistance, the contrast of an MLC display deteriorates. Since the specific resistance of the liquid-crystal mixture generally drops over the life of an MLC display owing to interaction with the inside surfaces of the display, a high (initial) resistance is very important for displays that have to have acceptable resistance values over a long operating period.

There thus continues to be a great demand for MLC displays having very high specific resistance at the same time as a large working-temperature range, short response times and a low threshold voltage with the aid of which various grey shades can be produced.

The disadvantage of the frequently-used MLC-TN displays is due to their comparatively low contrast, the relatively high viewing-angle dependence and the difficulty of generating grey shades in these displays.

VA displays have significantly better viewing-angle dependencies and are therefore principally used for televisions and monitors. However, there continues to be a need here to improve the response times, in particular with respect to the use of televisions having frame rates (image change frequency/repetition rates) of greater than 60 Hz. At the same time, however, the properties, such as, for example, the low-temperature stability, must not be impaired.

The reliability of liquid crystal (LC) mixtures is one of the major issues in today's LCD industry. A main aspect is the stability of the liquid crystal molecules towards the light emitted from the backlight unit of the LCD. Light induced reactions of the LC material can cause display defects known as image sticking. This strongly reduces the lifetime of the LCD and is one of the main reliability criterions in LCD industry.

For example, liquid crystal mixtures containing LC materials with alkenyl-moieties often show some kind of degradation during long term backlight irradiation. This degradation can be observed by measuring the Voltage Holding Ratio (VHR) of the LC mixtures which have been objected to backlight irradiation for a defined time period.

Also other kind of irradiation, like the UV-light, necessary for the curing of reactive mesogens (RMs), especially for the PS-VA technology, may lead to a reduction of the VHR values of a test-cell or of a display. The use of cut-filters in order to reduce this effect is of limited applicability. By increasing the wavelength of the curing-light the VHR is improved, but at the same time the reaction speed of the RMs is reduced and this effect does not fit with the requirements of the LCD industry.

Thus, a solution is needed by which the light induced degradation of a LC mixture is strongly reduced. Especially, in terms of LCD performance, there is an interest to use liquid-crystalline compounds containing an alkenyl side chain in order to achieve faster switching times and hence better moving picture performances. Especially since the trend for LCD TC clearly is to go to higher frame rates, e.g. 200 Hz or higher, also including 3D applications.

The invention thus has an object of providing self-aligning additives and liquid-crystal mixtures, in particular for monitor and TV applications, which are based on the ECB effect especially for VA, PSA and PS-VA applications, which do not have the above-mentioned disadvantages or only do so to a reduced extent. In particular, it must be ensured for monitors and televisions that they also operate at extremely high and extremely low temperatures and have short response times and at the same time have improved reliability behaviour, in particular have no or significantly reduced image sticking after long operating times.

In conventional VA-displays a polyimide (PI) layer is needed for inducing the required homeotropic orientation of the LC. Besides of the significant costs due to its production, unfavourable interaction between PI and LC often leads to a reduction of the electric resistance of the VA-display. The number of useful LC molecules is thus significantly reduced, at the expenses of the overall switching performances (e.g. higher switching times) of the display. Getting rid of PI is thus desirable, while providing for the required homeotropic orientation.

It has now been found that these and other objects can be achieved if LC media according to the invention are used in LC displays, especially in displays without any orientation layer (polyimide layer).

The invention thus relates to the compounds of the formula I and to a liquid crystalline medium, preferably having a negative dielectrically anisotropy ($\Delta\epsilon$), with improved degradation which contains at least one compound of the formula I.

Such kind of mixtures are highly suitable for the use in displays which do not contain any orientation layer. Liquid crystal display devices, in general have a structure in which a liquid crystal mixture is sealed between a pair of insulating substrates, such as glass substrates, in such a manner that the liquid crystal molecules thereof are orientated in a predetermined direction, and an orientation film is formed on the respective substrates on the side of the liquid crystal mixture. As a material of an orientation film, there is usually used a polyimide (PI). Homeotropic orientation of the LC molecules is especially necessary for LC modes like PVA, PS-VA, VA, etc., and can be achieved by the use of self-aligning additives, without the need of an orientation film. The mixtures according to the invention show an improved light and temperature stability compared to LC mixtures without any self-aligning additives.

In a preferred embodiment, the LC mixture according to the invention contains at least one self-aligning additive and at least one polymerisable compound (also called reactive mesogen (RM)). Such kind of LC mixtures are highly suitable for PI-free PS-VA displays. The alignment of the LC molecules is induced by the self-aligning additives and the induced orientation (pre-tilt) may be additionally tuned or stabilized by the polymerization of the RMs, under conditions suitable for a multidomain switching. By the tuning of the UV-curing conditions it is possible in one single step to improve simultaneously SWT and contrast ratio. Reliability of the mixture (VHR) after light stress (both UV-curing and Backlight (BLT)) is improved compared to LC mixtures without any self-aligning additive filled in a "classic" PI-coated test cell. Furthermore, the UV-curing may be performed by using cut-filters at a wavelength by which the polymerization of the RMs is still reasonably fast and the VHR values are on an acceptable level.

The mixtures according to the invention preferably exhibit very broad nematic phase ranges having clearing points ≥70° C., preferably ≥75° C., in particular ≥80° C., very favourable values for the capacitive threshold, relatively high values for the holding ratio and at the same time very good low-temperature stabilities at −20° C. and −30° C., as well as very low rotational viscosities and short response times. The mixtures according to the invention are furthermore distinguished by the fact that, in addition to the improvement in the rotational viscosity $\gamma_1$, relatively high values of the elastic constant $K_{33}$ for improving the response times can be observed.

Some preferred embodiments of the mixtures according to the invention are indicated below.

In the compounds of the formulae I $R^1$ preferably denotes straight-chain alkyl, in particular $CH_3$, $C_2H_5$, n-$C_3H_7$, n-$C_4H_9$, n-$C_5H_{11}$, n-$C_6H_{13}$, furthermore alkenyloxy, in particular $OCH_2CH=CH_2$, $OCH_2CH=CHCH_3$, $OCH_2CH=CHC_2H_5$, alkoxy, in particular $OC_2H_5$, $OC_3H_7$, $OC_4H_9$, $OC_5H_{11}$ and $OC_6H_{13}$.

In the compounds of the formula I $L^1$, $L^2$ and $L^3$ are each independently preferably H or F or alkyl with 1-5 carbon atoms. In the compounds of the formula I $L^1$, $L^2$ and $L^3$ denotes most preferably H.

m is preferably 0 or 1.

Preferred compounds of the formula I are the compounds of the sub-formulae I-1 to I-36,

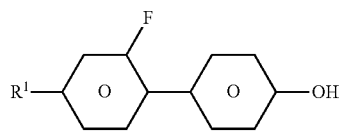
I-1

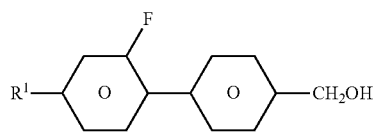
I-2

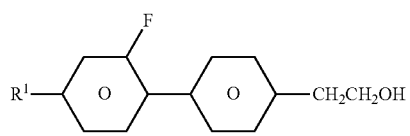
I-3

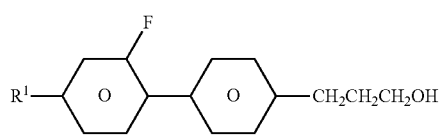
I-4

-continued

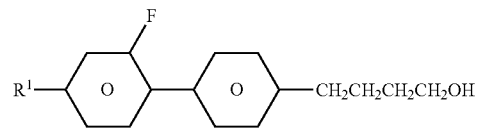
I-5

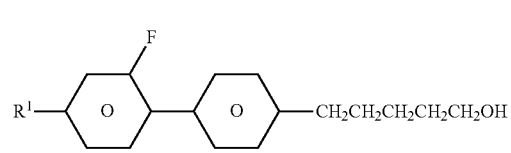
I-6

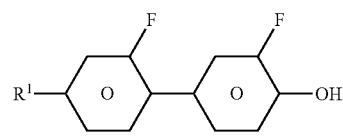
I-7

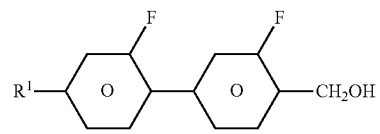
I-8

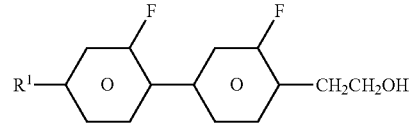
I-9

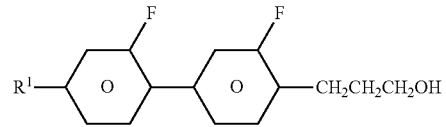
I-10

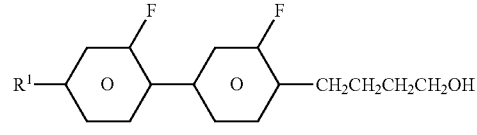
I-11

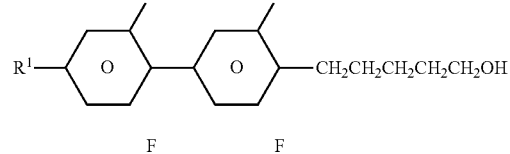
I-12

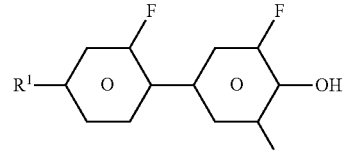
I-13

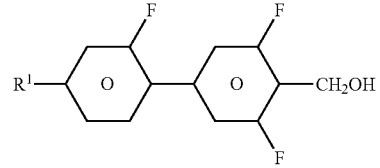
I-14

-continued
I-15
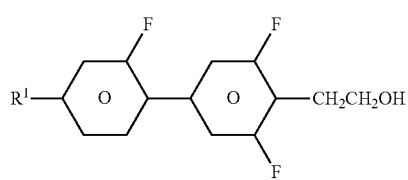
I-16
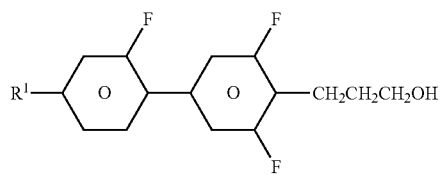
I-17
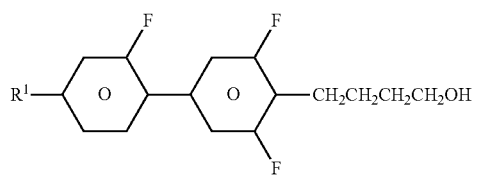
I-18
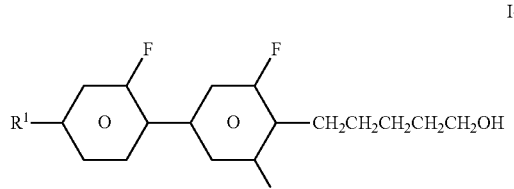
I-19
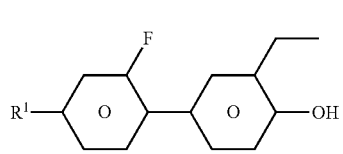
I-20
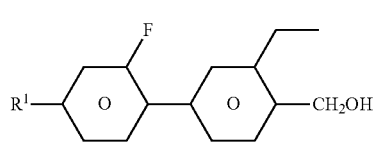
I-21
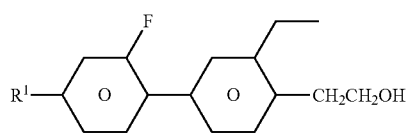
I-22
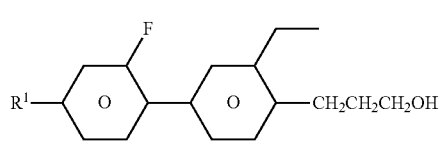
I-23
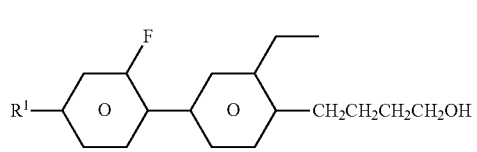
I-24
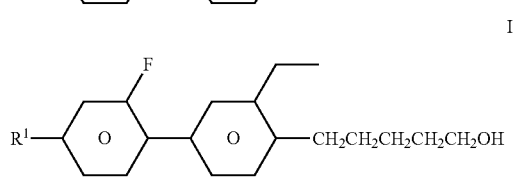
-continued
I-25
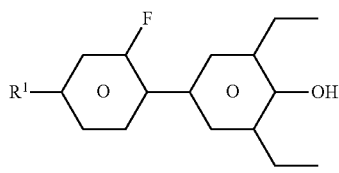
I-26
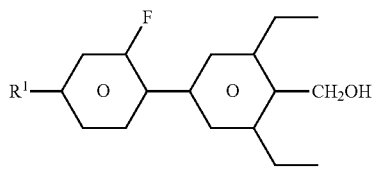
I-27
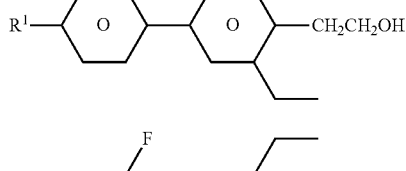
I-28
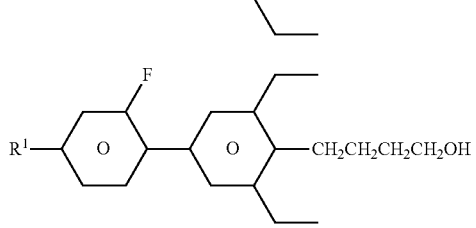
I-29
I-30
I-31
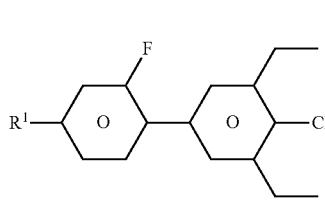
I-32
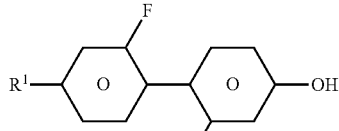
I-33
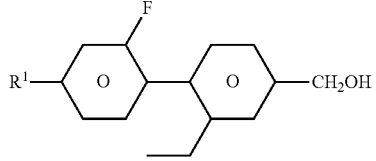

-continued

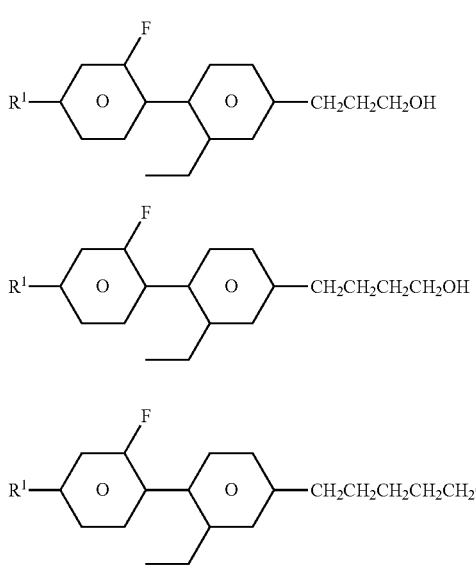

R[1] preferably denotes a straight-chain alkyl radical having 1-7 C atoms.

The mixture according to the invention very particularly contains at least one self-aligning additive selected from the following group of compounds of the sub-formulae

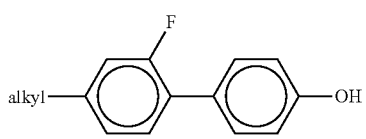

I-1a

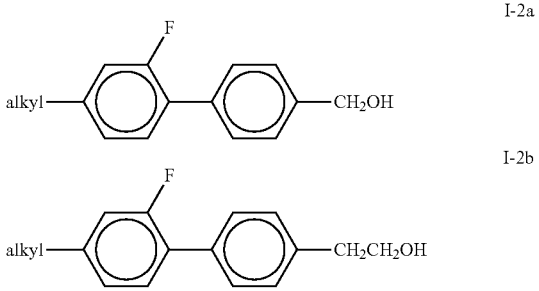

in which alkyl denotes a straight-chain alkyl radical having 1 to 7 carbon atoms, preferably $C_2H_5$, n-$C_3H_7$, n-$C_4H_9$, n-$C_5H_{11}$, n-$C_6H_{13}$ or n-$C_7H_{15}$, most preferably n-$C_3H_7$.

Especially mixtures contain a compound of the formula I-2a-1

I-2a-1

$C_3H_7$—⌬—⌬—$CH_2OH$.

The compounds of the formula I can be prepared by methods known per se, which are described in standard works for organic chemistry as such, for example, Houben-Weyl, Methoden der organischen Chemie, Thieme-Verlag, Stuttgart.

The compounds of the formula I can be prepared for example as follows:

Scheme 1

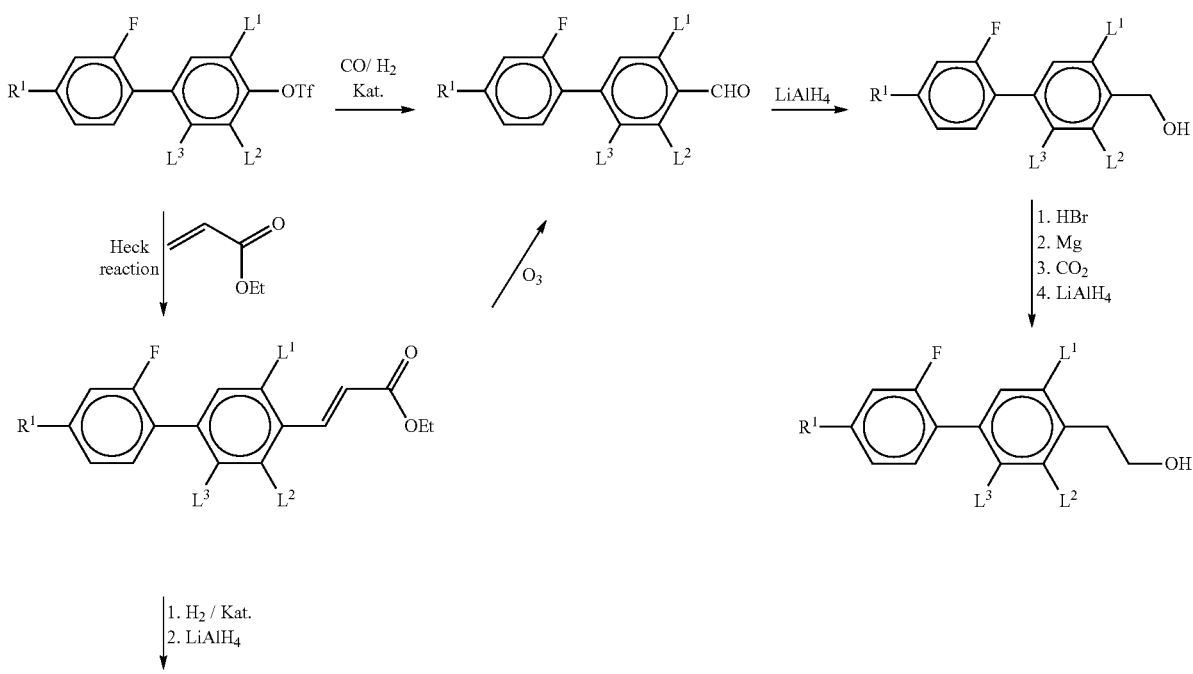

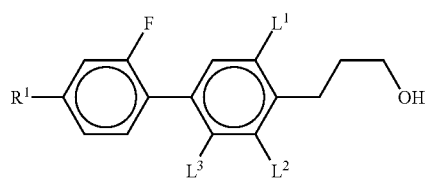

The media according to the invention preferably contain one, two, three, four or more, preferably one, self-aligning additive, preferably selected from the compounds of the formulae I-1 to I-36.

The self-aligning additives of the formula I are preferably employed in the liquid-crystalline medium in amounts of ≥0.01% by weight, preferably 0.1-10% by weight, based on the mixture as a whole. Particular preference is given to liquid-crystalline media which contain 0.1-5%, preferably 0.1-3%, by weight of one or more self-aligning additives, based on the total mixture, especially additives which are selected from the group of compounds of the formula I-1 to I-36.

The use of preferably 2.5 to 5% by weight of the compounds of the formula I results in a complete homeotropic alignment of the LC layer for conventional LC thickness (3 to 4 μm) and for the substrate materials used in the display industrie. Special surface treatment may allow to significantly reduce the amount of the compound(s) of the formula I which means less than 2.5% by weight.

Preferred embodiments of the liquid-crystalline medium according to the invention are indicated below:

a) Liquid-crystalline medium which additionally comprises one or more compounds selected from the group of the compounds of the formulae IIA, IIB and IIC:

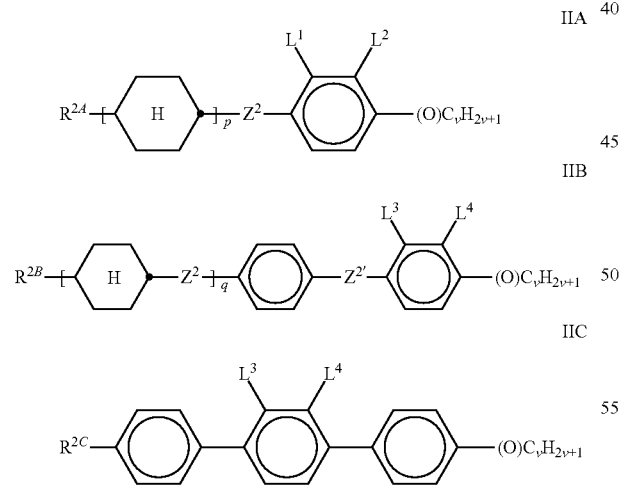

in which $R^{2A}$, $R^{2B}$ and $R^{2C}$ each, independently of one another, denote H, an alkyl radical having up to 15 C atoms which is unsubstituted, monosubstituted by CN or $CF_3$ or at least monosubstituted by halogen, where, in addition, one or more $CH_2$ groups in these radicals may be replaced by —O—, —S—,

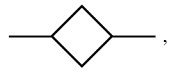

—C≡C—, —$CF_2$O—, —O$CF_2$—, —OC—O— or —O—CO— in such a way that O atoms are not linked directly to one another, $L^{1-4}$ each, independently of one another, denote F, Cl, $CF_3$ or $CHF_2$, $Z^2$ and $Z^{2'}$ each, independently of one another, denote a single bond, —$CH_2CH_2$—, —CH=CH—, —$CF_2$O—, —O$CF_2$—, —$CH_2$O—, —O$CH_2$—, —COO—, —OCO—, —$C_2F_4$—, —CF=CF—, —CH=CHCH$_2$O—, p denotes 1 or 2, q denotes 0 or 1, and v denotes 1 to 6.

In the compounds of the formulae IIA and IIB, $Z^2$ may have identical or different meanings. In the compounds of the formula IIB, $Z^2$ and $Z^{2'}$ may have identical or different meanings.

In the compounds of the formulae IIA, IIB and IIC, $R^{2A}$, $R^{2B}$ and $R^{2C}$ each preferably denote alkyl having 1-6 C atoms, in particular $CH_3$, $C_2H_5$, n-$C_3H_7$, n-$C_4H_9$, n-$C_5H_{11}$.

In the compounds of the formulae IIA and IIB, $L^1$, $L^2$, $L^3$ and $L^4$ preferably denote $L^1$=$L^2$=F and $L^3$=$L^4$=F, furthermore $L^1$=F and $L^2$=Cl, $L^1$=Cl and $L^2$=F, $L^3$=F and $L^4$=Cl, $L^3$=Cl and $L^4$=F. $Z^2$ and $Z^{2'}$ in the formulae IIA and IIB preferably each, independently of one another, denote a single bond, furthermore a —$C_2H_4$— or —$CH_2$O— bridge.

If in the formula IIB $Z^2$=—$C_2H_4$— or —$CH_2$O—, $Z^{2'}$ is preferably a single bond or, if $Z^{2'}$=—$C_2H_4$— or —$CH_2$O—, $Z^2$ is preferably a single bond. In the compounds of the formulae IIA and IIB, (O)$C_vH_{2v+1}$ preferably denotes O$C_vH_{2v+1}$, furthermore $C_vH_{2v+1}$. In the compounds of the formula IIC, (O)$C_vH_{2v+1}$ preferably denotes $C_vH_{2v+1}$. In the compounds of the formula IIC, $L^3$ and $L^4$ preferably each denote F.

Preferred compounds of the formulae IIA, IIB and IIC are indicated below:

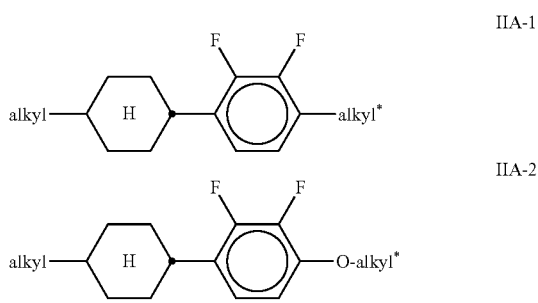

IIA-3
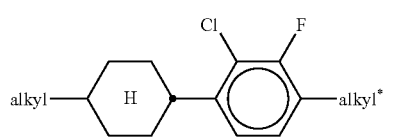
IIA-4
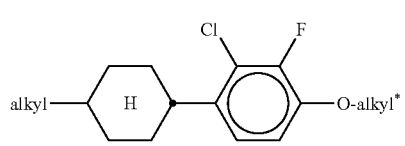
IIA-5
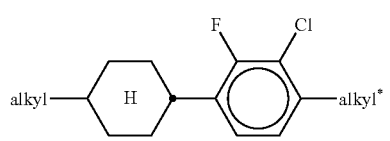
IIA-6
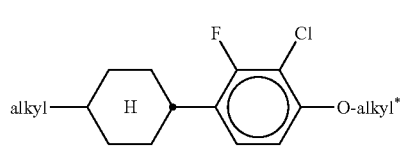
IIA-7
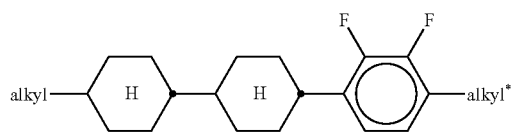
IIA-8
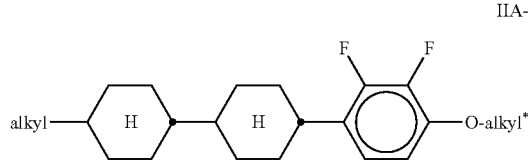
IIA-9
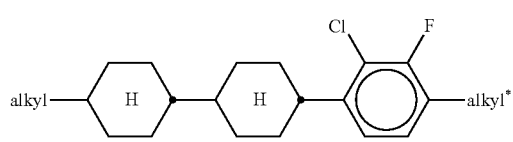
IIA-10
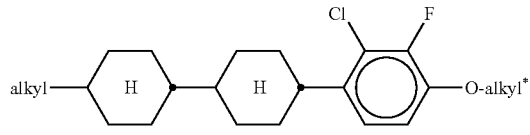
IIA-11
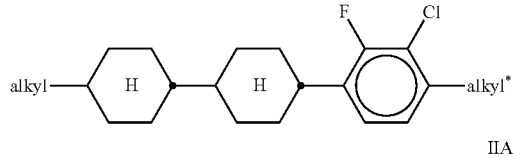
IIA-12
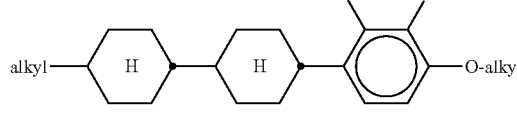
IIA-13
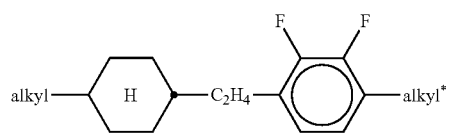
IIA-14
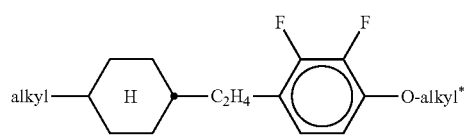
IIA-15
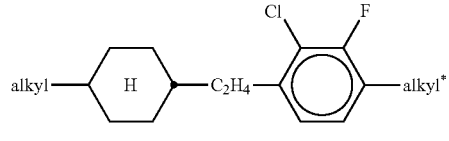
IIA-16
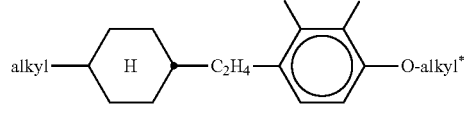
IIA-17
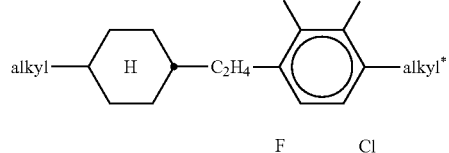
IIA-18
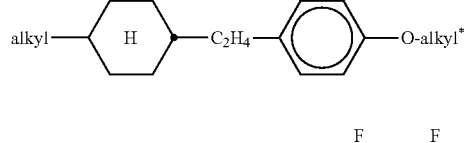
IIA-19
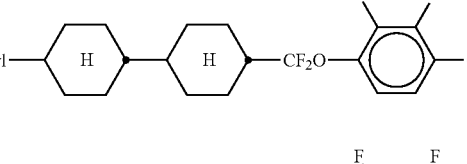
IIA-20
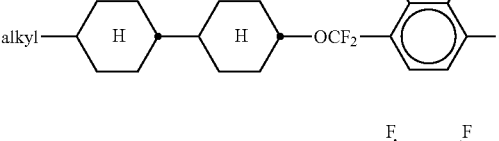
IIA-21
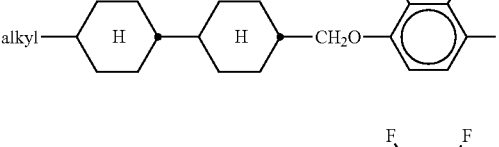
IIA-22
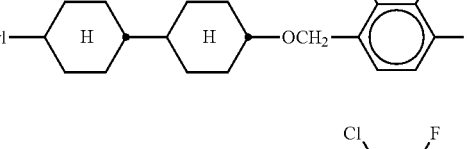
IIA-23
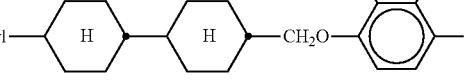

IIA-24
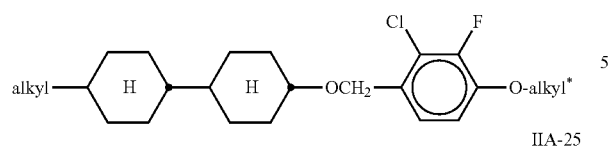
IIA-25
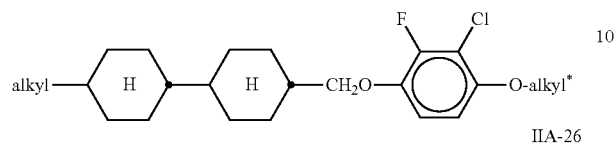
IIA-26
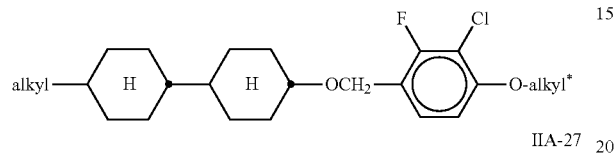
IIA-27
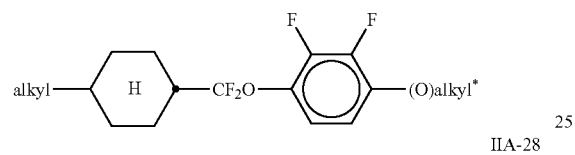
IIA-28
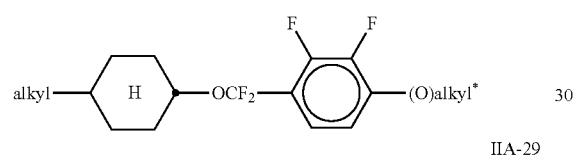
IIA-29
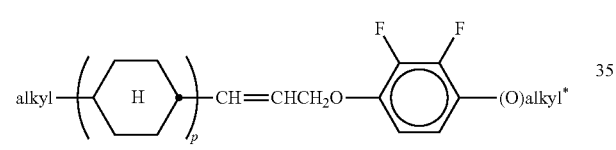
IIA-30
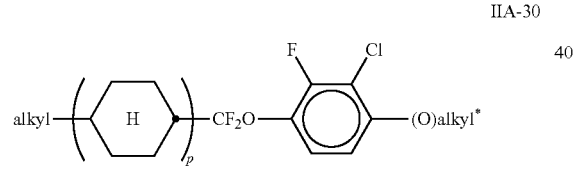
IIA-31
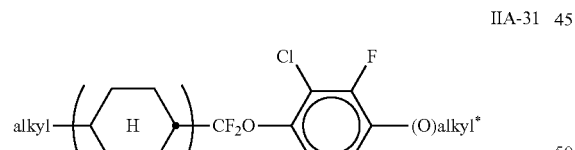
IIA-31
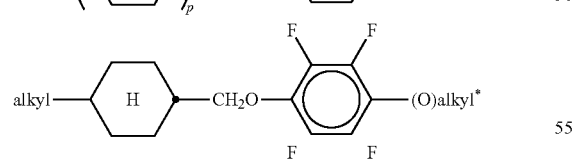
IIA-31
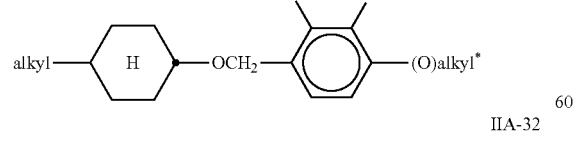
IIA-32
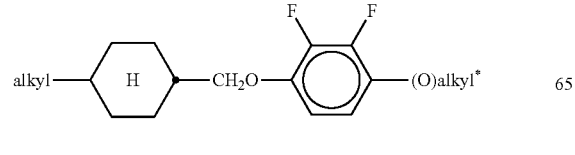
IIA-33
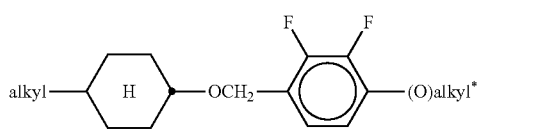
IIA-34
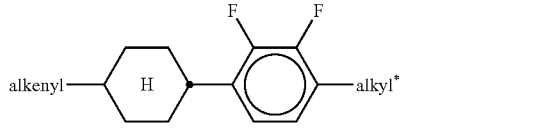
IIA-35
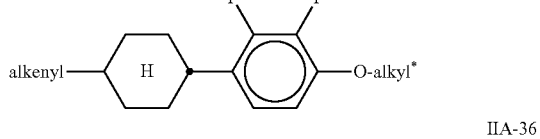
IIA-36
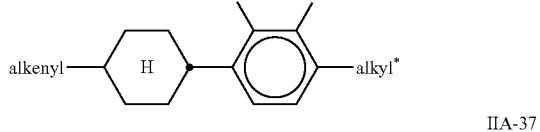
IIA-37
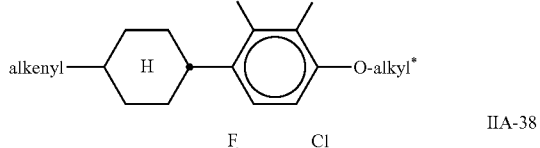
IIA-38
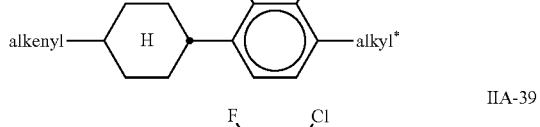
IIA-39
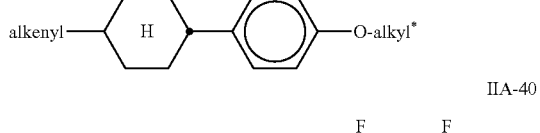
IIA-40
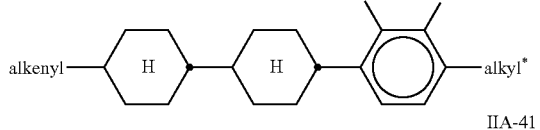
IIA-41
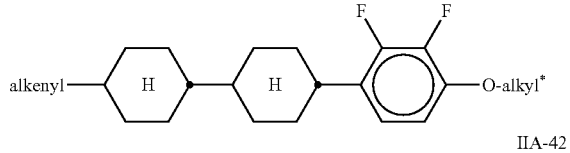
IIA-42
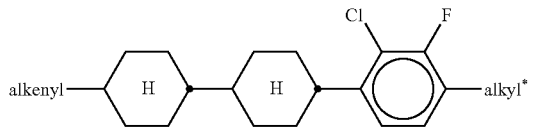
IIA-43
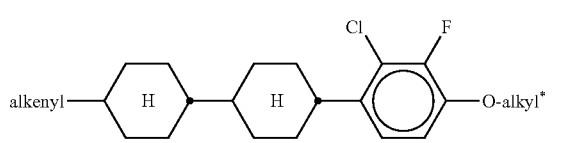

IIA-44
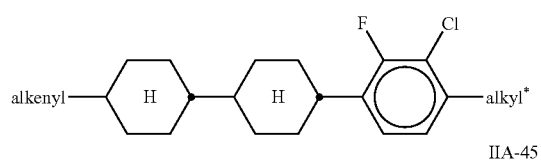
IIA-45
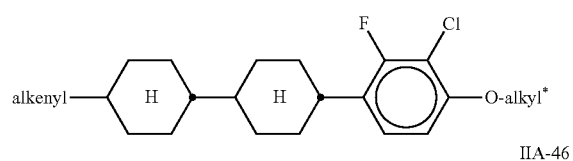
IIA-46
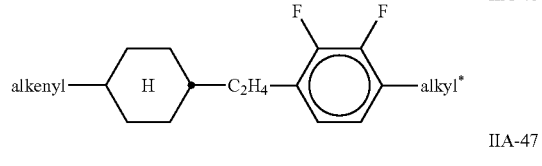
IIA-47
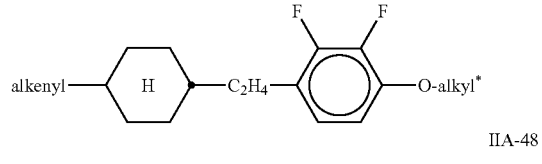
IIA-48
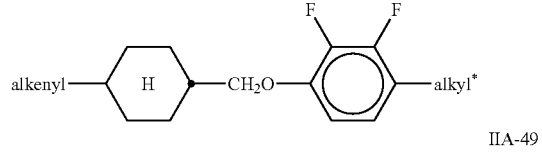
IIA-49
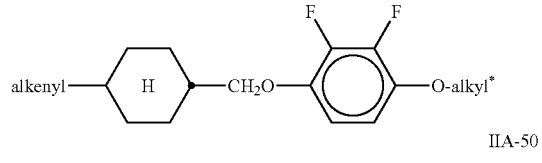
IIA-50
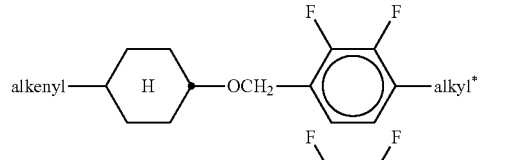
IIA-51
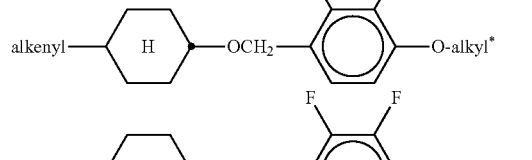
IIA-52
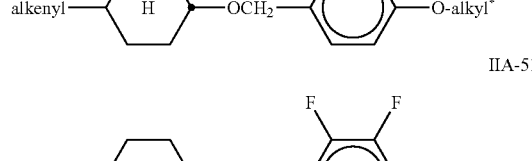
IIA-53
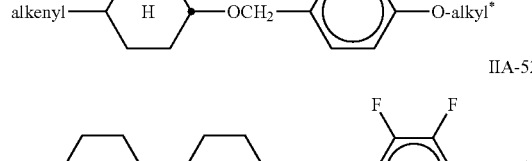
IIA-54
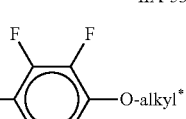
IIA-55
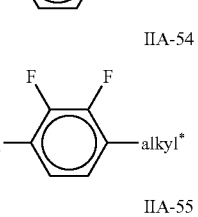
IIA-56
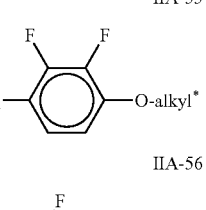
IIA-57
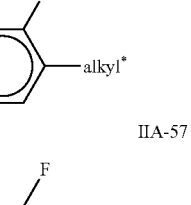
IIA-58
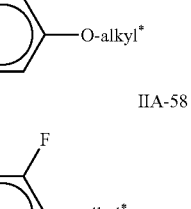
IIA-59
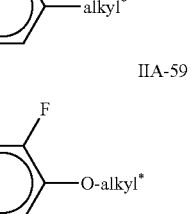
IIA-60
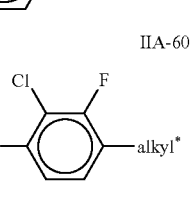
IIA-61
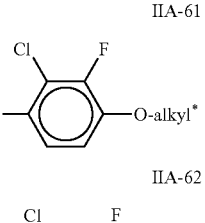
IIA-62
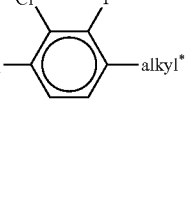

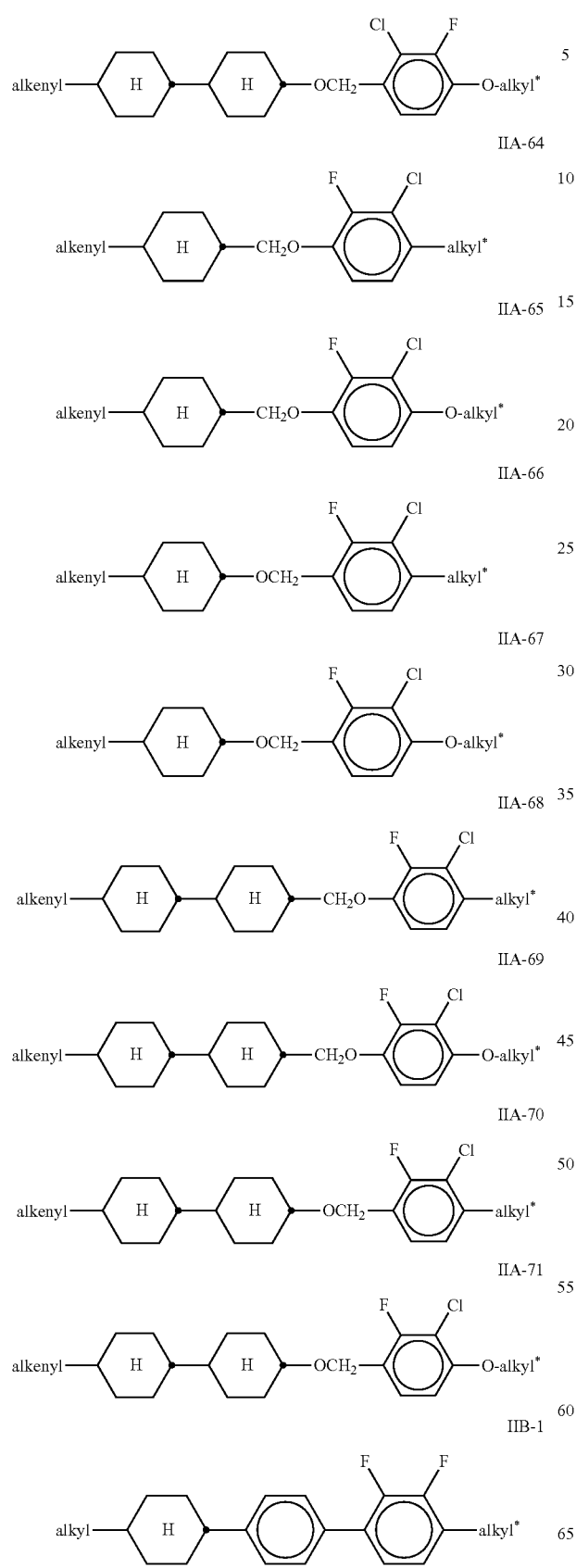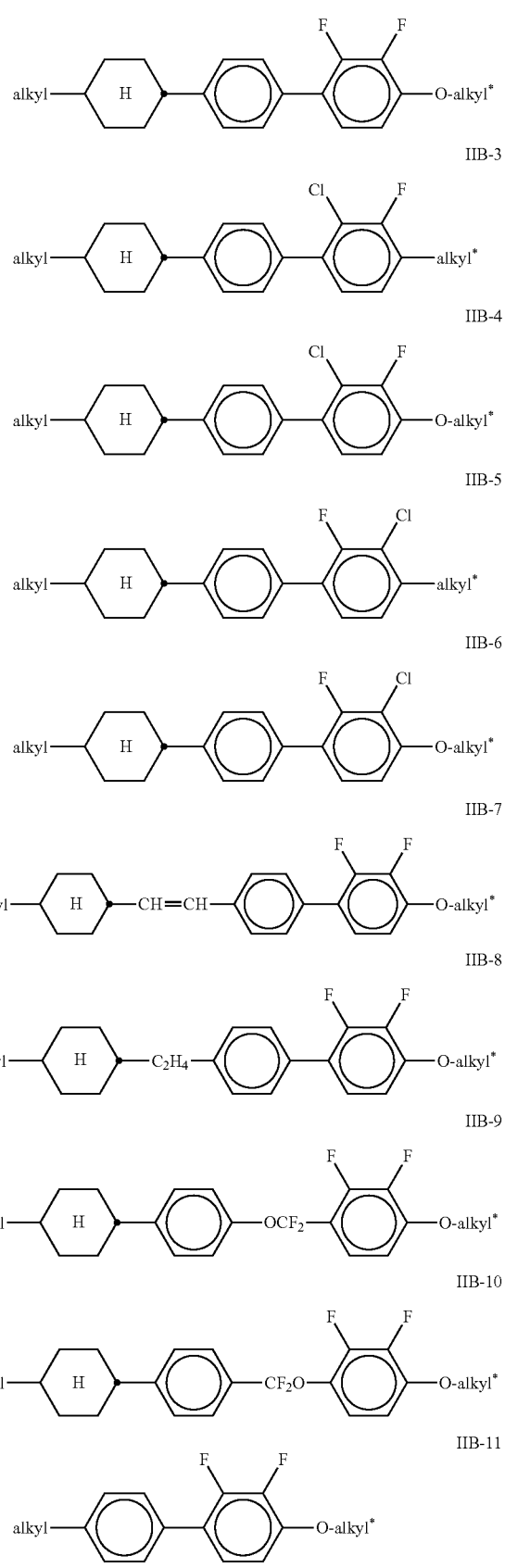

-continued

IIB-12
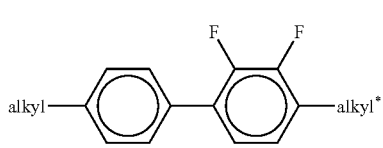

IIB-13
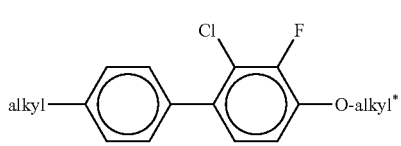

IIB-14
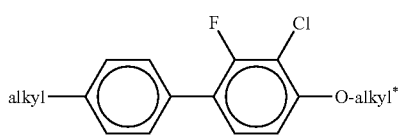

IIB-15
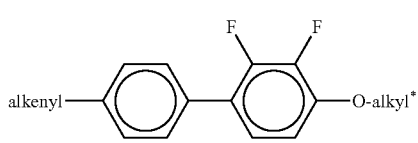

IIB-16
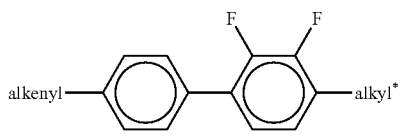

IIB-17
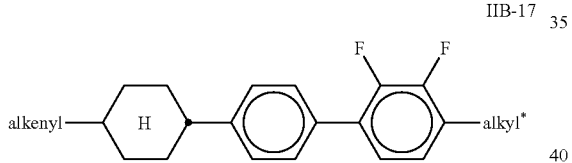

IIB-18
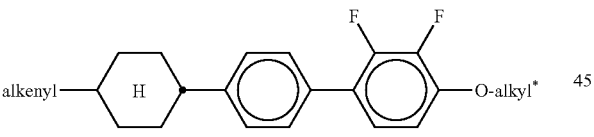

IIC-1
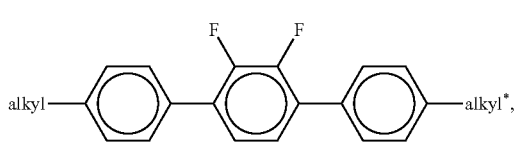

in which alkyl and alkyl* each, independently of one another, denote a straight-chain alkyl radical having 1-6 C atoms.

Particularly preferred mixtures according to the invention comprise one or more compounds of the formulae IIA-2, IIA-8, IIA-14, IIA-29, IIA-35, IIB-2, IIB-11, IIB-16 and IIC-1.

The proportion of compounds of the formulae IIA and/or IIB in the mixture as a whole is preferably at least 20% by weight.

Particularly preferred media according to the invention comprise at least one compound of the formula IIC-1,

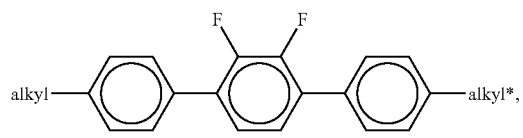

in which alkyl and alkyl* have the meanings indicated above, preferably in amounts of ≥3% by weight, in particular ≥5% by weight and particularly preferably 5-25% by weight.

b) Liquid-crystalline medium which additionally comprises one or more compounds of the formula III,

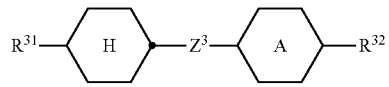

III in which

R$^{31}$ and R$^{32}$ each, independently of one another, denote a straight-chain alkyl, alkoxyalkyl or alkoxy radical having up to 12 C atoms, and

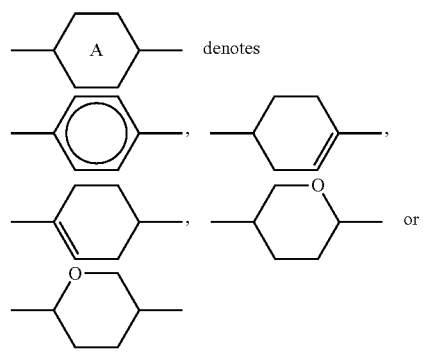

Z$^3$ denotes a single bond, —CH$_2$CH$_2$—, —CH═CH—, —CF$_2$O—, —OCF$_2$—, —CH$_2$O—, —OCH$_2$—, —COO—, —OCO—, —C$_2$F$_4$—, —C$_4$H$_8$—, —CF═CF—.

Preferred compounds of the formula III are indicated below:

IIIa
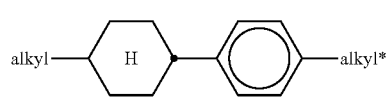

IIIb
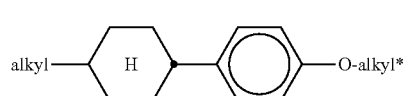

IIIc
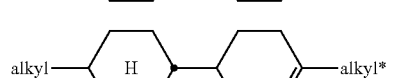

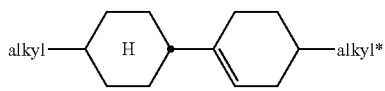

in which alkyl and alkyl* each, independently of one another, denote a straight-chain alkyl radical having 1-6 C atoms.

The medium according to the invention preferably comprises at least one compound of the formula IIIa and/or formula IIIb.

The proportion of compounds of the formula III in the mixture as a whole is preferably at least 5% by weight.

c) Liquid-crystalline medium additionally comprising a compound of the formula

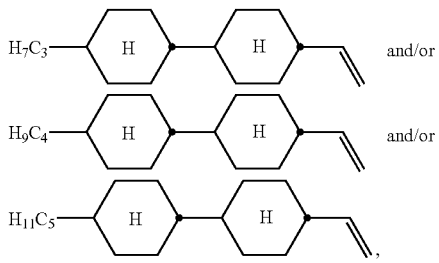

preferably in total amounts of 5% by weight, in particular 10% by weight.

Preference is furthermore given to mixtures according to the invention comprising the compound

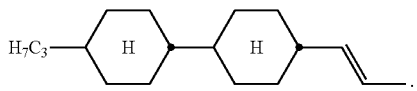

d) Liquid-crystalline medium which additionally comprises one or more tetracyclic compounds of the formulae

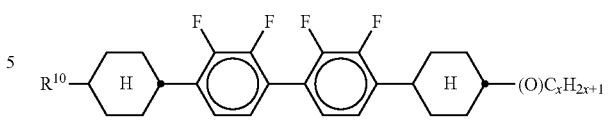

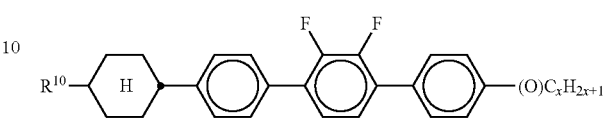

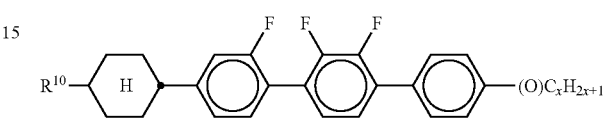

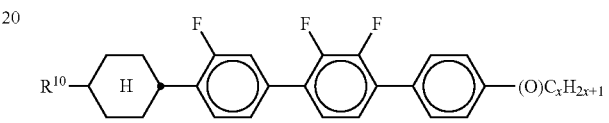

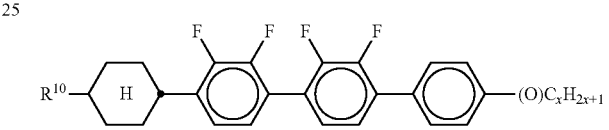

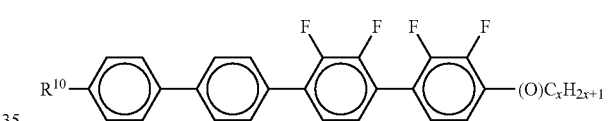

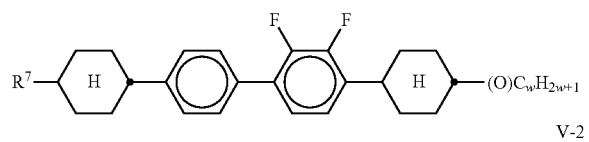

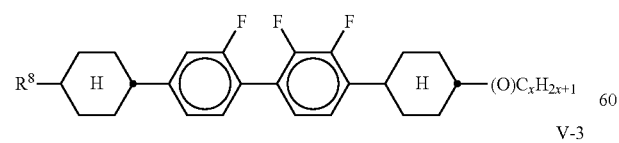

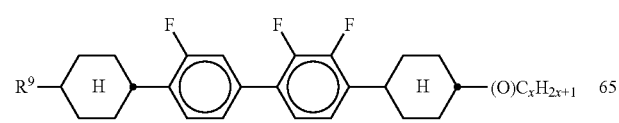

in which $R^{7-10}$ each, independently of one another, have one of the meanings indicated for $R^{2A}$ in claim 2, and w and x each, independently of one another, denote 1 to 6.

Particular preference is given to mixtures comprising at least one compound of the formula V-9.

e) Liquid-crystalline medium which additionally comprises one or more compounds of the formulae Y-1 to Y-6,

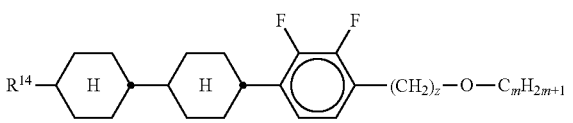

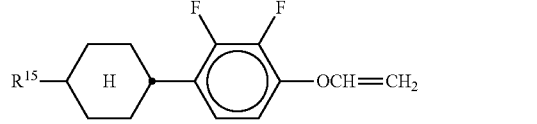

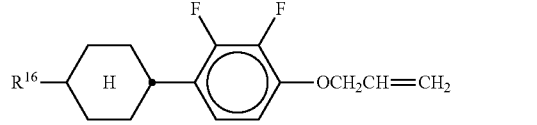

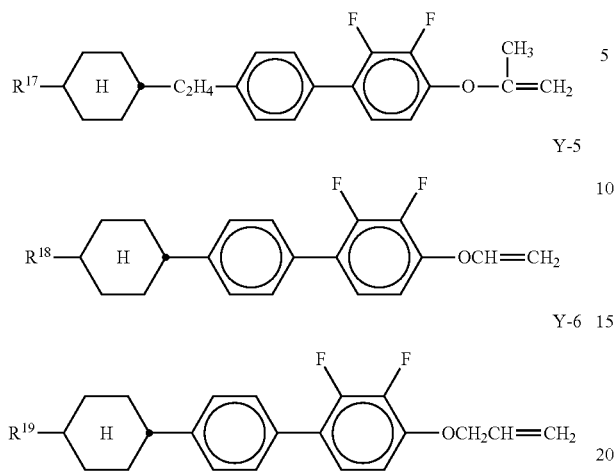

in which $R^{14}$-$R^{19}$ each, independently of one another, denote an alkyl or alkoxy radical having 1-6 C atoms; z and m each, independently of one another, denote 1-6; x denotes 0, 1, 2 or 3.

The medium according to the invention particularly preferably comprises one or more compounds of the formulae Y-1 to Y-6, preferably in amounts of ≥5% by weight.

f) Liquid-crystalline medium additionally comprising one or more fluorinated terphenyls of the formulae T-1 to T-21,

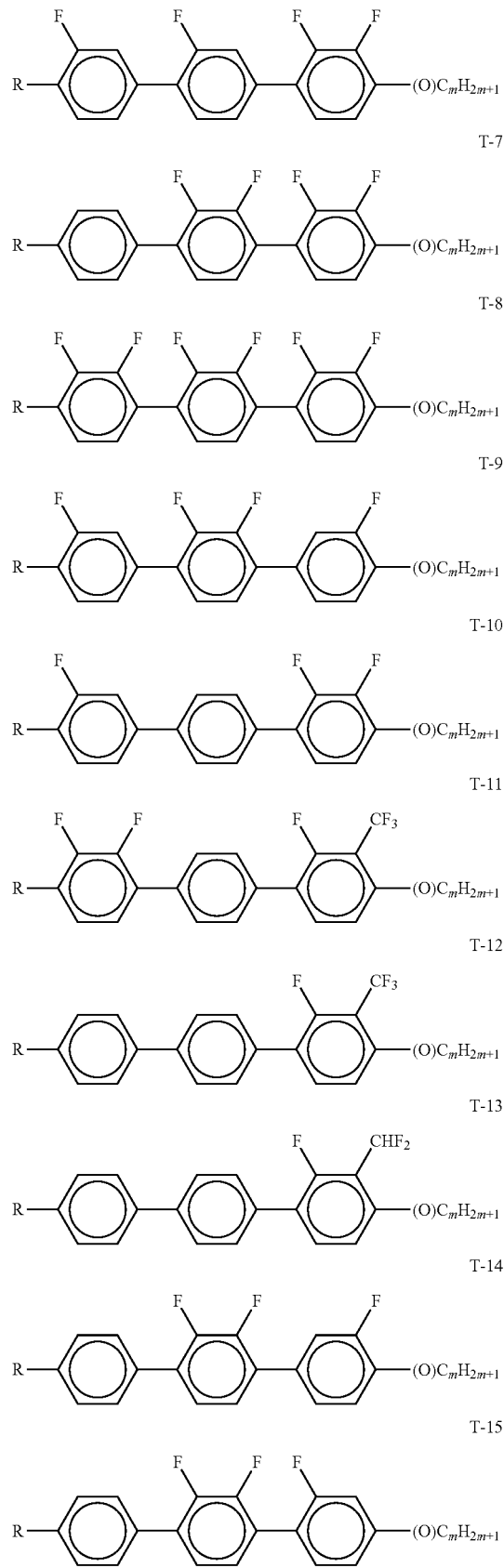

-continued

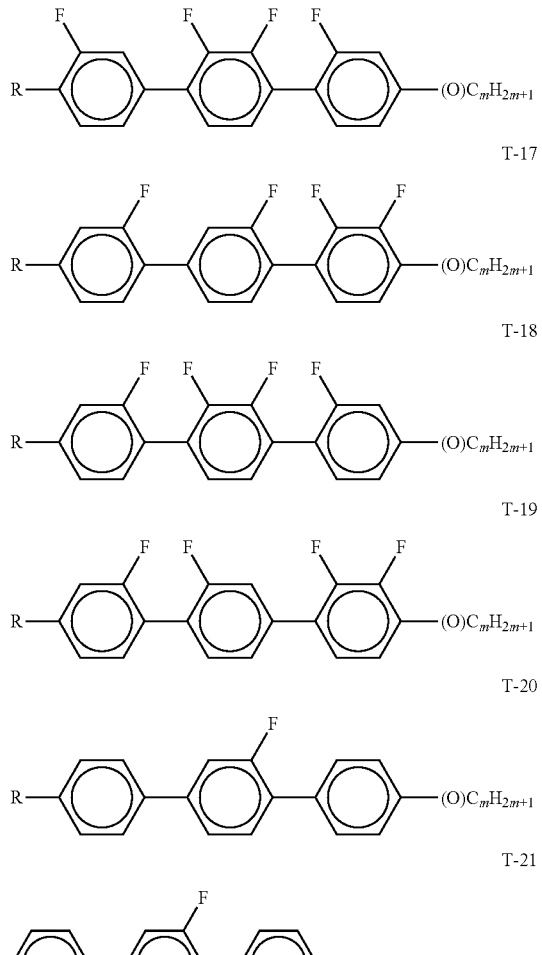

in which
R denotes a straight-chain alkyl or alkoxy radical having 1-7 C atoms, and m=0, 1, 2, 3, 4, 5 or 6 and n denotes 0, 1, 2, 3 or 4.

R preferably denotes methyl, ethyl, propyl, butyl, pentyl, hexyl, methoxy, ethoxy, propoxy, butoxy, pentoxy.

The medium according to the invention preferably comprises the terphenyls of the formulae T-1 to T-21 in amounts of 2-30% by weight, in particular 5-20% by weight.

Particular preference is given to compounds of the formulae T-1, T-2, T-20 and T-21. In these compounds, R preferably denotes alkyl, furthermore alkoxy, each having 1-5 C atoms. In the compounds of the formula T-20, R preferably denotes alkyl or alkenyl, in particular alkyl. In the compound of the formula T-21, R preferably denotes alkyl.

The terphenyls are preferably employed in the mixtures according to the invention if the Δn value of the mixture is to be ≥0.1. Preferred mixtures comprise 2-20% by weight of one or more terphenyl compounds selected from the group of the compounds T-1 to T-21.

g) Liquid-crystalline medium additionally comprising one or more biphenyls of the formulae B-1 to B-3,

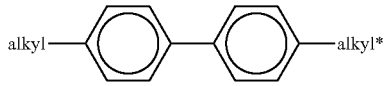

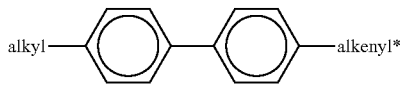

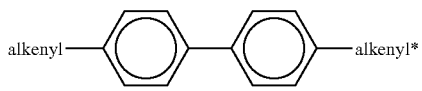

in which
alkyl and alkyl* each, independently of one another, denote a straight-chain alkyl radical having 1-6 C atoms, and
alkenyl and alkenyl* each, independently of one another, denote a straight-chain alkenyl radical having 2-6 C atoms.

The proportion of the biphenyls of the formulae B-1 to B-3 in the mixture as a whole is preferably at least 3% by weight, in particular ≥5% by weight.

Of the compounds of the formulae B-1 to B-3, the compounds of the formula B-2 are particularly preferred.

Particularly preferred biphenyls are

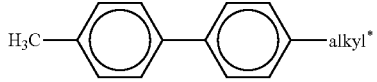

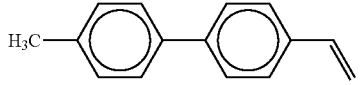

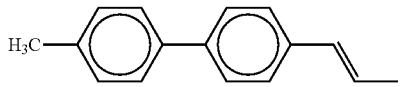

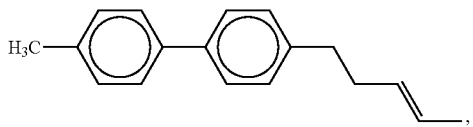

in which alkyl* denotes an alkyl radical having 1-6 C atoms. The medium according to the invention particularly preferably comprises one or more compounds of the formulae B-1a and/or B-2c.

h) Liquid-crystalline medium comprising at least one compound of the formulae Z-1 to Z-7,

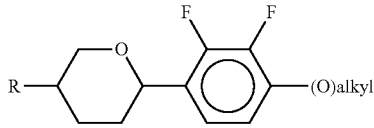

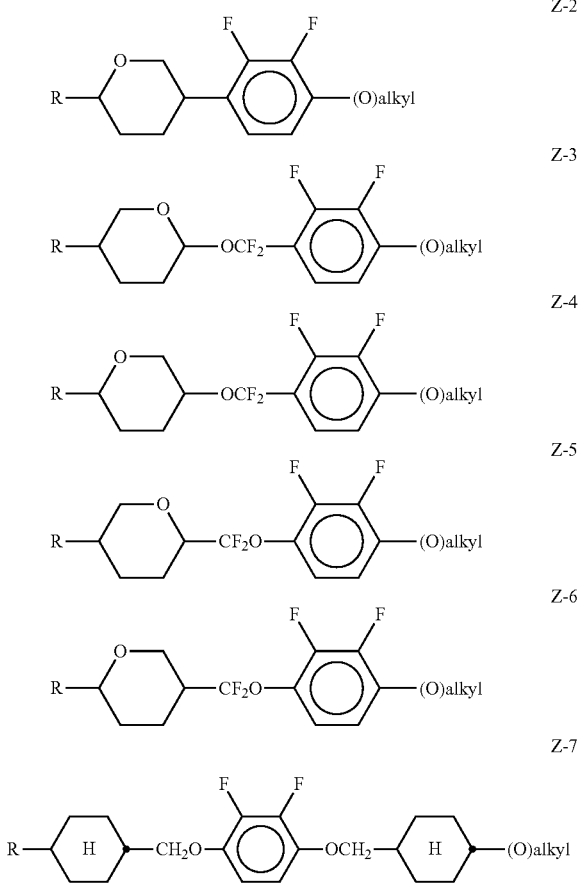

in which R and alkyl have the meanings indicated above.

i) Liquid-crystalline medium comprising at least one compound of the formulae O-1 to O-17,

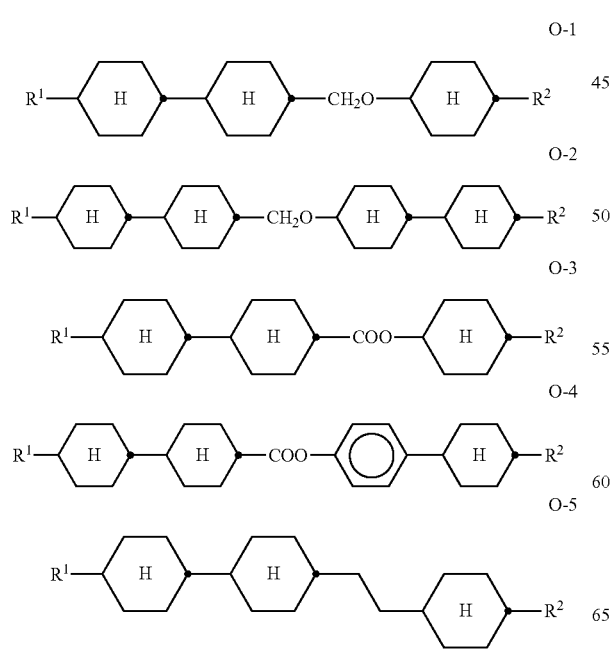

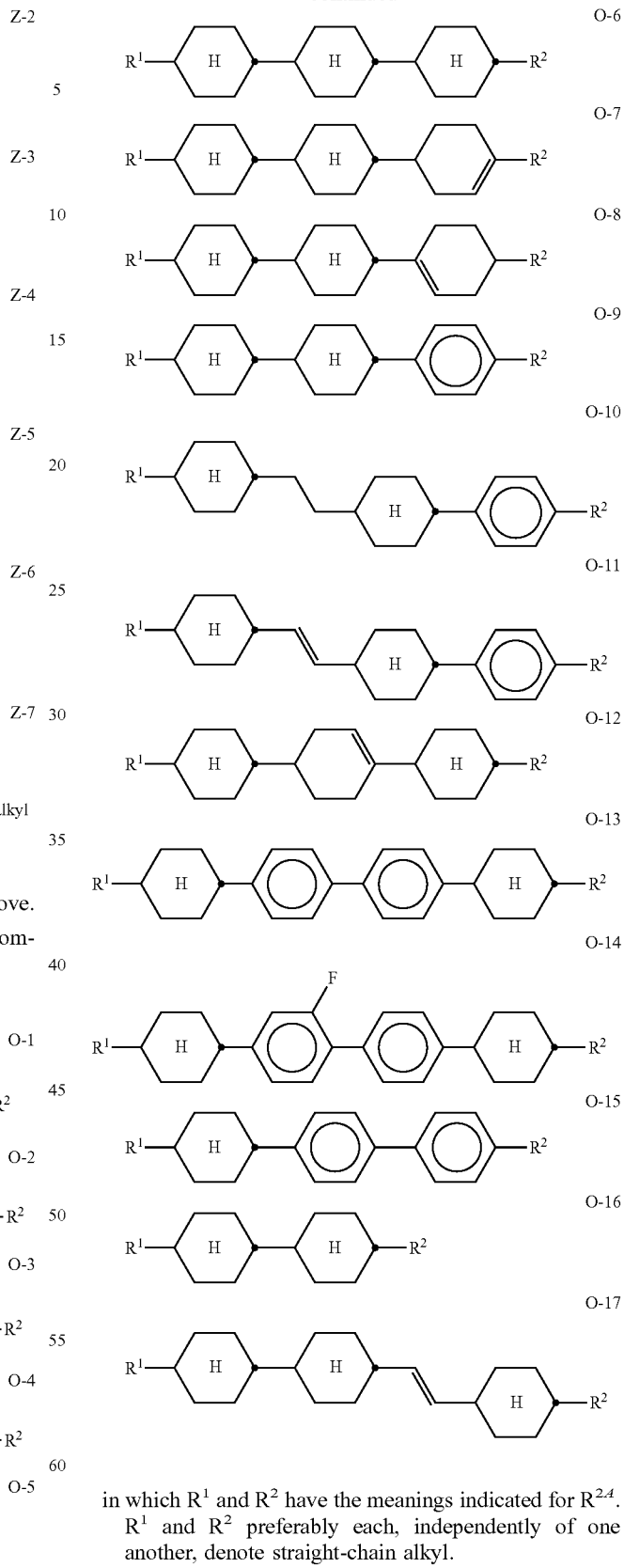

in which $R^1$ and $R^2$ have the meanings indicated for $R^{2A}$. $R^1$ and $R^2$ preferably each, independently of one another, denote straight-chain alkyl.

Preferred media comprise one or more compounds of the formulae O-1, O-3, O-4, O-5, O-9, O-13, O-14, O-15, O-16 and/or O-17.

Mixtures according to the invention very particularly preferably comprise the compounds of the formula O-9, O-15, O-16 and/or O-17, in particular in amounts of 5-30%.

Preferred compounds of the formulae O-15 and O-16 are indicated below:

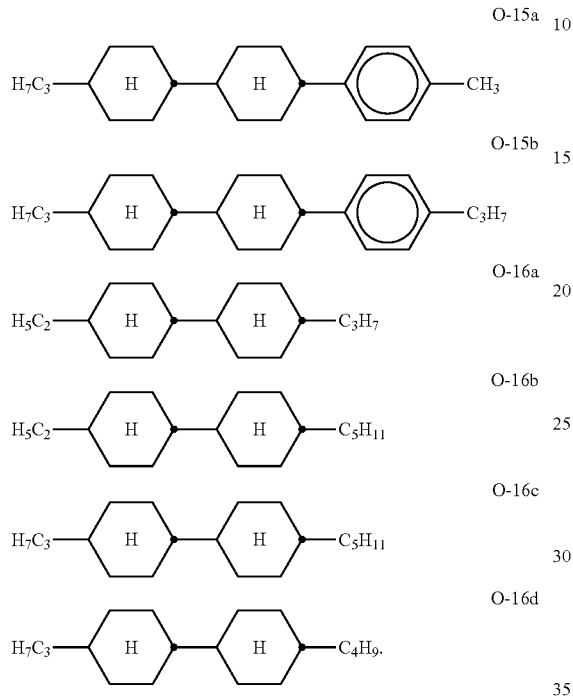

The medium according to the invention particularly preferably comprises the tricyclic compounds of the formula O-15a and/or of the formula O-15b in combination with one or more bicyclic compounds of the formulae O-16a to O-16d. The total proportion of the compounds of the formulae O-15a and/or O-15b in combination with one or more compounds selected from the bicyclic compounds of the formulae O-16a to O-16d is 5-40%, very particularly preferably 15-35%.

Very particularly preferred mixtures comprise compounds O-15a and O-16a:

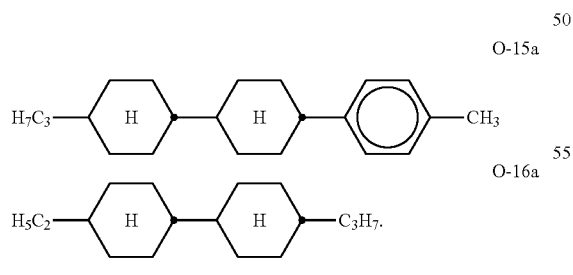

Compounds O-15a and O-16a are preferably present in the mixture in a concentration of 15-35%, particularly preferably 15-25% and especially preferably 18-22%, based on the mixture as a whole.

Very particularly preferred mixtures comprise compounds O-15b and O-16a:

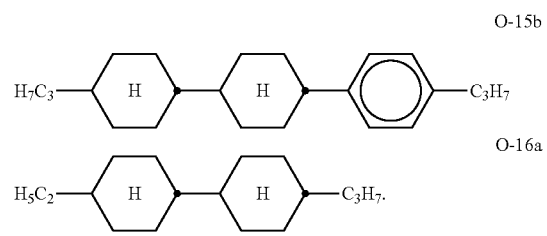

Compounds O-15b and O-16a are preferably present in the mixture in a concentration of 15-35%, particularly preferably 15-25% and especially preferably 18-22%, based on the mixture as a whole.

Very particularly preferred mixtures comprise the following three compounds:

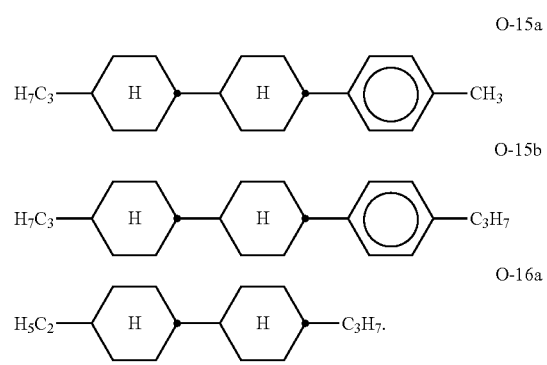

Compounds O-15a, O-15b and O-16a are preferably present in the mixture in a concentration of 15-35%, particularly preferably 15-25% and especially preferably 18-22%, based on the mixture as a whole.

j) Preferred liquid-crystalline media according to the invention comprise one or more substances which contain a tetrahydronaphthyl or naphthyl unit, such as, for example, the compounds of the formulae N-1 to N-5,

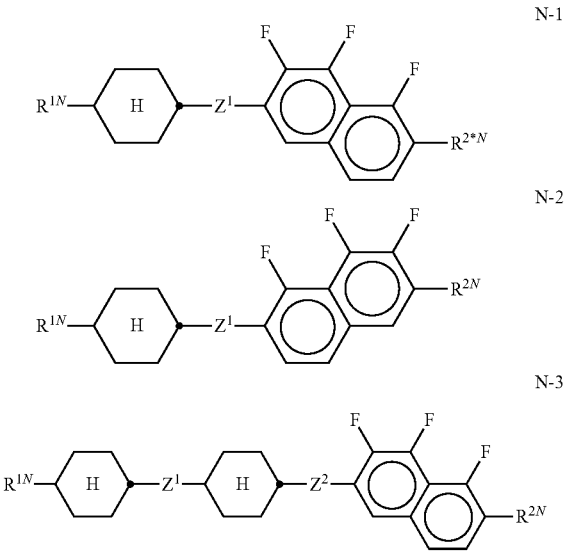

N-4

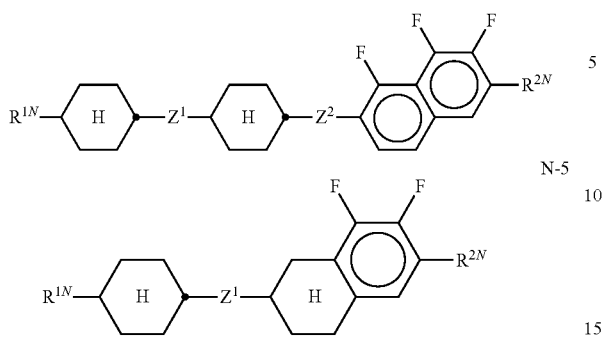

N-5 in which $R^{1N}$ and $R^{2N}$ each, independently of one another, have the meanings indicated for $R^{2A}$ in claim 7, preferably denote straight-chain alkyl, straight-chain alkoxy or straight-chain alkenyl, and $Z^1$ and $Z^2$ each, independently of one another, denote —$C_2H_4$—, —CH=CH—, —$(CH_2)_4$—, —$(CH_2)_3O$—, —$O(CH_2)_3$—, —CH=CHCH$_2$CH$_2$—, —CH$_2$CH$_2$CH=CH—, —CH$_2$O—, —OCH$_2$—, —COO—, —OCO—, —$C_2F_4$—, —CF=CF—, —CF=CH—, —CH=CF—, —CF$_2$O—, —OCF$_2$—, —CH$_2$— or a single bond.

k) Preferred mixtures comprise one or more compounds selected from the group of the difluorodibenzochroman compounds of the formula BC, chromans of the formula CR, fluorinated phenanthrenes of the formulae PH-1 and PH-2, fluorinated dibenzofurans of the formula BF,

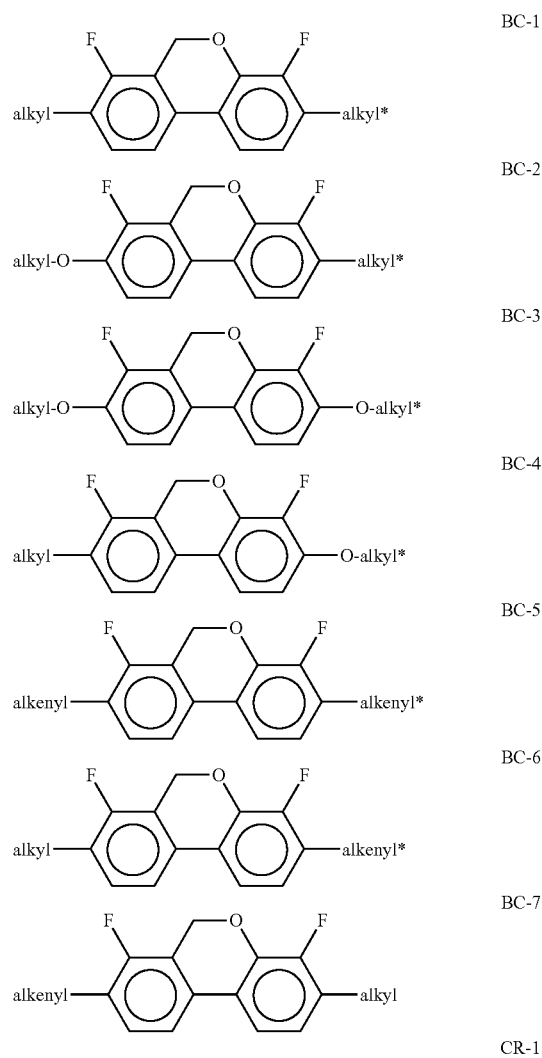

in which $R^{B1}$, $R^{B2}$, $R^{CR1}$, $R^{CR2}$, $R^1$, $R^2$ each, independently of one another, have the meaning of $R^{2A}$. c is 0, 1 or 2.

The mixtures according to the invention preferably comprise the compounds of the formulae BC, CR, PH-1, PH-2 and/or BF in amounts of 3 to 20% by weight, in particular in amounts of 3 to 15% by weight. Particularly preferred compounds of the formulae BC and CR are the compounds BC-1 to BC-7 and CR-1 to CR-5,

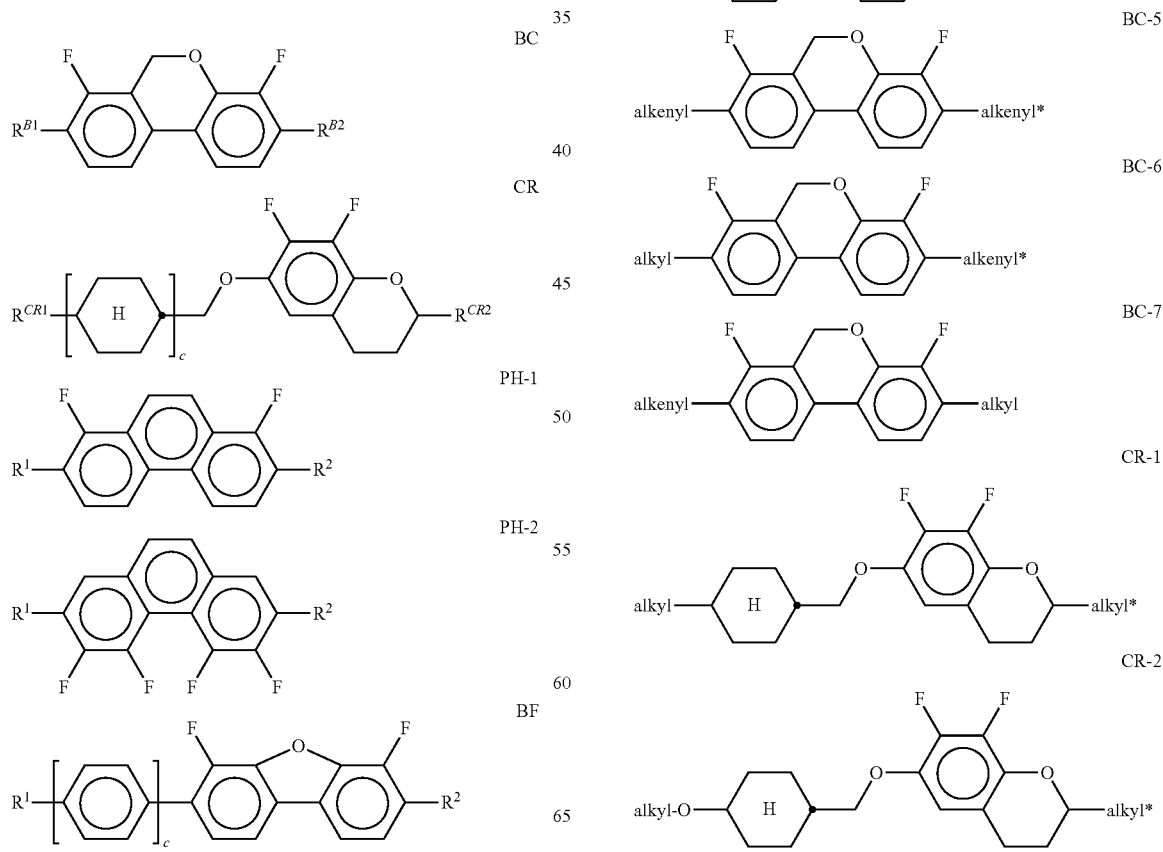

-continued

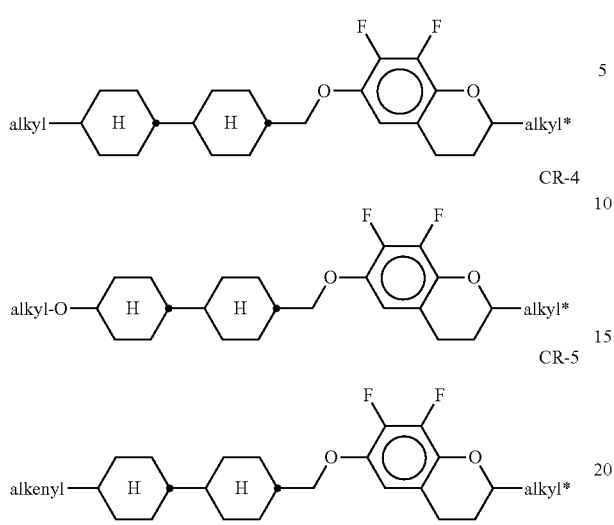

in which
alkyl and alkyl* each, independently of one another, denote a straight-chain alkyl radical having 1-6 C atoms, and
alkenyl and
alkenyl* each, independently of one another, denote a straight-chain alkenyl radical having 2-6 C atoms.
Very particular preference is given to mixtures comprising one, two or three compounds of the formula BC-2.
l) Preferred mixtures comprise one or more indane compounds of the formula In,

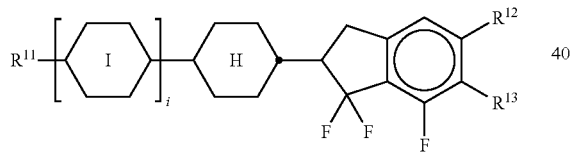

in which
$R^{11}$, $R^{12}$,
$R^{13}$ each, independently of one another, denote a straight-chain alkyl, alkoxy, alkoxyalkyl or alkenyl radical having 1-6 C atoms,
$R^{12}$ and $R^{13}$ additionally denote H or halogen,

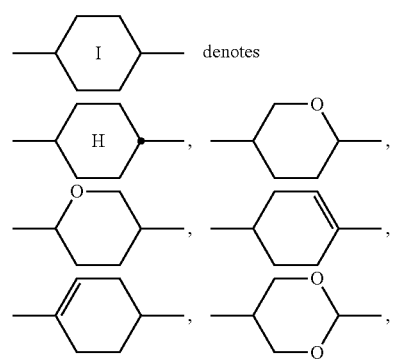

denotes

-continued

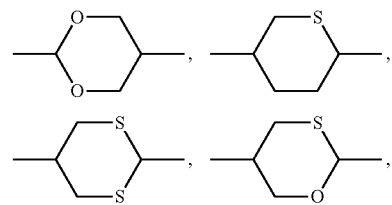

i denotes 0, 1 or 2.
In the case that $R^{12}$ and/or $R^{13}$ denote halogen, halogen is preferably F.
Preferred compounds of the formula In are the compounds of the formulae In-1 to In-16 indicated below:

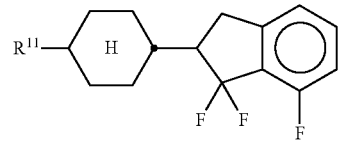

In-1

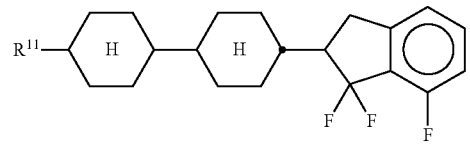

In-2

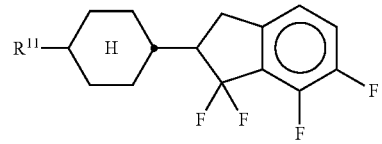

In-3

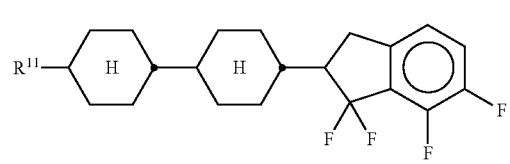

In-4

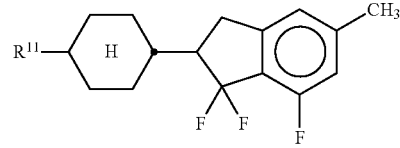

In-5

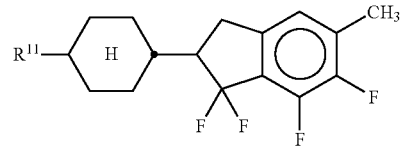

In-6

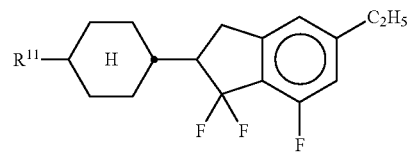

In-7

-continued

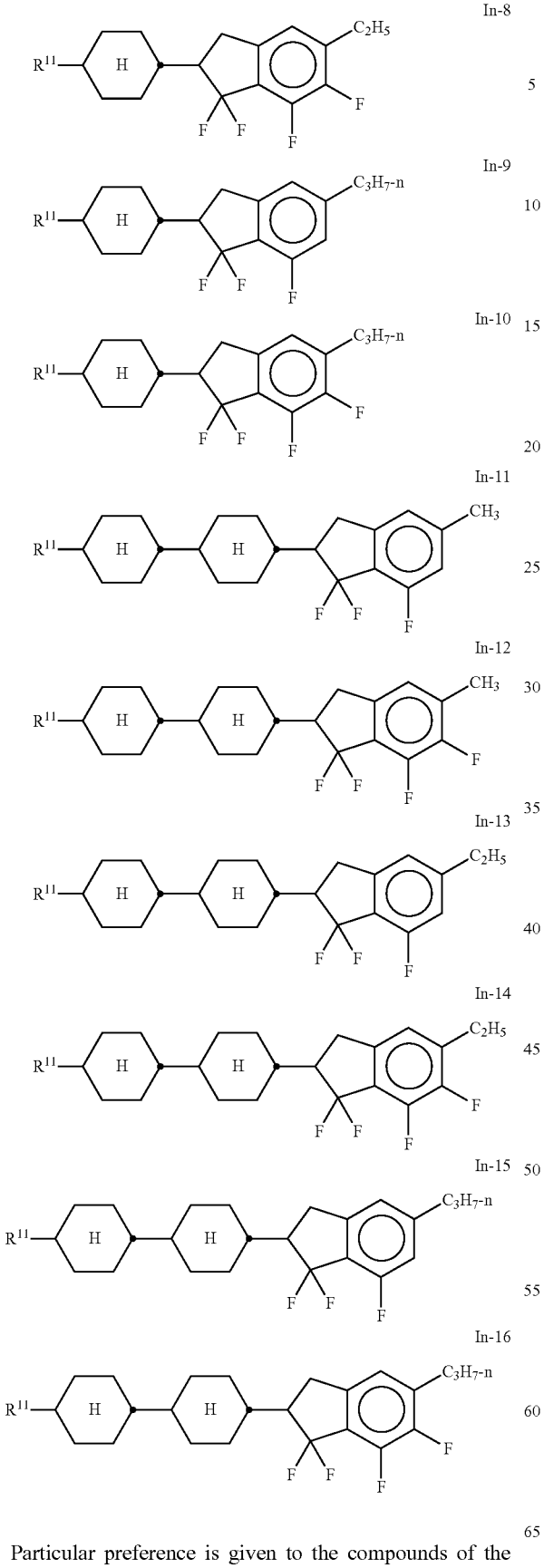

Particular preference is given to the compounds of the formulae In-1, In-2, In-3 and In-4.

The compounds of the formula In and the sub-formulae In-1 to In-16 are preferably employed in the mixtures according to the invention in concentrations 5% by weight, in particular 5-30% by weight and very particularly preferably 5-25% by weight.

m) Preferred mixtures additionally comprise one or more compounds of the formulae L-1 to L-11,

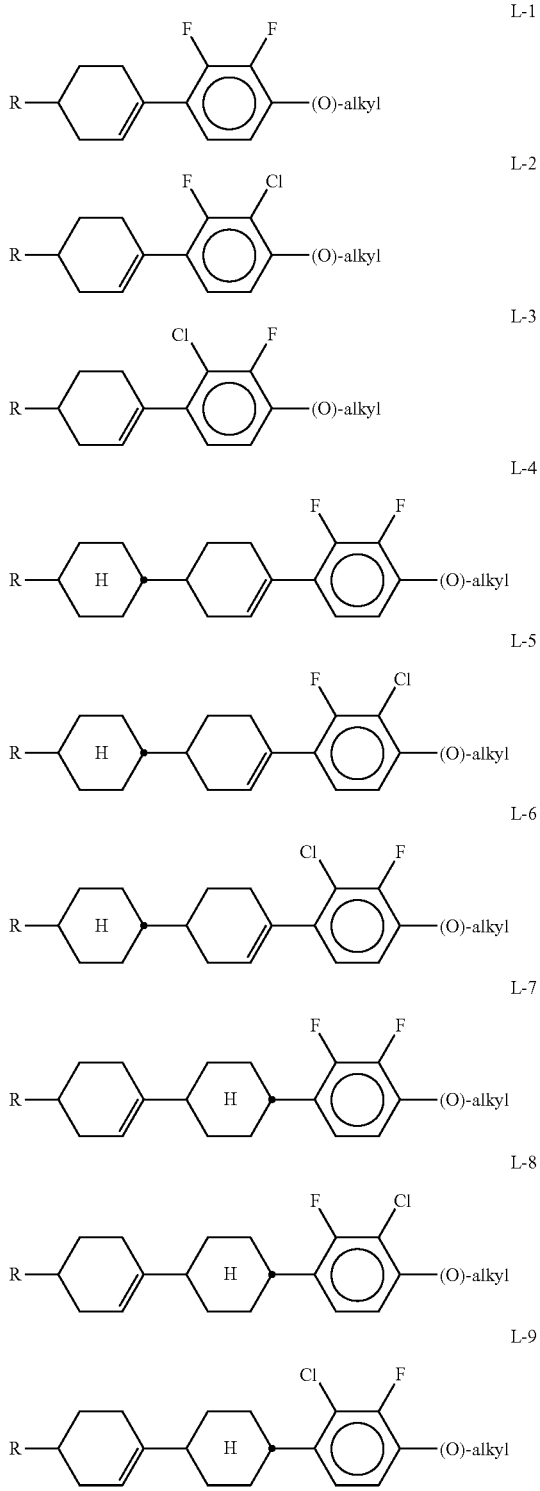

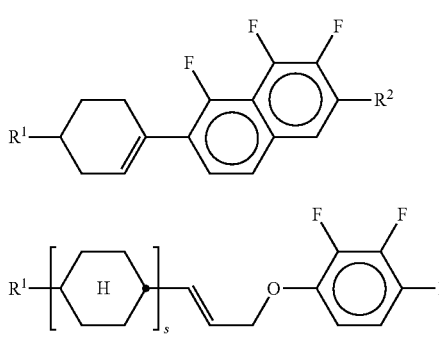

L-10

L-11 in which
R, R$^1$ and R$^2$ each, independently of one another, have the meanings indicated for R$^{24}$ in claim 7, and alkyl denotes an alkyl radical having 1-6 C atoms. s denotes 1 or 2.

Particular preference is given to the compounds of the formulae L-1 and L-4, in particular L-4.

The compounds of the formulae L-1 to L-11 are preferably employed in concentrations of 5-50% by weight, in particular 5-40% by weight and very particularly preferably 10-40% by weight.

Preferred mixtures having negative dielectric anisotropie contain at least one compound of the formula P,

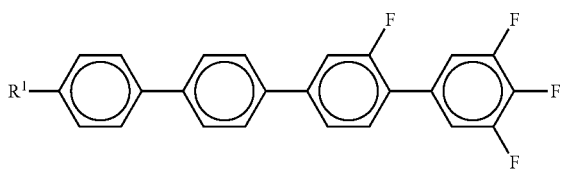

P preferably in amounts of 0.01-10% by weight, in particular 0.01-5% by weight.

Particularly preferred mixture concepts are indicated below: (the acronyms used are explained in Table A. n and m here each denote, independently of one another, 1-6).

The mixture according to the invention preferably contains
at least one self-aligning additive of the formula I-2a-1,

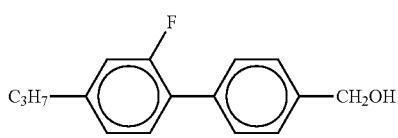

I-2a-1 preferably in amounts of 0.1-10 wt. %, in particular 2.5-5 wt. %.

CPY-n-Om, in particular CPY-2-O2, CPY-3-O2 and/or CPY-5-O2, preferably in concentrations>5%, in particular 10-30%, based on the mixture as a whole,
and/or
CY-n-Om, preferably CY-3-O2, CY-3-O4, CY-5-O2 and/or CY-5-O4, preferably in concentrations>5%, in particular 15-50%, based on the mixture as a whole,
and/or
CCY-n-Om, preferably CCY-4-O2, CCY-3-O2, CCY-3-O3, CCY-3-O1 and/or CCY-5-O2, preferably in concentrations>5%, in particular 10-30%, based on the mixture as a whole,
and/or
CLY-n-Om, preferably CLY-2-O4, CLY-3-O2 and/or CLY-3-O3, preferably in concentrations>5%, in particular 10-30%, based on the mixture as a whole,
and/or
CK-n-F, preferably CK-3-F, CK-4-F and/or CK-5-F, preferably in concentrations of >5%, in particular 5-25%, based on the mixture as a whole.

Preference is furthermore given to mixtures according to the invention which comprise the following mixture concepts:
(n and m each denote, independently of one another, 1-6.)
CPY-n-Om and CY-n-Om, preferably in concentrations of 10-80%, based on the mixture as a whole,
and/or
CPY-n-Om and CK-n-F, preferably in concentrations of 10-70%, based on the mixture as a whole,
and/or
CPY-n-Om and CLY-n-Om, preferably in concentrations of 10-80%, based on the mixture as a whole.
and/or
PYP-n-m, preferably one, two or three compounds, preferably in concentrations of 1-20% of the mixture as a whole.
and/or
PY-n-Om, preferably one, two or three compounds, preferably in concentrations of 1-20% of the mixture as a whole.

The invention furthermore relates to an electro-optical display, preferably a PI-free display, having active-matrix addressing based on the ECB, VA, PS-VA, PSA, characterised in that it contains, as dielectric, a liquid-crystalline medium according to one or more of claims 1 to 12.

The liquid-crystalline medium according to the invention preferably has a nematic phase from ≤−20° C. to ≥70° C., particularly preferably from ≤−30° C. to ≥80° C., very particularly preferably from ≤−40° C. to ≥90° C.

The expression "have a nematic phase" here means on the one hand that no smectic phase and no crystallisation are observed at low temperatures at the corresponding temperature and on the other hand that clearing still does not occur on heating from the nematic phase. The investigation at low temperatures is carried out in a flow viscometer at the corresponding temperature and checked by storage in test cells having a layer thickness corresponding to the electro-optical use for at least 100 hours. If the storage stability at a temperature of −20° C. in a corresponding test cell is 1000 h or more, the medium is referred to as stable at this temperature. At temperatures of −30° C. and −40° C., the corresponding times are 500 h and 250 h respectively. At high temperatures, the clearing point is measured by conventional methods in capillaries.

The liquid-crystal mixture preferably has a nematic phase range of at least 60 K and a flow viscosity $v_{20}$ of at most 30 mm$^2$·s$^{-1}$ at 20° C.

The values of the birefringence Δn in the liquid-crystal mixture are generally between 0.07 and 0.16, preferably between 0.08 and 0.13.

The liquid-crystal mixture according to the invention has a Δ∈ of −0.5 to −8.0, in particular −2.5 to −6.0, where Δ∈ denotes the dielectric anisotropy. The rotational viscosity $γ_1$ at 20° C. is preferably 165 mPa·s, in particular 140 mPa·s.

The liquid-crystal media according to the invention have relatively low values for the threshold voltage ($V_0$). They are preferably in the range from 1.7 V to 3.0 V, particularly preferably ≤2.5 V and very particularly preferably ≤2.3 V.

For the present invention, the term "threshold voltage" relates to the capacitive threshold ($V_0$), also known as the Freedericks threshold, unless explicitly indicated otherwise.

In addition, the liquid-crystal media according to the invention have high values for the voltage holding ratio in liquid-crystal cells.

In general, liquid-crystal media having a low addressing voltage or threshold voltage exhibit a lower voltage holding ratio than those having a higher addressing voltage or threshold voltage and vice versa.

For the present invention, the term "dielectrically positive compounds" denotes compounds having a $\Delta\epsilon > 1.5$, the term "dielectrically neutral compounds" denotes those having $-1.5 \leq \Delta\epsilon \leq 1.5$ and the term "dielectrically negative compounds" denotes those having $\Delta\epsilon < -1.5$. The dielectric anisotropy of the compounds is determined here by dissolving 10% of the compounds in a liquid-crystalline host and determining the capacitance of the resultant mixture in at least one test cell in each case having a layer thickness of 20 μm with homeotropic and with homogeneous surface alignment at 1 kHz. The measurement voltage is typically 0.5 V to 1.0 V, but is always lower than the capacitive threshold of the respective liquid-crystal mixture investigated.

All temperature values indicated for the present invention are in ° C.

The mixtures according to the invention are suitable for all VA-TFT applications, such as, for example, VAN, MVA, (S)-PVA, ASV, PSA (polymer sustained VA) and PS-VA (polymer stabilized VA).

The nematic liquid-crystal mixtures in the displays according to the invention generally comprise two components A and B, which themselves consist of one or more individual compounds.

Component A has significantly negative dielectric anisotropy and gives the nematic phase a dielectric anisotropy of ≤−0.5. Preferably component A comprises the compounds of the formulae IIA, IIB and/or IIC, furthermore compounds of the formula III.

The proportion of component A is preferably between 45 and 100%, in particular between 60 and 100%.

For component A, one (or more) individual compound(s) which has (have) a value of $\Delta\epsilon \leq -0.8$ is (are) preferably selected. This value must be more negative, the smaller the proportion A in the mixture as a whole.

Component B has pronounced nematogeneity and a flow viscosity of not greater than 30 $mm^2 \cdot s^{-1}$, preferably not greater than 25 $mm^2 \cdot s^{-1}$, at 20° C.

Particularly preferred individual compounds in component B are extremely low-viscosity nematic liquid crystals having a flow viscosity of not greater than 18 $mm^2 \cdot s^{-1}$, preferably not greater than 12 $mm^2 \cdot s^{-1}$, at 20° C.

Component B is monotropically or enantiotropically nematic, has no smectic phases and is able to prevent the occurrence of smectic phases down to very low temperatures in liquid-crystal mixtures. For example, if various materials of high nematogeneity are added to a smectic liquid-crystal mixture, the nematogeneity of these materials can be compared through the degree of suppression of smectic phases that is achieved.

The mixture may optionally also comprise a component C, comprising compounds having a dielectric anisotropy of $\Delta\epsilon \geq 1.5$. These so-called positive compounds are generally present in a mixture of negative dielectric anisotropy in amounts of ≤20% by weight, based on the mixture as a whole.

A multiplicity of suitable materials is known to the person skilled in the art from the literature. Particular preference is given to compounds of the formula III.

In addition, these liquid-crystal phases may also comprise more than 18 components, preferably 18 to 25 components.

The mixtures according to the invention contain one or more compounds of the formula I and preferably comprise 4 to 15, in particular 5 to 12, and particularly preferably <10, compounds of the formulae IIA, IIB and/or IIC and optionally III.

Besides compounds of the formula I and the compounds of the formulae IIA, IIB and/or IIC and optionally III, other constituents may also be present, for example in an amount of up to 45% of the mixture as a whole, but preferably up to 35%, in particular up to 10%.

The other constituents are preferably selected from nematic or nematogenic substances, in particular known substances, from the classes of the azoxybenzenes, benzylideneanilines, biphenyls, terphenyls, phenyl or cyclohexyl benzoates, phenyl or cyclohexyl cyclo hexanecarboxylates, phenylcyclohexanes, cyclohexylbiphenyls, cyclohexylcyclohexanes, cyclo-hexylnaphthalenes, 1,4-biscyclohexylbiphenyls or cyclohexylpyrimidines, phenyl- or cyclohexyldioxanes, optionally halogenated stilbenes, benzyl phenyl ethers, tolans and substituted cinnamic acid esters.

The most important compounds which are suitable as constituents of liquid-crystal phases of this type can be characterised by the formula IV

$$R^{20}\text{-L-G-E-}R^{21} \qquad \qquad \text{IV}$$

in which L and E each denote a carbo- or heterocyclic ring system from the group formed by 1,4-disubstituted benzene and cyclohexane rings, 4,4'-disubstituted biphenyl, phenylcyclohexane and cyclohexylcyclohexane systems, 2,5-disubstituted pyrimidine and 1,3-dioxane rings, 2,6-disubstituted naphthalene, di- and tetrahydronaphthalene, quinazoline and tetrahydroquinazoline,

| G denotes | |
|---|---|
| —CH=CH— | —N(O)=N— |
| —CH=CQ— | —CH=N(O)— |
| —C≡C— | —CH$_2$—CH$_2$— |
| —CO—O— | —CH$_2$—O— |
| —CO—S— | —CH$_2$—S— |
| —CH=N— | —COO—Phe—COO— |
| —CF$_2$O— | —CF=CF— |
| —OCF$_2$— | —OCH$_2$— |
| —(CH$_2$)$_4$— | —(CH$_2$)$_3$O— | or a C—C single bond, Q denotes halogen, preferably chlorine, or —CN, and $R^{20}$ and $R^{21}$ each denote alkyl, alkenyl, alkoxy, alkoxyalkyl or alkoxycarbonyloxy having up to 18, preferably up to 8, carbon atoms, or one of these radicals alternatively denotes CN, NC, $NO_2$, NCS, $CF_3$, $SF_5$, $OCF_3$, F, Cl or Br.

In most of these compounds, $R^{20}$ and $R^{21}$ are different from one another, one of these radicals usually being an alkyl or alkoxy group. Other variants of the proposed substituents are also common. Many such substances or also mixtures thereof are commercially available. All these substances can be prepared by methods known from the literature.

It goes without saying for the person skilled in the art that the VA mixture according to the invention may also comprise compounds in which, for example, H, N, O, Cl and F have been replaced by the corresponding isotopes.

Polymerisable compounds, so-called reactive mesogens (RMs), for example as disclosed in U.S. Pat. No. 6,861,107, may furthermore be added to the mixtures according to the invention in concentrations of preferably 0.12-5% by weight, particularly preferably 0.2-2% by weight, based on the mixture. These mixtures may optionally also comprise an initiator, as described, for example, in U.S. Pat. No. 6,781,665. The initiator, for example Irganox-1076 from Ciba, is preferably added to the mixture comprising polymerisable compounds in amounts of 0-1%. Mixtures of this type can be used for so-called polymer-stabilised VA modes (PS-VA) or PSA (polymer sustained VA), in which polymerisation of the reactive mesogens is intended to take place in the liquid-crystalline mixture. The prerequisite for this is that the liquid-crystal mixture does not itself comprise any polymerisable components.

In a preferred embodiment of the invention, the polymerisable compounds are selected from the compounds of the formula M,

$$R^{Ma}\text{-}A^{M1}\text{-}(Z^{M1}\text{-}A^{M2})_{m1}\text{-}R^{Mb} \quad \quad M$$

in which the individual radicals have the following meanings:

$R^{Ma}$ and $R^{Mb}$ each, independently of one another, denote P, P-Sp-, H, halogen, $SF_5$, $NO_2$, an alkyl, alkenyl or alkynyl group, where at least one of the radicals $R^{Ma}$ and $R^{Mb}$ preferably denotes or contains a group P or P-Sp-, P denotes a polymerisable group, Sp denotes a spacer group or a single bond, $A^{M1}$ and $A^{M2}$ each, independently of one another, denote an aromatic, heteroaromatic, alicyclic or heterocyclic group, preferably having 4 to 25 ring atoms, preferably C atoms, which may also encompass or contain fused rings, and which may optionally be mono- or polysubstituted by L, L denotes P, P-Sp-, OH, $CH_2OH$, F, Cl, Br, I, —CN, —$NO_2$, —NCO, —NCS, —OCN, —SCN, —C(=O)N($R^x$)$_2$, —C(=O)$Y^1$, —C(=O)$R^x$, —N($R^x$)$_2$, optionally substituted silyl, optionally substituted aryl having 6 to 20 C atoms, or straight-chain or branched alkyl, alkoxy, alkylcarbonyl, alkoxycarbonyl, alkylcarbonyloxy or alkoxycarbonyloxy having 1 to 25 C atoms, in which, in addition, one or more H atoms may be replaced by F, Cl, P or P-Sp-, preferably P, P-Sp-, H, OH, $CH_2OH$, halogen, $SF_5$, $NO_2$, an alkyl, alkenyl or alkynyl group, $Y^1$ denotes halogen, $Z^{M1}$ denotes —O—, —S—, —CO—, —CO—O—, —OCO—, —O—CO—O—, —OCH$_2$—, —CH$_2$O—, —SCH$_2$—, —CH$_2$S—, —CF$_2$O—, —OCF$_2$—, —CF$_2$S—, —SCF$_2$—, —(CH$_2$)$_{n1}$—, —CF$_2$CH$_2$—, —CH$_2$CF$_2$—, —(CF$_2$)$_{n1}$—, —CH=CH—, —CF=CF—, —C≡C—, —CH=CH—, —COO—, —OCO—CH=CH—, CR$^0$R$^{00}$ or a single bond, $R^0$ and $R^{00}$ each, independently of one another, denote H or alkyl having 1 to 12 C atoms, $R^x$ denotes P, P-Sp-, H, halogen, straight-chain, branched or cyclic alkyl having 1 to 25 C atoms, in which, in addition, one or more non-adjacent CH$_2$ groups may be replaced by —O—, —S—, —CO—, —CO—O—, —O—CO—, —O—CO—O— in such a way that O and/or S atoms are not linked directly to one another, and in which, in addition, one or more H atoms may be replaced by F, Cl, P or P-Sp-, an optionally substituted aryl or aryloxy group having 6 to 40 C atoms, or an optionally substituted heteroaryl or heteroaryloxy group having 2 to 40 C atoms, m1 denotes 0, 1, 2, 3 or 4, and n1 denotes 1, 2, 3 or 4, where at least one, preferably one, two or three, particularly preferably one or two, from the group $R^{Ma}$, $R^{Mb}$ and the substituents L present denotes a group P or P-Sp- or contains at least one group P or P-Sp-.

Particularly preferred compounds of the formula M are those in which $R^{Ma}$ and $R^{Mb}$ each, independently of one another, denote P, P-Sp-, H, F, Cl, Br, I, —CN, —$NO_2$, —NCO, —NCS, —OCN, —SCN, $SF_5$ or straight-chain or branched alkyl having 1 to 25 C atoms, in which, in addition, one or more non-adjacent CH$_2$ groups may each be replaced, independently of one another, by —C($R^0$)=C($R^{00}$)—, —C≡C—, —N($R^{00}$)—, —O—, —S—, —CO—, —CO—O—, —O—CO—, —O—CO—O— in such a way that O and/or S atoms are not linked directly to one another, and in which, in addition, one or more H atoms may be replaced by F, Cl, Br, I, CN, P or P-Sp-, where at least one of the radicals $R^{Ma}$ and $R^{Mb}$ preferably denotes or contains a group P or P-Sp-, $A^{M1}$ and $A^{M2}$ each, independently of one another, denote 1,4-phenylene, naphthalene-1,4-diyl, naphthalene-2,6-diyl, phenanthrene-2,7-diyl, anthracene-2,7-diyl, fluorene-2,7-diyl, coumarine, flavone, where, in addition, one or more CH groups in these groups may be replaced by N, cyclohexane-1,4-diyl, in which, in addition, one or more non-adjacent CH$_2$ groups may be replaced by O and/or S, 1,4-cyclohexenylene, bicyclo[1.1.1]-pentane-1,3-diyl, bicyclo[2.2.2]octane-1,4-diyl, spiro[3.3]heptane-2,6-diyl, piperidine-1,4-diyl, decahydronaphthalene-2,6-diyl, 1,2,3,4-tetrahydronaphthalene-2,6-diyl, indane-2,5-diyl or octahydro-4,7-methanoindane-2,5-diyl, where all these groups may be unsubstituted or mono- or polysubstituted by L, L denotes P, P-Sp-, OH, CH$_2$OH, F, Cl, Br, I, —CN, —NO$_2$, —NCO, —NCS, —OCN, —SCN, —C(=O)N($R^x$)$_2$, —C(=O)$Y^1$, —C(=O)$R^x$, —N($R^x$)$_2$, optionally substituted silyl, optionally substituted aryl having 6 to 20 C atoms, or straight-chain or branched alkyl, alkoxy, alkylcarbonyl, alkoxycarbonyl, alkylcarbonyloxy or alkoxycarbonyloxy having 1 to 25 C atoms, in which, in addition, one or more H atoms may be replaced by F, Cl, P or P-Sp-, P denotes a polymerisable group, $Y^1$ denotes halogen, $R^x$ denotes P, P-Sp-, H, halogen, straight-chain, branched or cyclic alkyl having 1 to 25 C atoms, in which, in addition, one or more non-adjacent CH$_2$ groups may be replaced by —O—, —S—, —CO—, —CO—O—, —O—CO—, —O—CO—O— in such a way that O and/or S atoms are not linked directly to one another, and in which, in addition, one or more H atoms may be replaced by F, Cl, P or P-Sp-, an optionally substituted aryl or aryloxy group having 6 to 40 C atoms, or an optionally substituted heteroaryl or heteroaryloxy group having 2 to 40 C atoms.

Very particular preference is given to compounds of the formula M in which one of $R^{Ma}$ and $R^{Mb}$ or both denote(s) P or P-Sp-.

Suitable and preferred mesogenic comonomers, particularly for use in PSA displays, are selected, for example, from the following formulae:

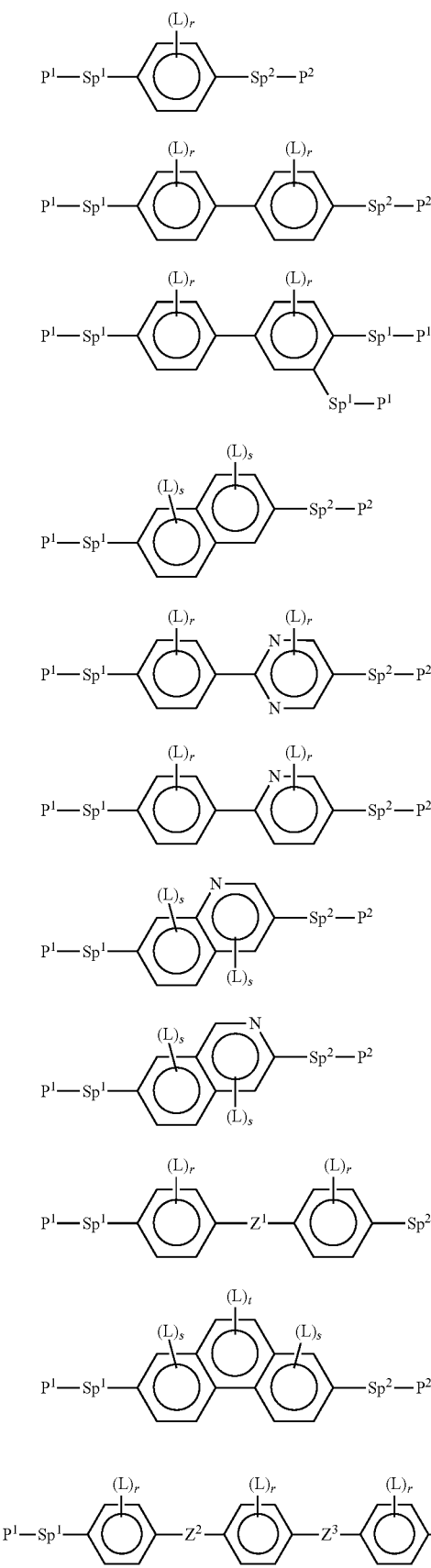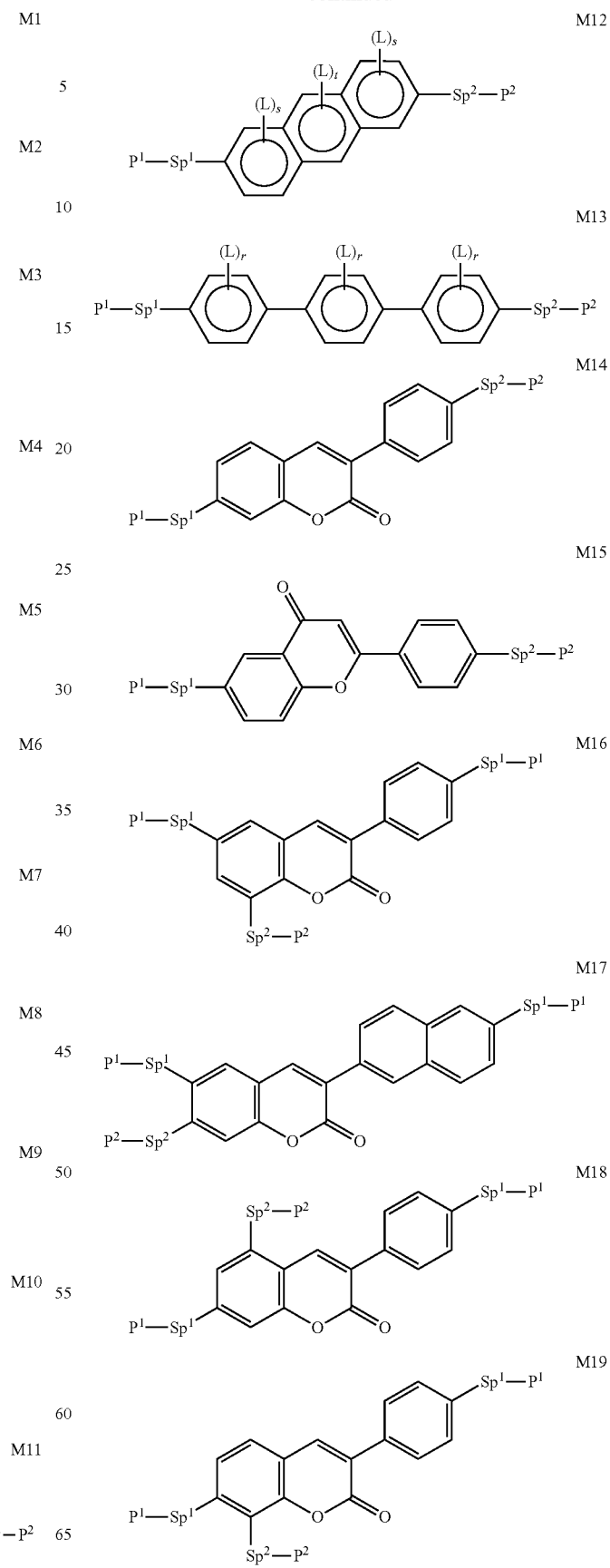

M20 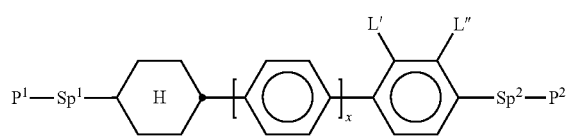
M21 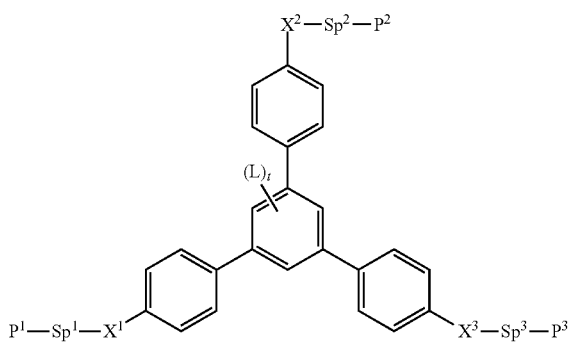
M22 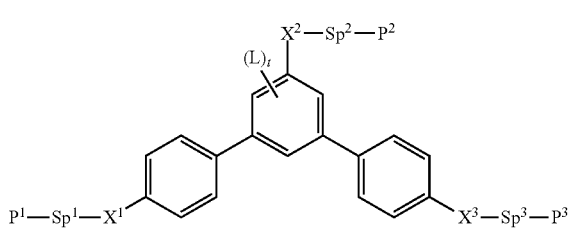
M23 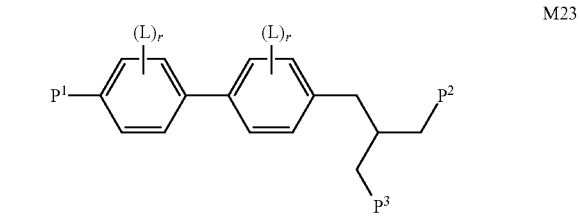
M24 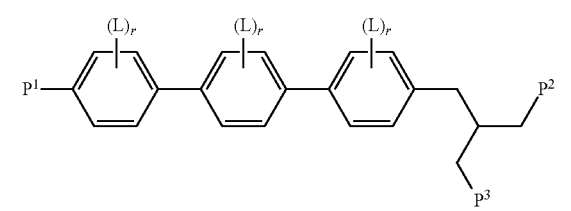
M25 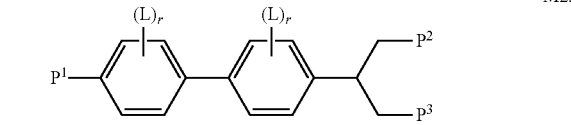
M26 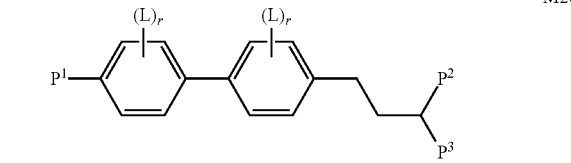
M27 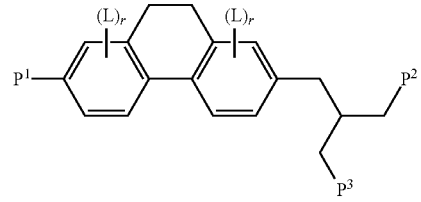
M28 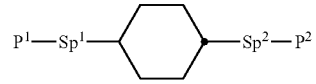
M29 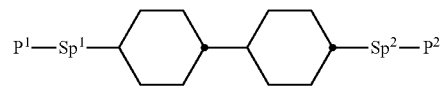
M30 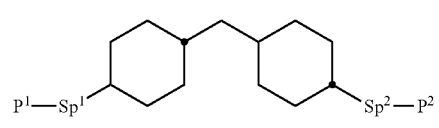
M31 
M32 
M33 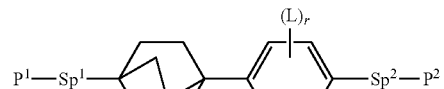
M34 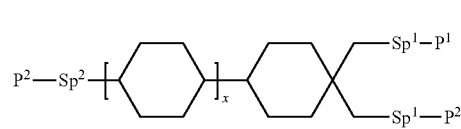
M35 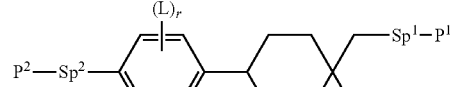
M36 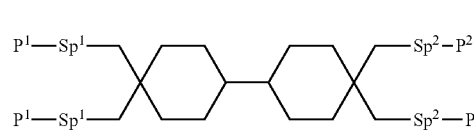
M37 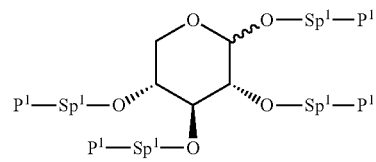
M38 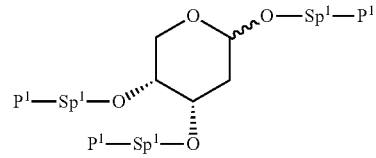

-continued

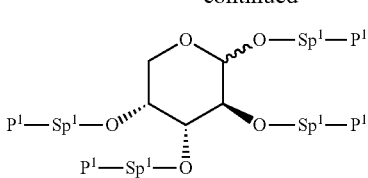

M39

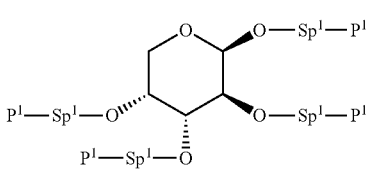

M40

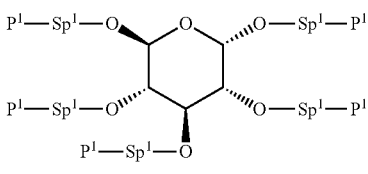

M41 in which the individual radicals have the following meanings:

$P^1$, $P^2$ and $P^3$ each, independently of one another, denote a polymerisable group, preferably having one of the meanings indicated above and below for P, particularly preferably an acrylate, methacrylate, fluoroacrylate, oxetane, vinyl, vinyloxy or epoxide group, $Sp^1$, $Sp^2$ and $Sp^3$ each, independently of one another, denote a single bond or a spacer group, preferably having one of the meanings indicated above and below for Sp, and particularly preferably denote —$(CH_2)_{p1}$—, —$(CH_2)_{p1}$—O—, —$(CH_2)_{p1}$—CO—O— or —$(CH_2)_{p1}$—O—CO—O—, in which p1 is an integer from 1 to 12, and where the linking to the adjacent ring in the last-mentioned groups takes place via the O atom, where, in addition, one or more of the radicals $P^1$-$Sp^1$-, $P^2$-$Sp^2$- and $P^3Sp^3$- may denote $R^{aa}$, with the proviso that at least one of the radicals $P^1$-$Sp^1$-, $P^2$-$Sp^2$- and $P^3$—$Sp^3$- present does not denote $R^{aa}$, $R^{aa}$ denotes H, F, Cl, CN or straight-chain or branched alkyl having 1 to 25 C atoms, in which, in addition, one or more non-adjacent $CH_2$ groups may each be replaced, independently of one another, by $C(R^0)$=$C(R^{00})$—, —$N(R^0)$—, —O—, —S—, —CO—, —CO—O—, —O—CO—, —O—CO—O— in such a way that O and/or S atoms are not linked directly to one another, and in which, in addition, one or more H atoms may be replaced by F, Cl, CN or $P^1$-$Sp^1$-, particularly preferably straight-chain or branched, optionally mono- or polyfluorinated alkyl, alkoxy, alkenyl, alkynyl, alkylcarbonyl, alkoxycarbonyl, alkylcarbonyloxy or alkoxycarbonyloxy having 1 to 12 C atoms (where the alkenyl and alkynyl radicals have at least two C atoms and the branched radicals have at least three C atoms), $R^0$, $R^{00}$ each, independently of one another and identically or differently on each occurrence, denote H or alkyl having 1 to 12 C atoms, $R^y$ and $R^z$ each, independently of one another, denote H, F, $CH_3$ or $CF_3$, $X^1$, $X^2$ and $X^3$ each, independently of one another, denote —CO—O—, —O—CO— or a single bond, $Z^1$ denotes —O—, —CO—, —$C(R^yR^z)$— or —$CF_2CF_2$—, $Z^2$ and $Z^3$ each, independently of one another, denote —CO—O—, —O—CO—, —$CH_2O$—, —$OCH_2$—, —$CF_2O$—, —$OCF_2$— or —$(CH_2)_n$—, where n is 2, 3 or 4, L on each occurrence, identically or differently, denotes F, Cl, CN or straight-chain or branched, optionally mono- or polyfluorinated alkyl, alkoxy, alkenyl, alkynyl, alkylcarbonyl, alkoxycarbonyl, alkylcarbonyloxy or alkoxycarbonyloxy having 1 to 12 C atoms, preferably F, L' and L" each, independently of one another, denote H, F or Cl, r denotes 0, 1, 2, 3 or 4, s denotes 0, 1, 2 or 3, t denotes 0, 1 or 2, x denotes 0 or 1.

In the compounds of formulae M1 to M41

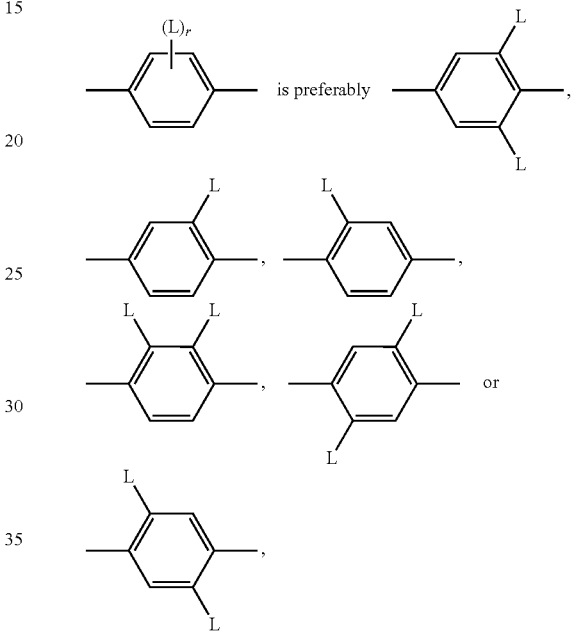

wherein L on each occurrence, identically or differently, has one of the meanings given above or below, and is preferably F, Cl, ON, $NO_2$, $CH_3$, $C_2H_5$, $C(CH_3)_3$, $CH(CH_3)_2$, $CH_2CH(CH_3)C_2H_5$, $OCH_3$, $OC_2H_5$, $COCH_3$, $COC_2H_5$, $COOCH_3$, $COOC_2H_5$, $CF_3$, $OCF_3$, $OCHF_2$, $OC_2F_5$ or P-Sp-, very preferably F, Cl, ON, $CH_3$, $C_2H_5$, $OCH_3$, $COCH_3$, $OCF_3$ or P-Sp-, more preferably F, Cl, $CH_3$, $OCH_3$, $COCH_3$ or $OCF_3$, especially F or $CH_3$.

Suitable polymerisable compounds are furthermore listed, for example, in Table D. LC mixtures containing at least one polymerisable compound listed in Table D are especially preferred.

The liquid-crystalline media in accordance with the present application preferably comprise in total 0.1 to 10%, preferably 0.2 to 4.0%, particularly preferably 0.2 to 2.0%, of polymerisable compounds.

Particular preference is given to the polymerisable compounds of the formula M.

The polymerisable compounds are preferably polymerised by photopolymerisation, for example by UV irradiation, often in the presence of at least one suitable initiator. Suitable conditions for the polymerisation and suitable types and amounts of initiator(s) are known to a person skilled in the art and are described in the literature. Suitable for free-radical polymerisation are, for example, commercially available photoinitiators, for example Irgacure® 651, Irgacure® 184 or Darocure® 1173 (BASF). The polymerisable compound(s) preferably comprise from 0 to 5% by weight, particularly preferably 0.1 to 3% by weight of one or more photoinitiators.

The combination of at least two liquid crystalline compounds, at least one self-aligning additive and preferably with at least one polymerisable compound, in particular one selected from the formula M and/or the formulae M1 to M41, produces low threshold voltages, low rotational viscosities, very good low temperature stabilities (LTS) in the media but at the same time high clearing points and high HR values, and enables the setting or a pretilt angle in VA displays without the need of any alignment layer, e.g., a polyimide layer.

The mixtures according to the invention may furthermore comprise conventional additives, such as, for example, stabilisers, antioxidants, UV absorbers, nanoparticles, microparticles, etc.

The structure of the liquid-crystal displays according to the invention corresponds to the usual geometry, as described, for example, in EP 0 240 379.

The following examples are intended to explain the invention without limiting it. Above and below, percent data denote percent by weight; all temperatures are indicated in degrees Celsius.

Throughout the patent application, 1,4-cyclohexylene rings and 1,4-phenylene rings are depicted as follows:

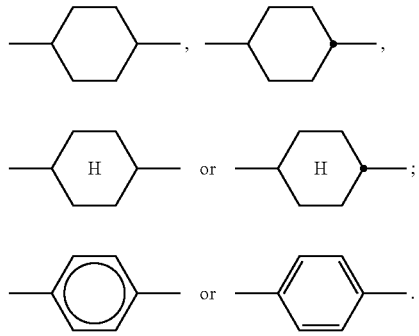

Besides the compounds of the formulae IIA and/or IIB and/or IIC, one or more compounds of the formula I, the mixtures according to the invention preferably comprise one or more of the compounds from Table A indicated below.

TABLE A

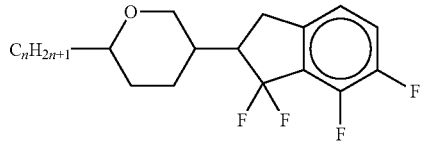

Alk-n-F

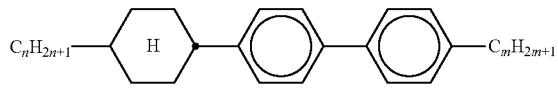

BCH-nm

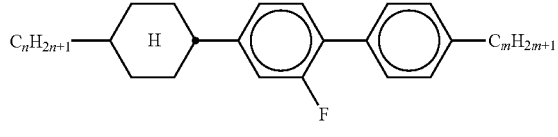

BCH-nmF

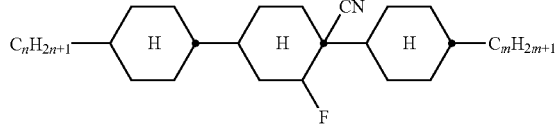

BCN-nm

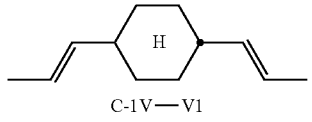

C-1V—V1

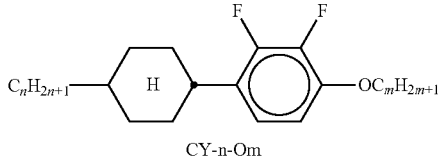

CY-n-Om

TABLE A-continued
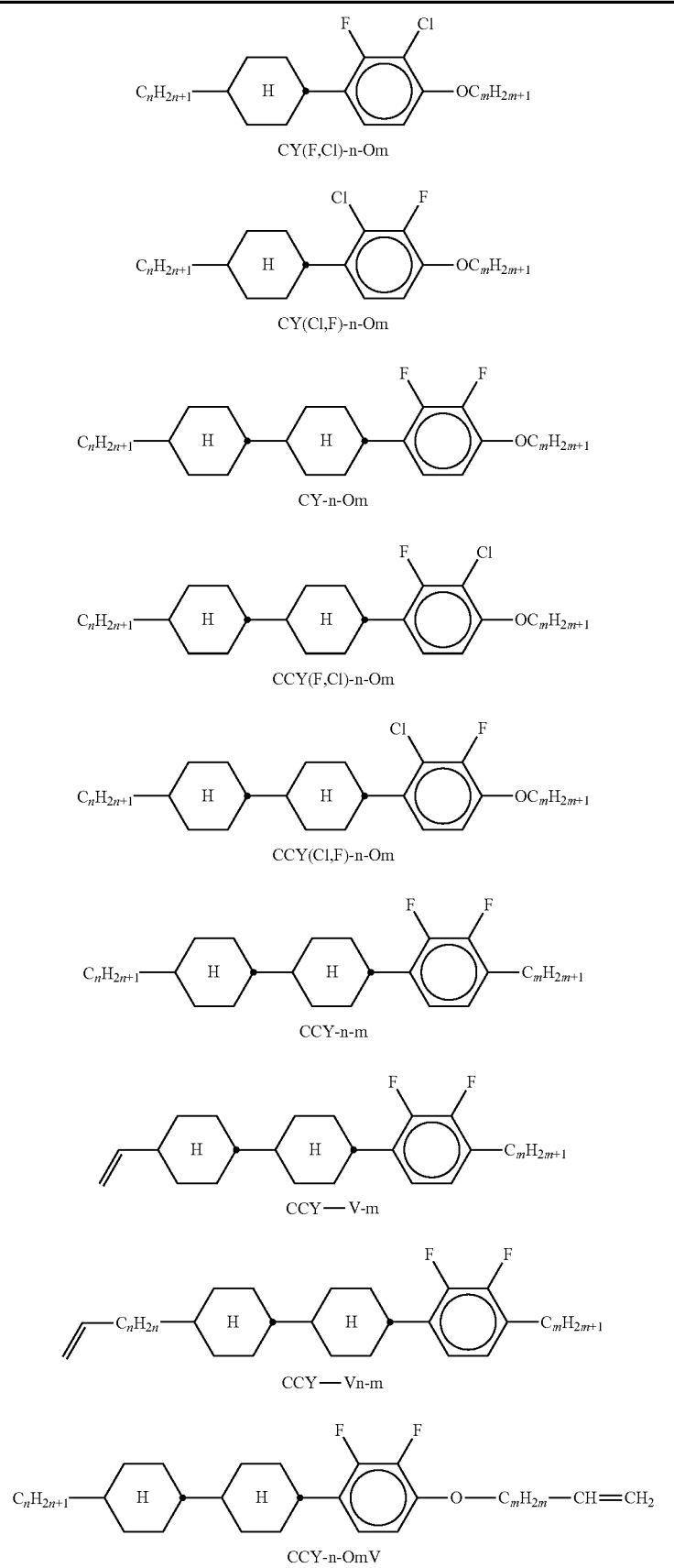

TABLE A-continued
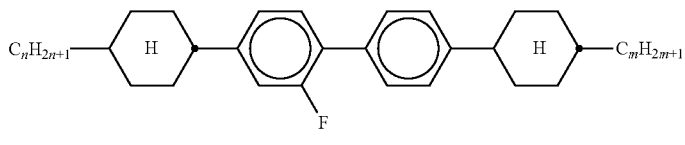
CBC-nmF
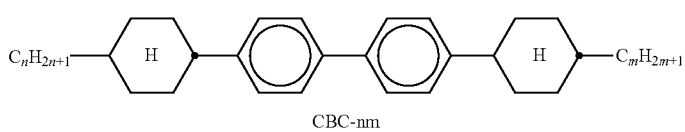
CBC-nm
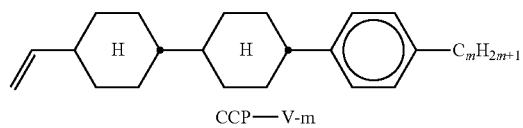
CCP—V-m
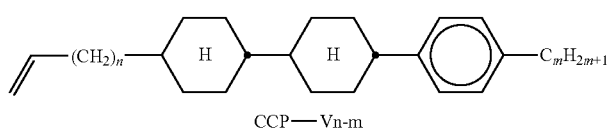
CCP—Vn-m
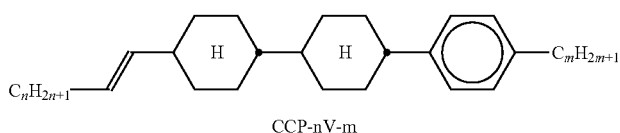
CCP-nV-m
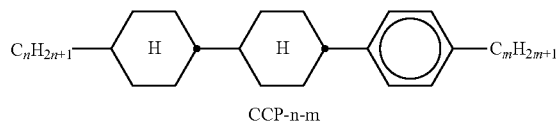
CCP-n-m
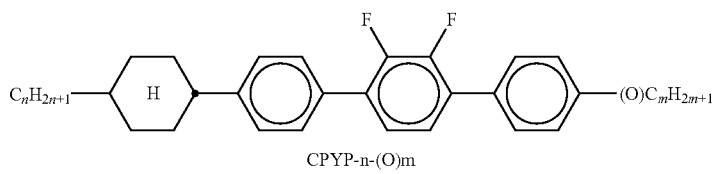
CPYP-n-(O)m
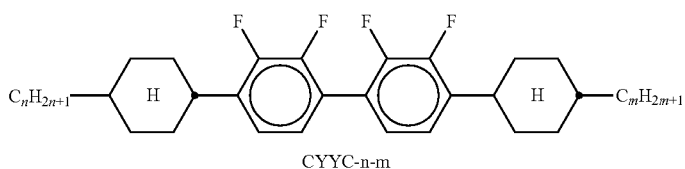
CYYC-n-m
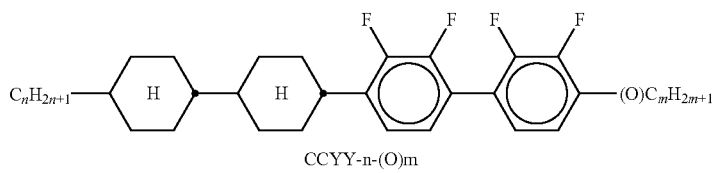
CCYY-n-(O)m
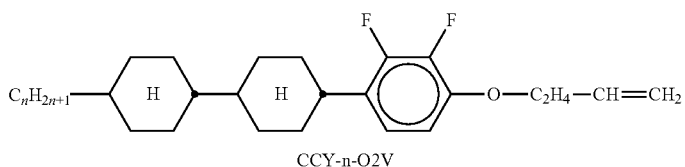
CCY-n-O2V TABLE A-continued
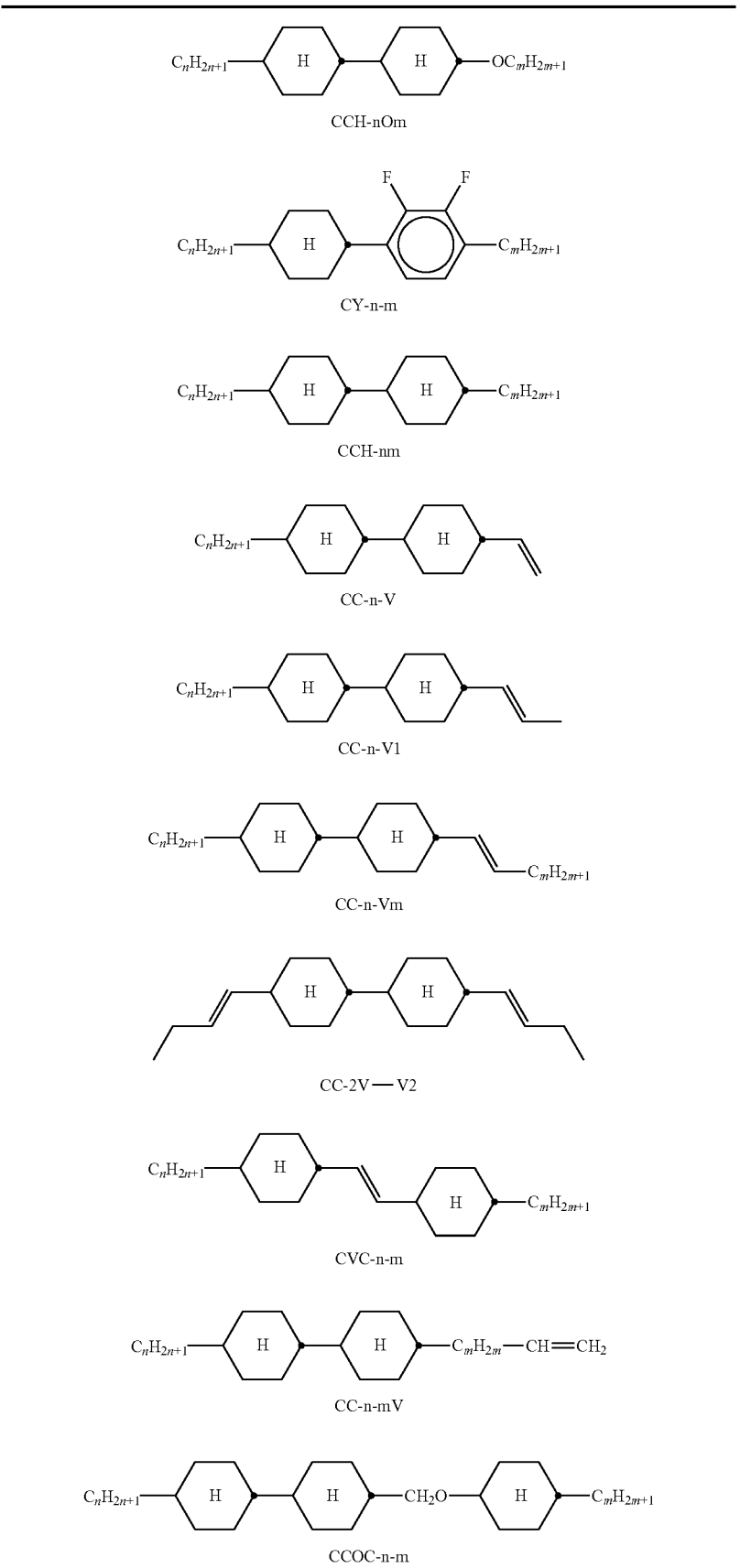

TABLE A-continued
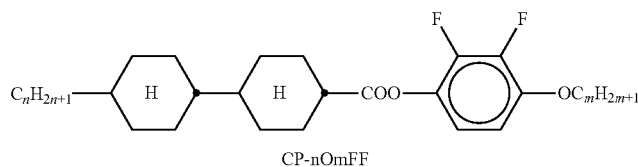
CP-nOmFF
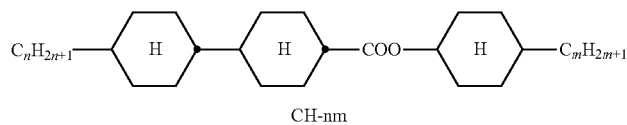
CH-nm
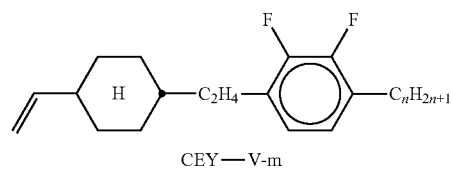
CEY—V-m
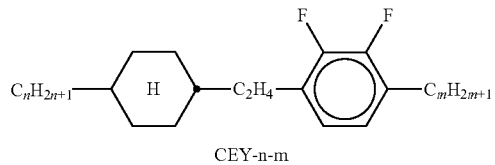
CEY-n-m
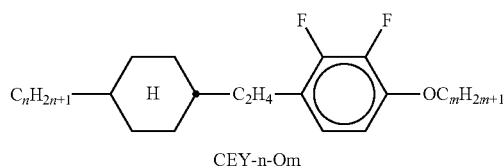
CEY-n-Om
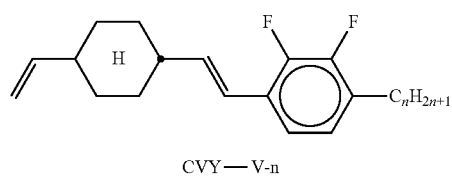
CVY—V-n
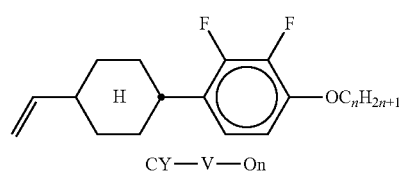
CY—V—On
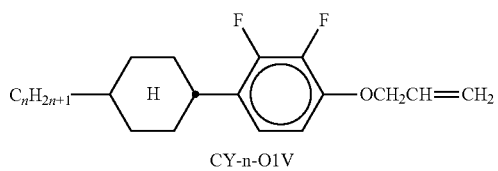
CY-n-O1V
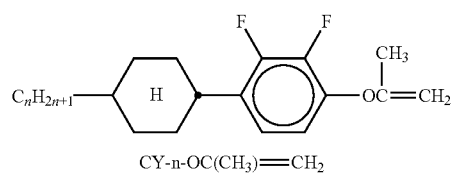
CY-n-OC(CH$_3$)=CH$_2$ TABLE A-continued
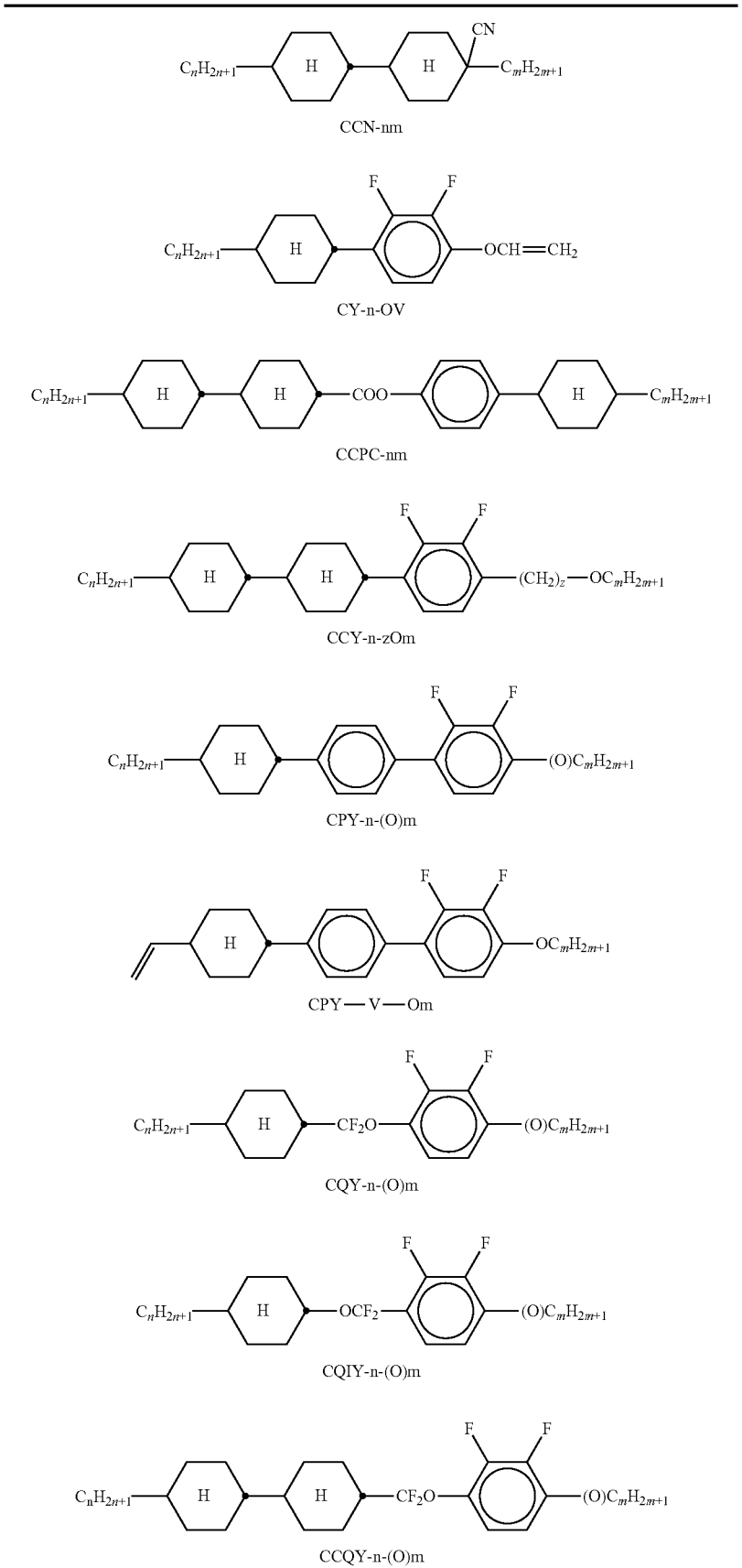

TABLE A-continued
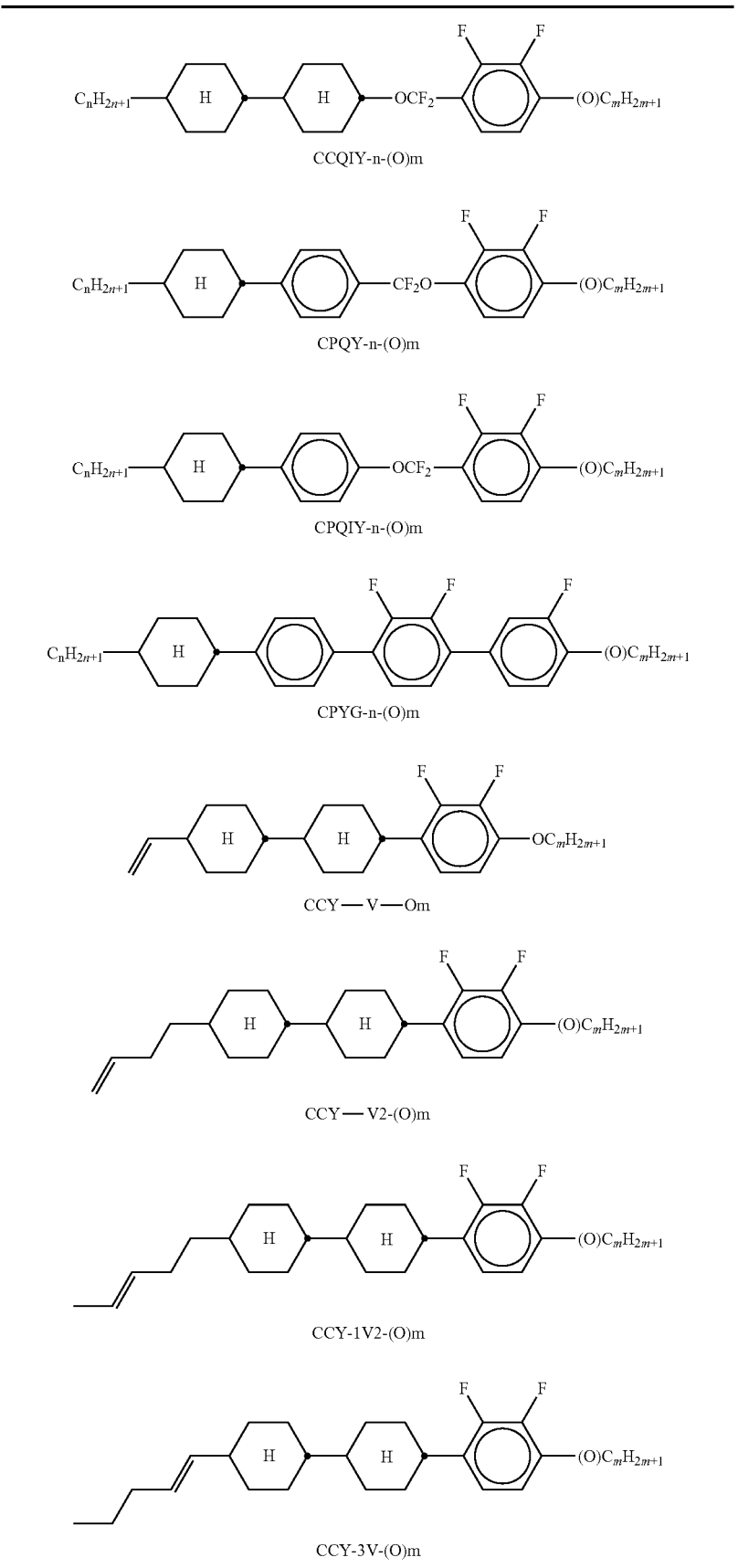

TABLE A-continued
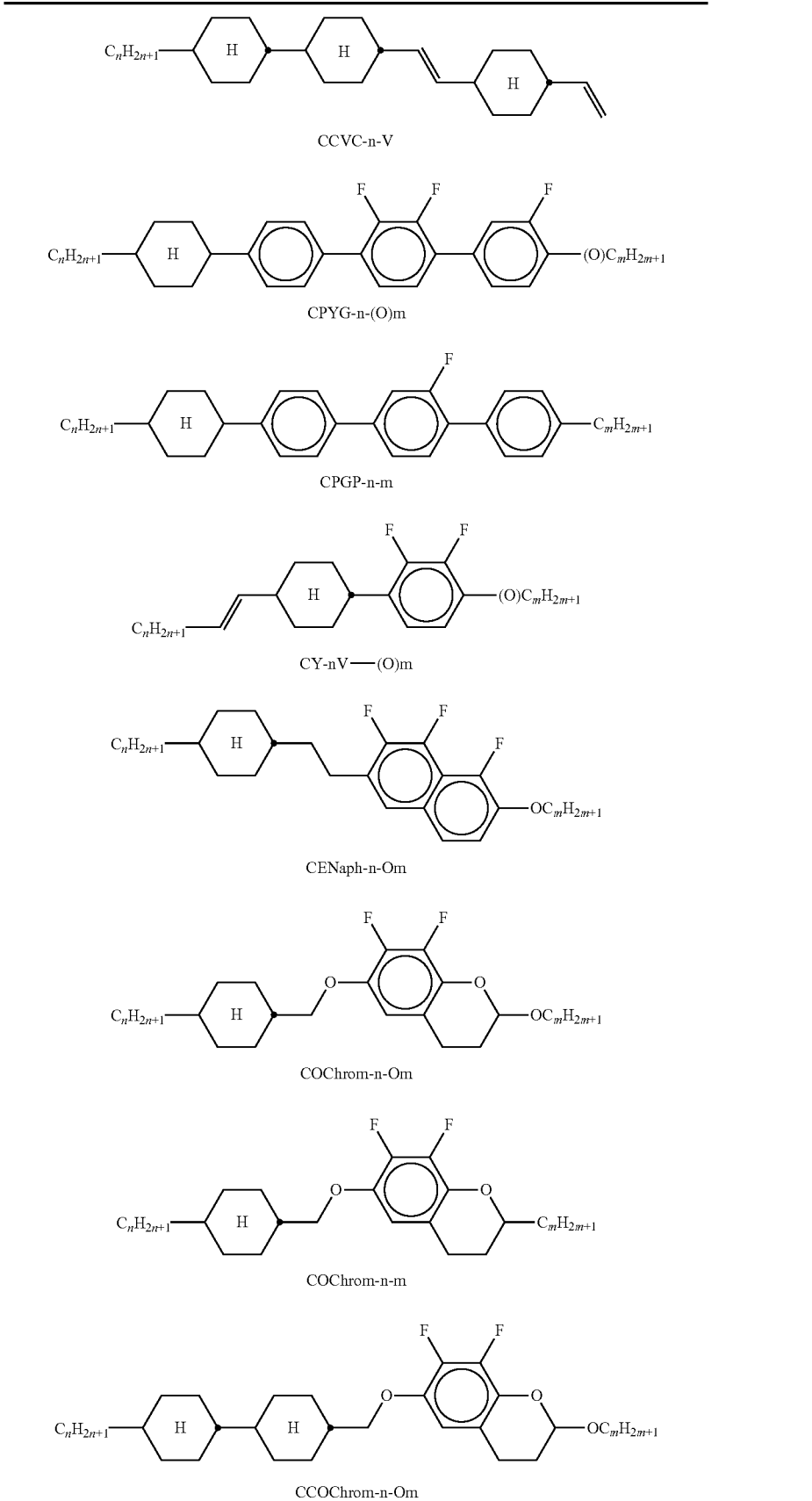

TABLE A-continued
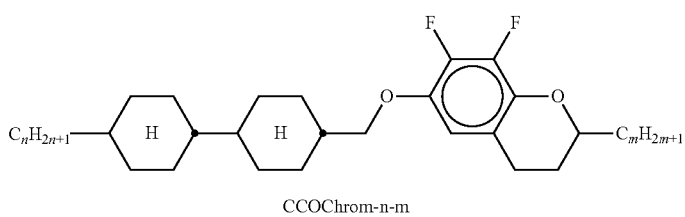
CCOChrom-n-m
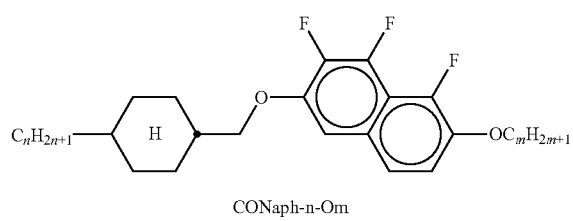
CONaph-n-Om
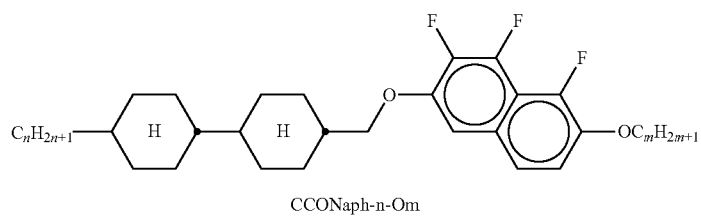
CCONaph-n-Om
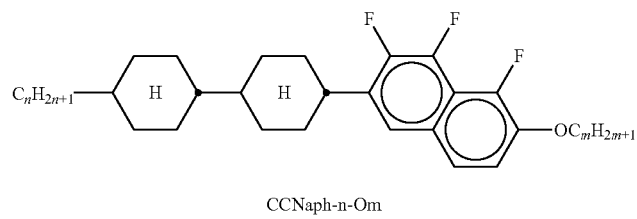
CCNaph-n-Om
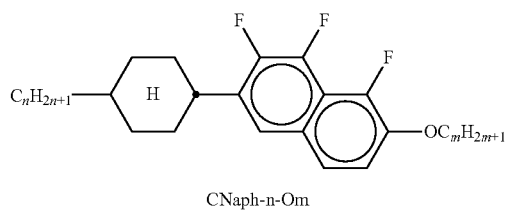
CNaph-n-Om
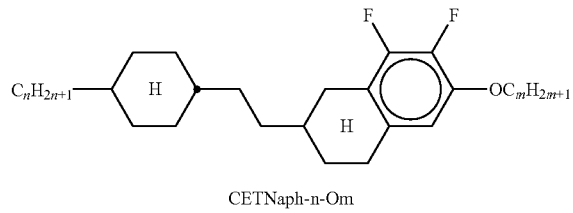
CETNaph-n-Om
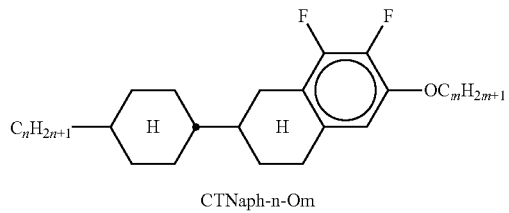
CTNaph-n-Om TABLE A-continued
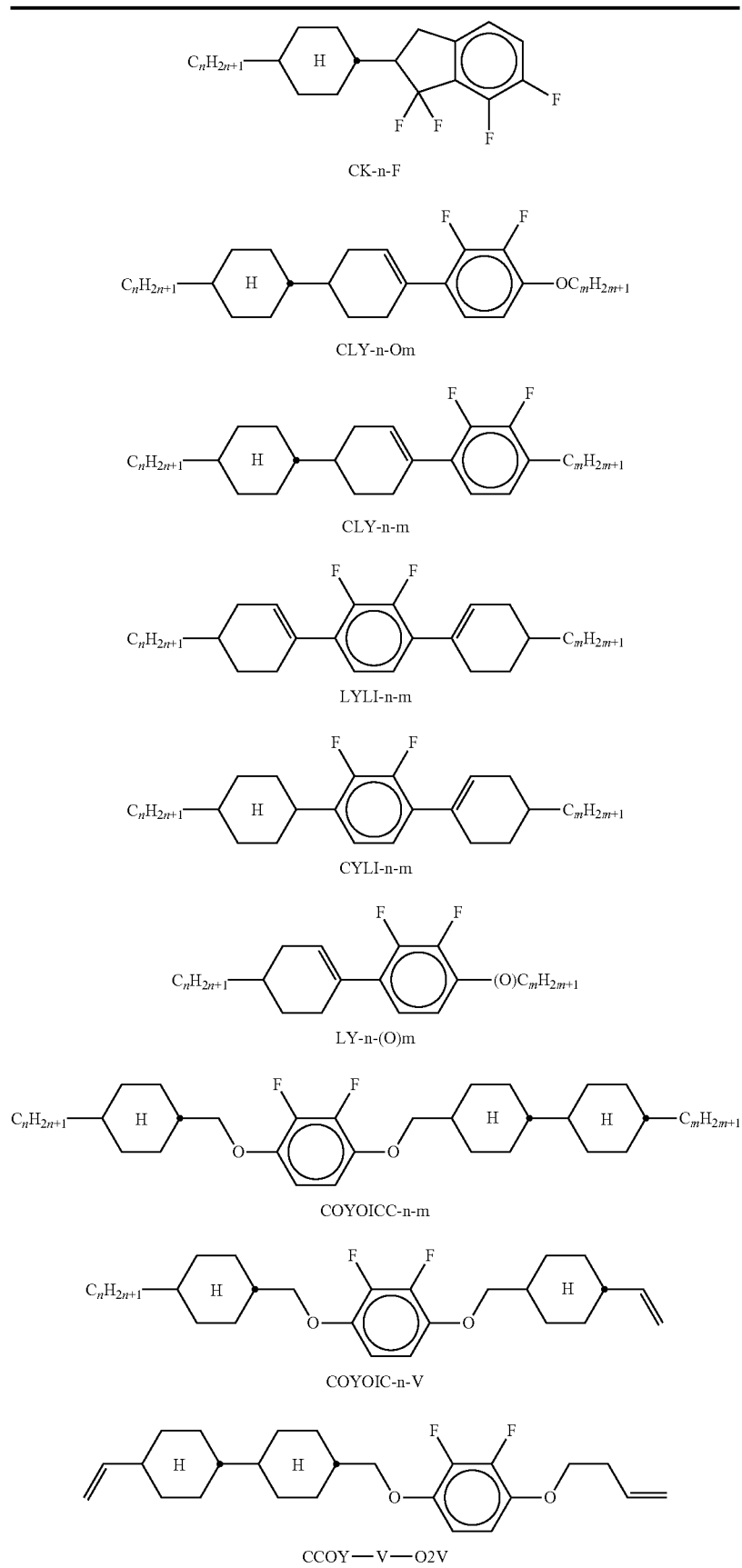

TABLE A-continued
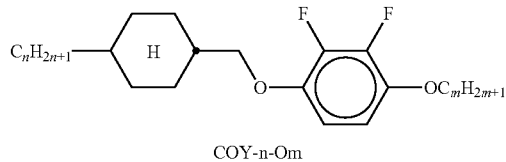
COY-n-Om
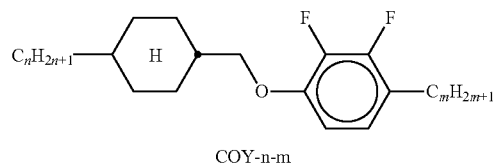
COY-n-m
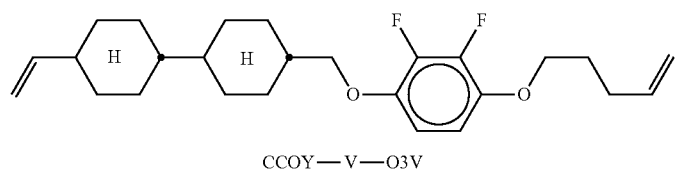
CCOY—V—O3V
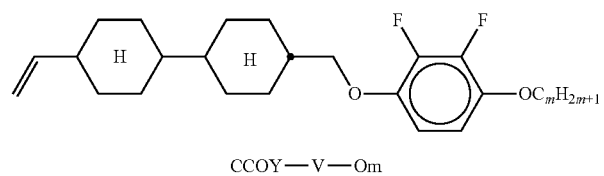
CCOY—V—Om
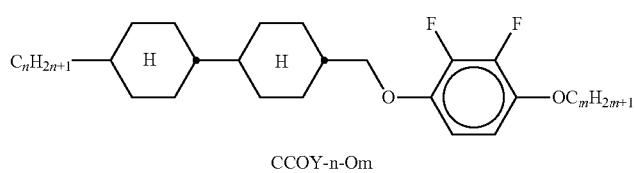
CCOY-n-Om
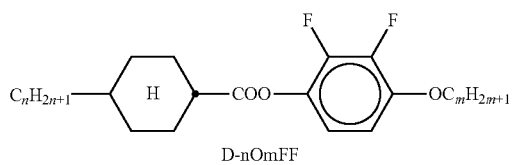
D-nOmFF
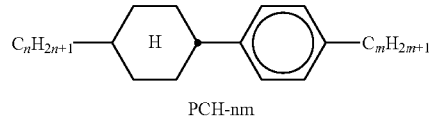
PCH-nm
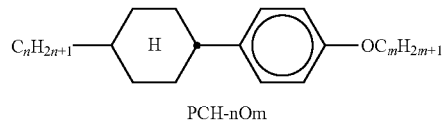
PCH-nOm
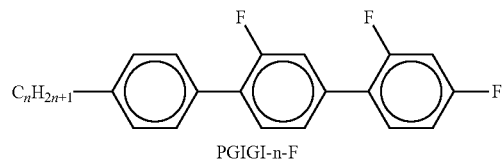
PGIGI-n-F TABLE A-continued
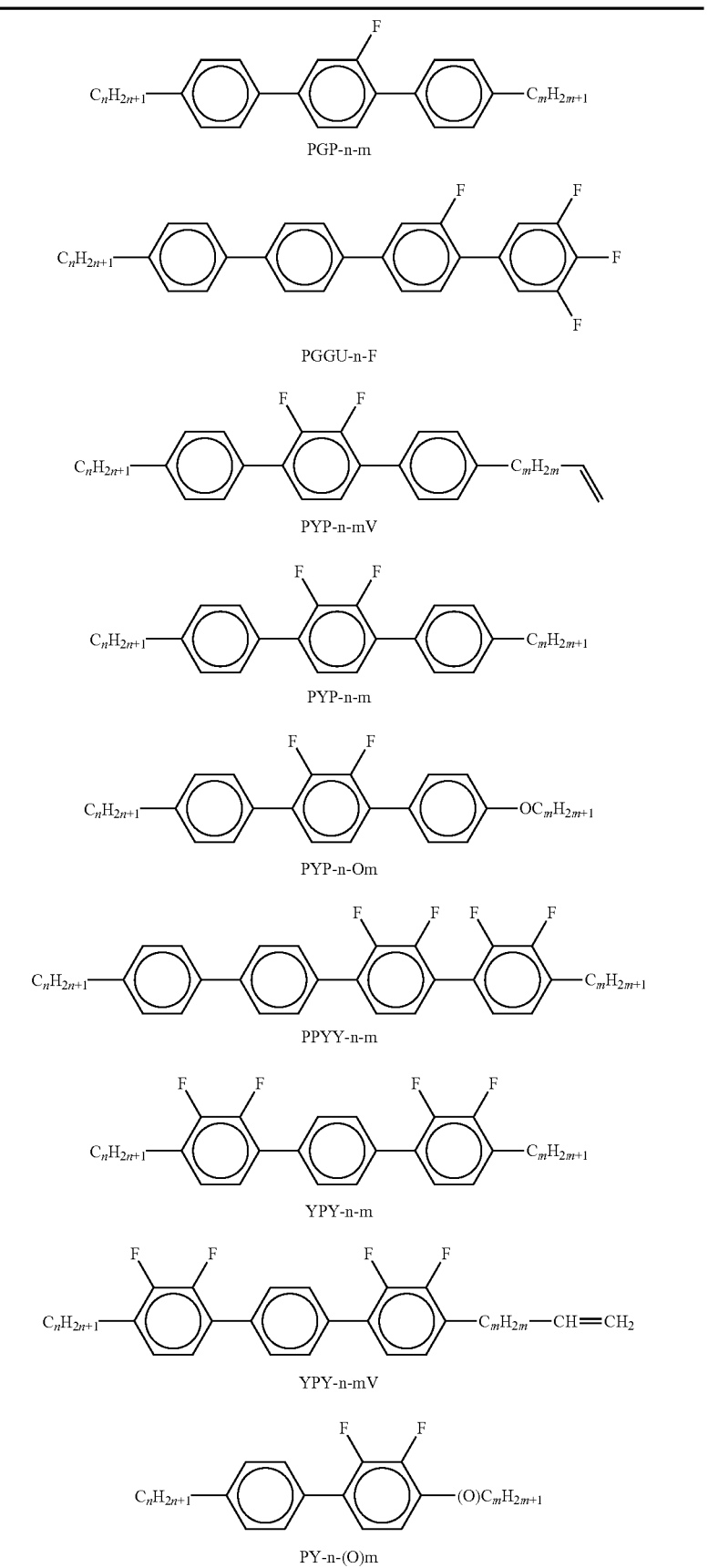

TABLE A-continued
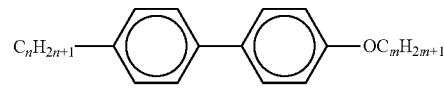
PP-n-Om
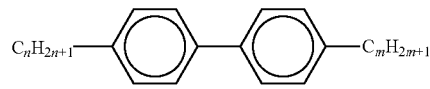
PP-n-m
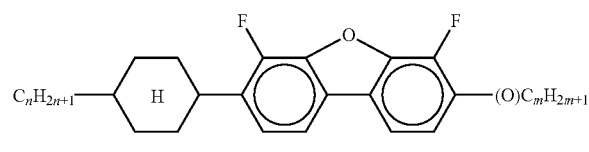
CB-n-(O)m
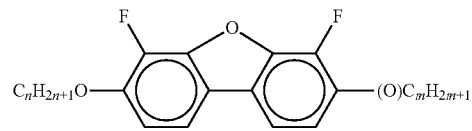
B-nO—(O)m
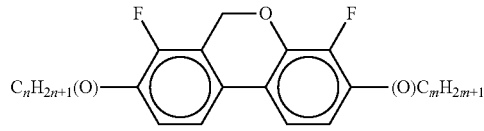
DFDBC-n(O)—(O)m
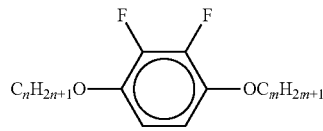
Y-nO—Om
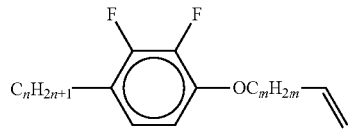
Y-nO—OmV
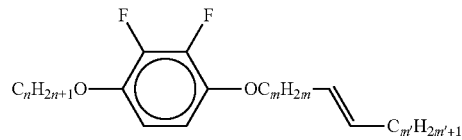
Y-nO—OmVm'
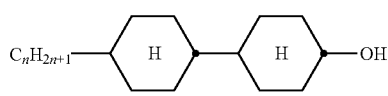
CC-n-O

TABLE A-continued

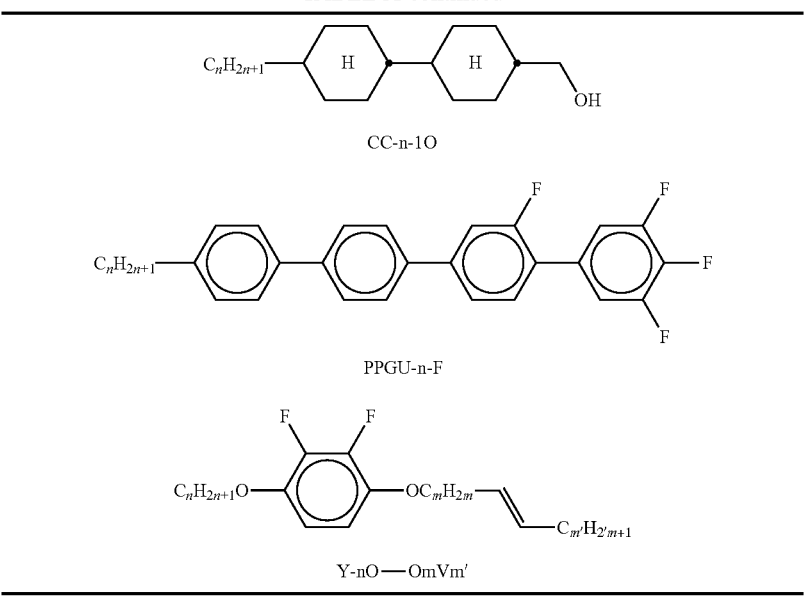

The liquid-crystal mixtures which can be used in accordance with the invention are prepared in a manner which is conventional per se. In general, the desired amount of the components used in lesser amount is dissolved in the components making up the principal constituent, advantageously at elevated temperature. It is also possible to mix solutions of the components in an organic solvent, for example in acetone, chloroform or methanol, and to remove the solvent again, for example by distillation, after thorough mixing.

By means of suitable additives, the liquid-crystal phases according to the invention can be modified in such a way that they can be employed in any type of, for example, ECB, VAN, GH or ASM-VA LCD display that has been disclosed to date.

The dielectrics may also comprise further additives known to the person skilled in the art and described in the literature, such as, for example, UV absorbers, antioxidants, nanoparticles and free-radical scavengers. For example, 0-15% of pleochroic dyes, stabilisers or chiral dopants may be added. Suitable stabilisers for the mixtures according to the invention are, in particular, those listed in Table B.

For example, 0-15% of pleochroic dyes may be added, furthermore conductive salts, preferably ethyldimethyldodecylammonium 4-hexoxybenzoate, tetrabutylammonium tetraphenylboranate or complex salts of crown ethers (cf., for example, Haller et al., Mol. Cryst. Liq. Cryst. Volume 24, pages 249-258 (1973)), may be added in order to improve the conductivity or substances may be added in order to modify the dielectric anisotropy, the viscosity and/or the alignment of the nematic phases. Substances of this type are described, for example, in DE-A 22 09 127, 22 40 864, 23 21 632, 23 38 281, 24 50 088, 26 37 430 and 28 53 728.

Table B shows possible dopants which can be added to the mixtures according to the invention. If the mixtures comprise a dopant, it is employed in amounts of 0.01-4% by weight, preferably 0.1-1.0% by weight.

TABLE B

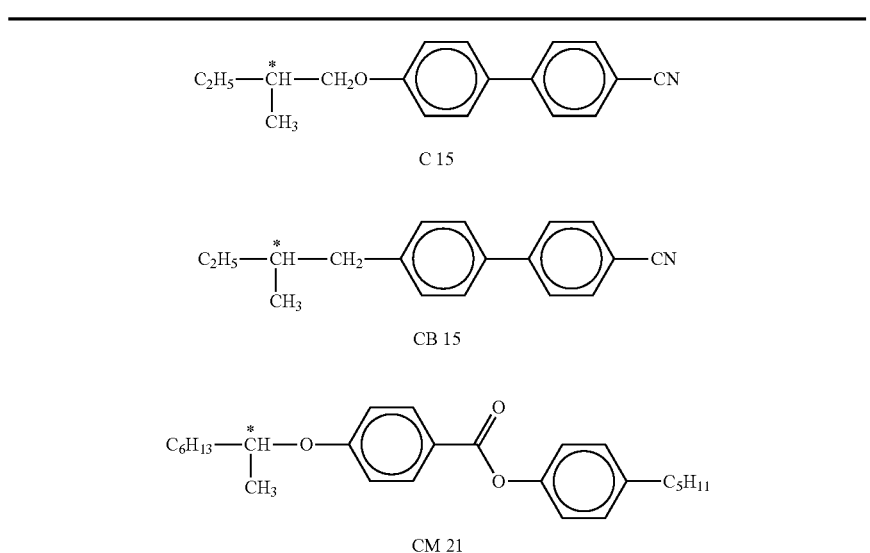

TABLE B-continued
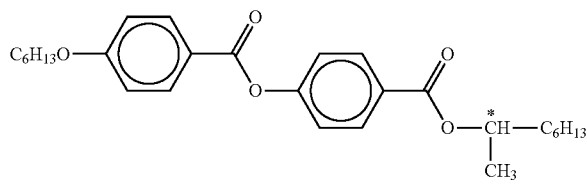
R/S-811
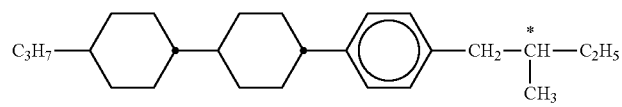
CM 44
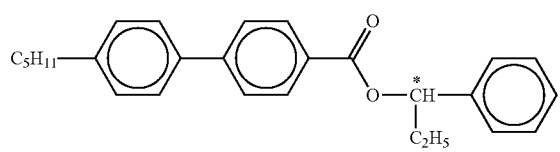
CM 45
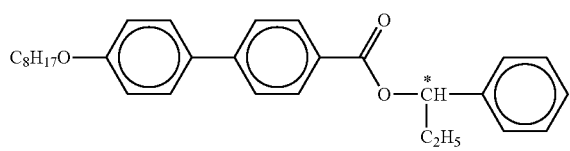
CM 47
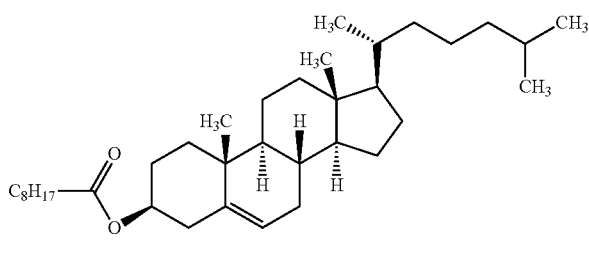
CN
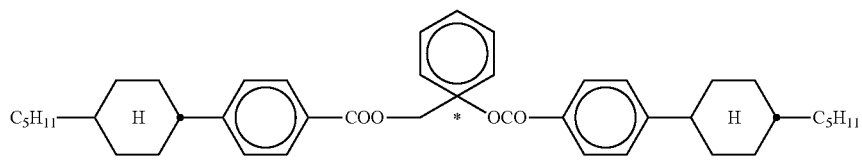
R/S-1011
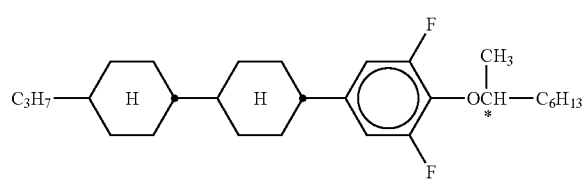
R/S-2011

TABLE B-continued

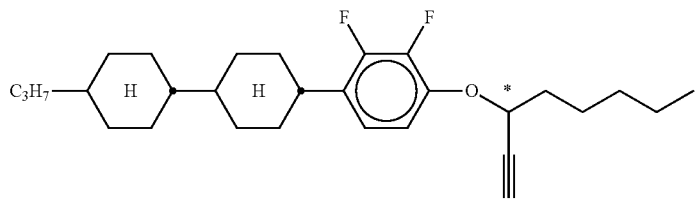

R/S-3011

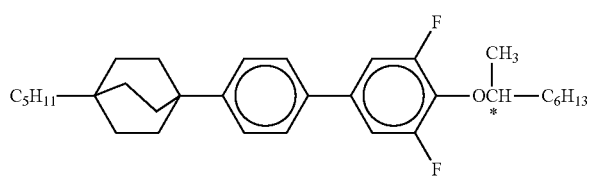

R/S-4011

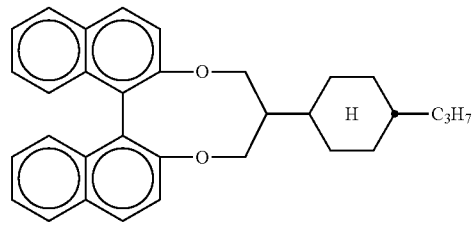

R/S-5011

Stabilisers which can be added, for example, to the mixtures according to the invention in amounts of up to 10% by weight, based on the total amount of the mixture, preferably 0.01 to 6% by weight, in particular 0.1 to 3% by weight, are shown below in Table C. Preferred stabilisers are, in particular, BHT derivatives, for example 2,6-di-tert-butyl-4-alkylphenols, and Tinuvin 770.

TABLE C

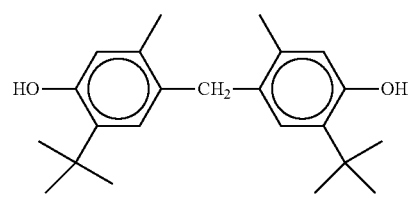

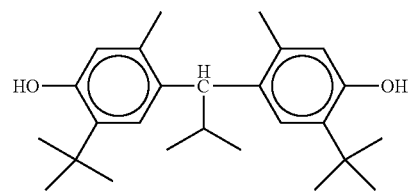

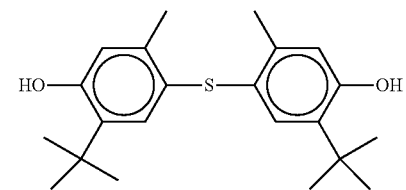

TABLE C-continued
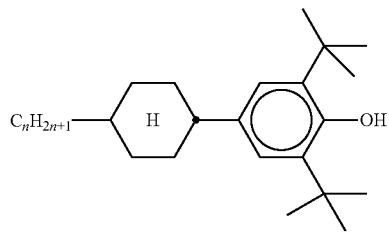
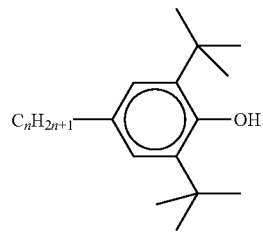
n is preferably 1, 2, 3, 4, 5, 6 or 7
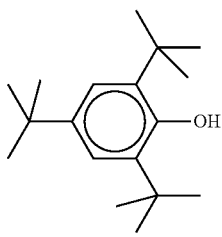
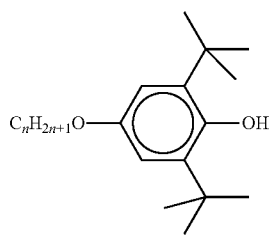
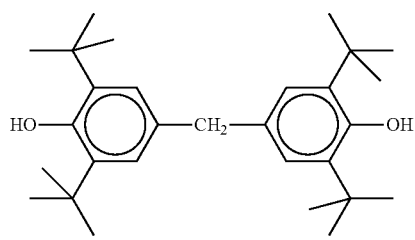
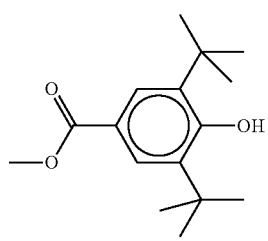

TABLE C-continued
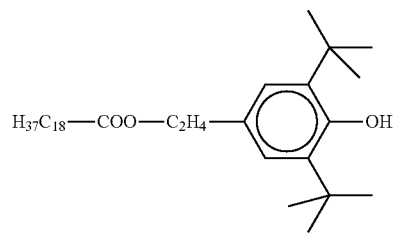
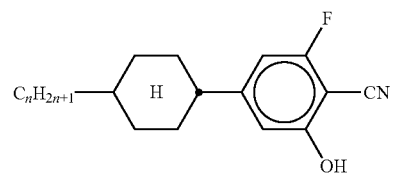
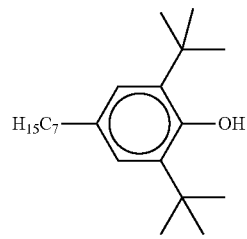
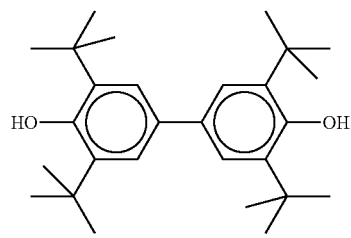
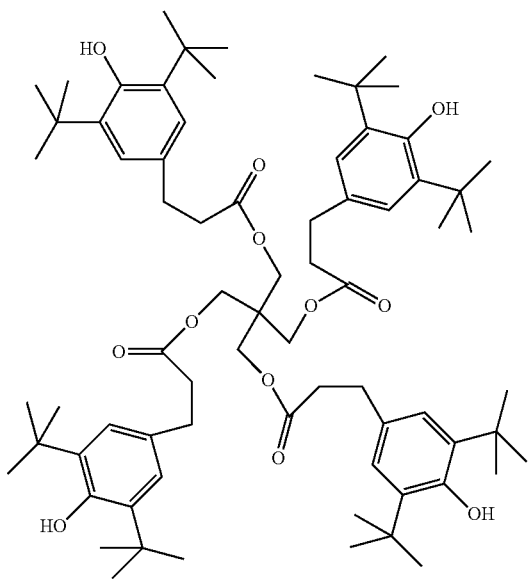 [SMILES: CC(C)(C)c1cc(CCC(=O)OCC(COC(=O)CCc2cc(C(C)(C)C)c(O)c(C(C)(C)C)c2)(COC(=O)CCc2cc(C(C)(C)C)c(O)c(C(C)(C)C)c2)COC(=O)CCc2cc(C(C)(C)C)c(O)c(C(C)(C)C)c2)cc(C(C)(C)C)c1O]

TABLE C-continued
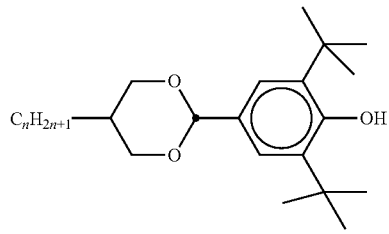
n = 1, 2, 3, 4, 5, 6 or 7
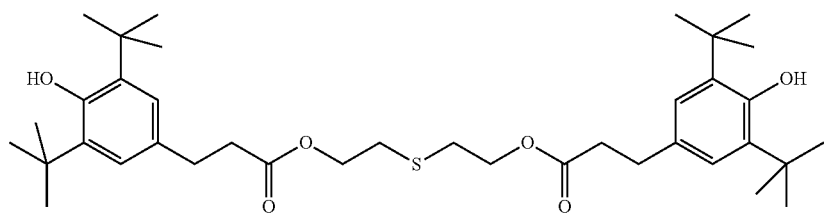 [SMILES: CC(C)(C)c1cc(CCC(=O)OCCSCCOC(=O)CCc2cc(C(C)(C)C)c(O)c(C(C)(C)C)c2)cc(C(C)(C)C)c1O]
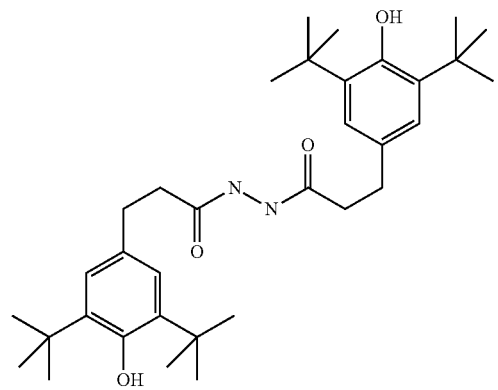 [SMILES: CC(C)(C)c1cc(CCC(=O)NNC(=O)CCc2cc(C(C)(C)C)c(O)c(C(C)(C)C)c2)cc(C(C)(C)C)c1O]
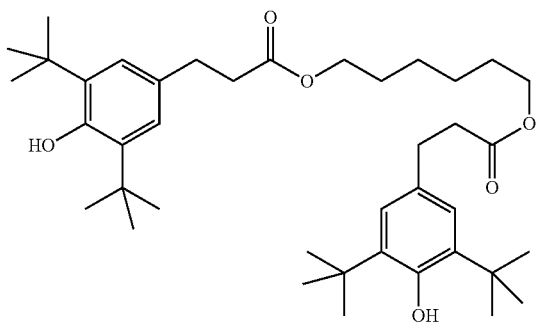 [SMILES: CC(C)(C)c1cc(CCC(=O)OCCCCCCOC(=O)CCc2cc(C(C)(C)C)c(O)c(C(C)(C)C)c2)cc(C(C)(C)C)c1O]
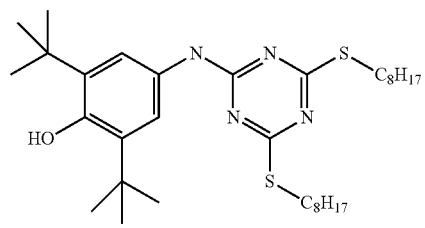

TABLE C-continued
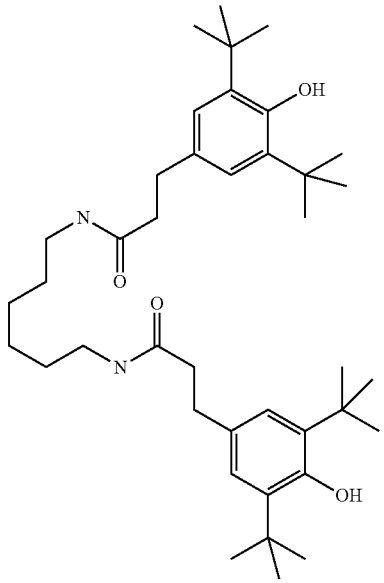 [SMILES: CC(C)(C)c1cc(CCC(=O)NCCCCCCNC(=O)CCc2cc(C(C)(C)C)c(O)c(C(C)(C)C)c2)cc(C(C)(C)C)c1O]
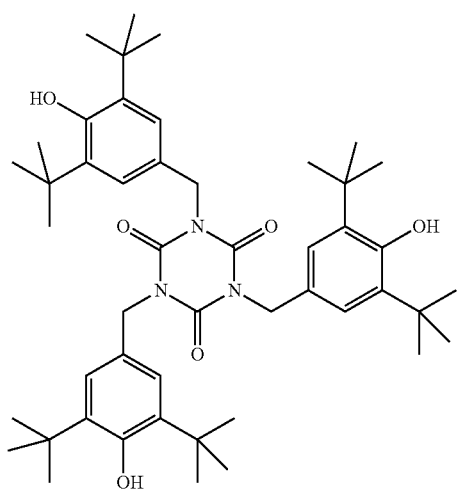 [SMILES: CC(C)(C)c1cc(Cn2c(=O)n(Cc3cc(C(C)(C)C)c(O)c(C(C)(C)C)c3)c(=O)n(Cc3cc(C(C)(C)C)c(O)c(C(C)(C)C)c3)c2=O)cc(C(C)(C)C)c1O]
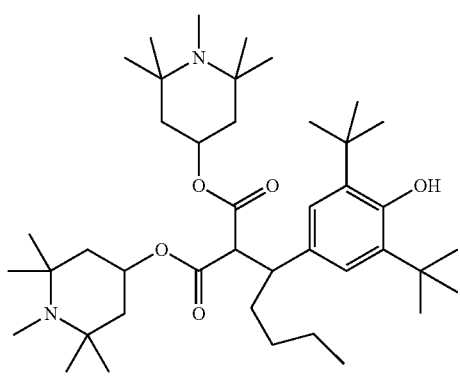 [SMILES: CCCCC(c1cc(C(C)(C)C)c(O)c(C(C)(C)C)c1)C(C(=O)OC1CC(C)(C)N(C)C(C)(C)C1)C(=O)OC1CC(C)(C)N(C)C(C)(C)C1]

TABLE C-continued
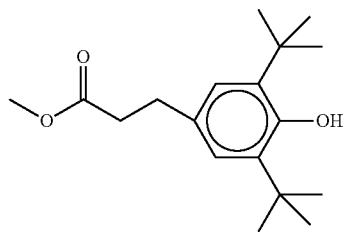
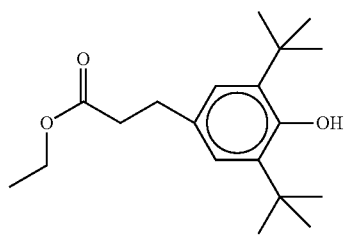
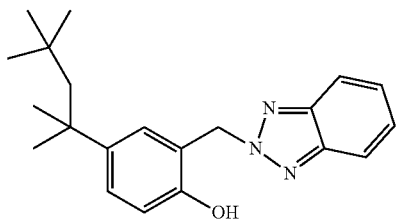 [SMILES: CC(C)(C)CC(C)(C)c1ccc(O)c(Cn2nc3ccccc3n2)c1]
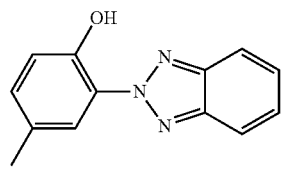 [SMILES: Cc1ccc(O)c(-n2nc3ccccc3n2)c1]
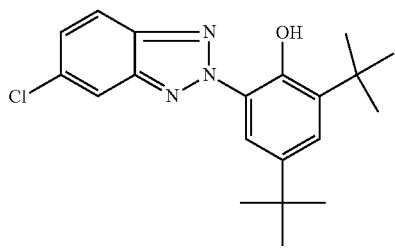 [SMILES: CC(C)(C)c1cc(-n2nc3ccc(Cl)cc3n2)c(O)c(C(C)(C)C)c1]
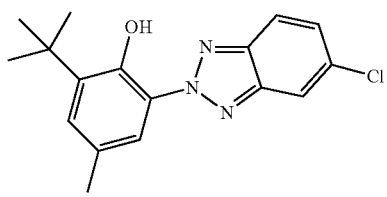 [SMILES: Cc1cc(-n2nc3ccc(Cl)cc3n2)c(O)c(C(C)(C)C)c1]

TABLE C-continued
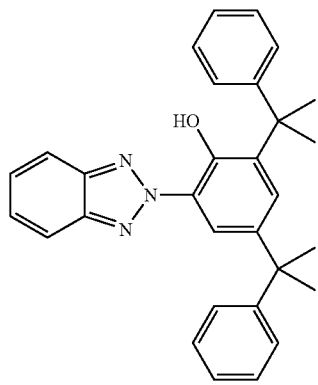 [SMILES: CC(C)(c1ccccc1)c1cc(-n2nc3ccccc3n2)c(O)c(C(C)(C)c2ccccc2)c1]
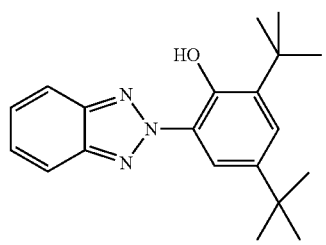 [SMILES: CC(C)(C)c1cc(-n2nc3ccccc3n2)c(O)c(C(C)(C)C)c1]
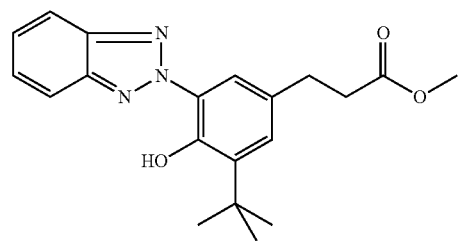 [SMILES: COC(=O)CCc1cc(-n2nc3ccccc3n2)c(O)c(C(C)(C)C)c1]
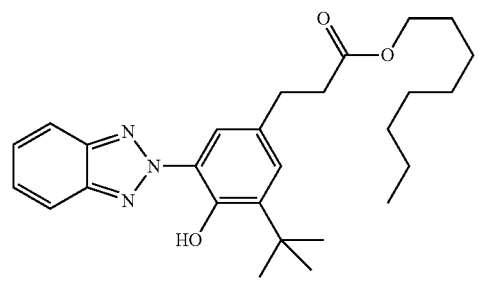 [SMILES: CCCCCCCCOC(=O)CCc1cc(-n2nc3ccccc3n2)c(O)c(C(C)(C)C)c1]

TABLE C-continued
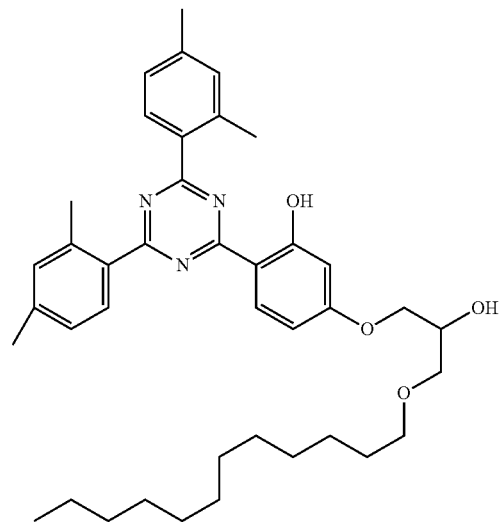 [SMILES: CCCCCCCCCCCCOCC(O)COc1ccc(-c2nc(-c3ccc(C)cc3C)nc(-c3ccc(C)cc3C)n2)c(O)c1]
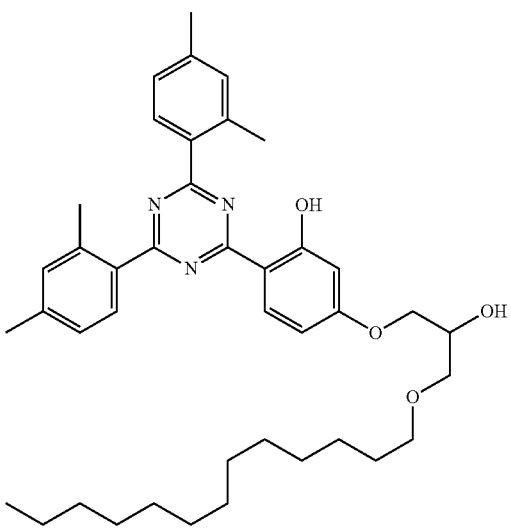 [SMILES: CCCCCCCCCCCCCOCC(O)COc1ccc(-c2nc(-c3ccc(C)cc3C)nc(-c3ccc(C)cc3C)n2)c(O)c1]
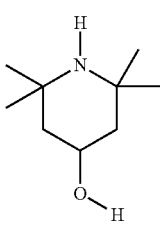
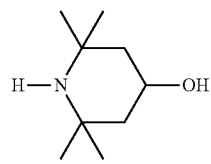
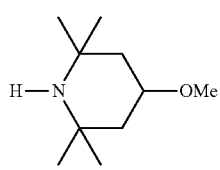

TABLE C-continued
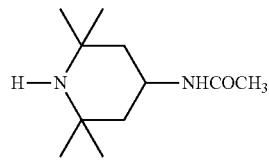
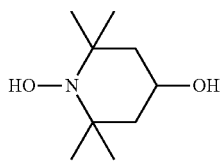
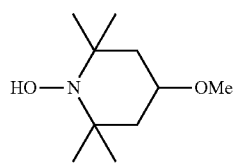
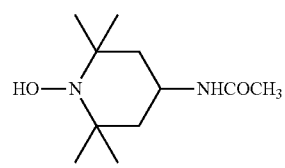
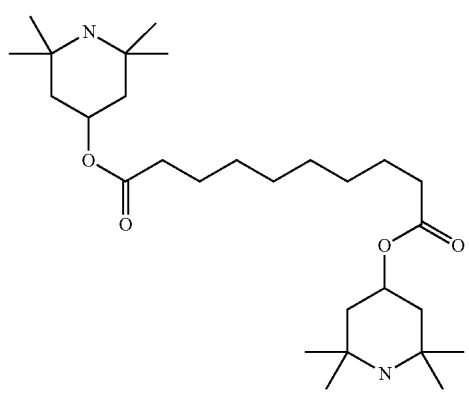
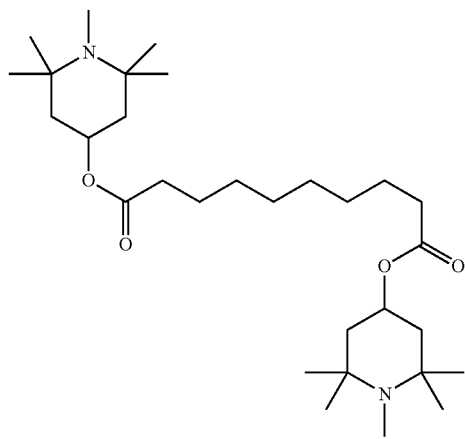

TABLE C-continued
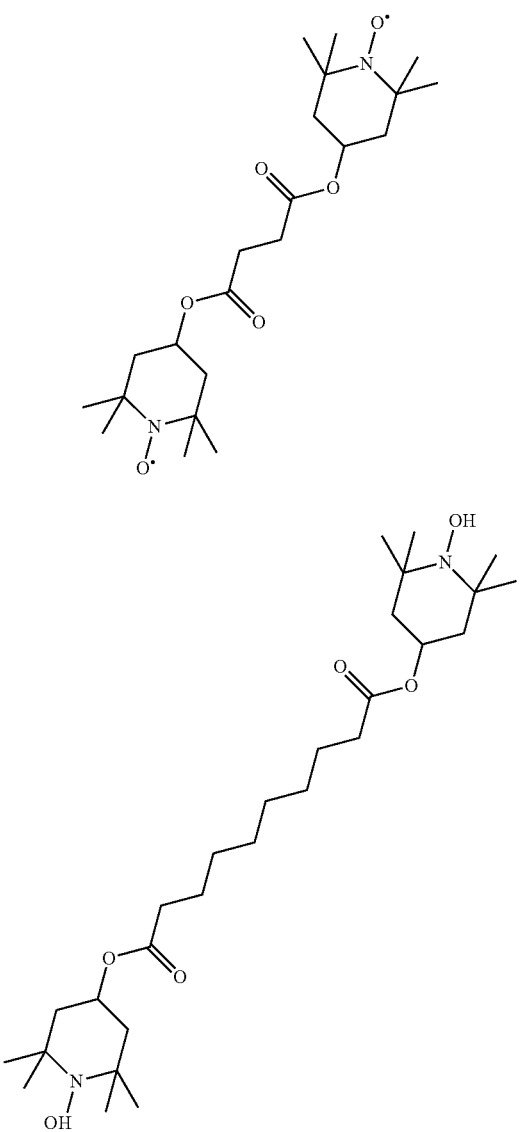
(n denotes 1-12)
TABLE D
Suitable reactive mesogens for use in the mixtures according to the invention, preferably in PSA and PS-VA applications are shown below:
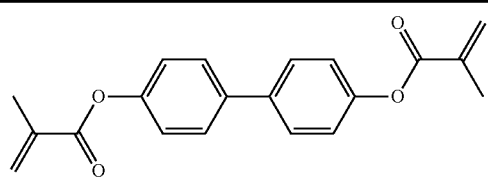
RM-1
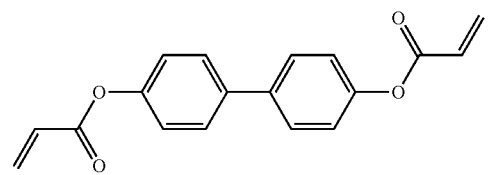 [SMILES: C=CC(=O)Oc1ccc(-c2ccc(OC(=O)C=C)cc2)cc1]
RM-2

TABLE D-continued
Suitable reactive mesogens for use in the mixtures according to the invention, preferably in PSA and PS-VA applications are shown below:
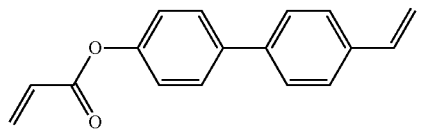 [SMILES: C=CC(=O)Oc1ccc(-c2ccc(C=C)cc2)cc1] RM-3
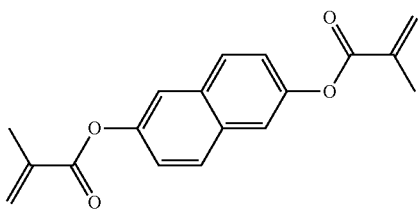 [SMILES: C=C(C)C(=O)Oc1ccc2cc(OC(=O)C(=C)C)ccc2c1] RM-4
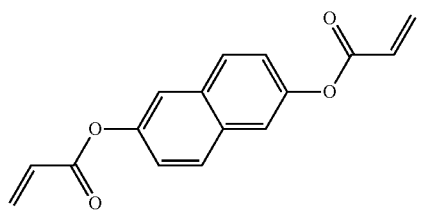 [SMILES: C=CC(=O)Oc1ccc2cc(OC(=O)C=C)ccc2c1] RM-5
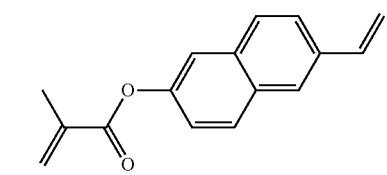 [SMILES: C=Cc1ccc2cc(OC(=O)C(=C)C)ccc2c1] RM-6
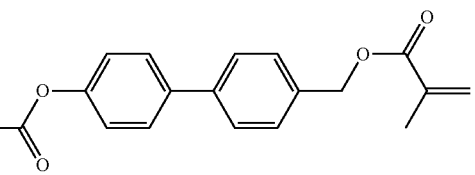 RM-7
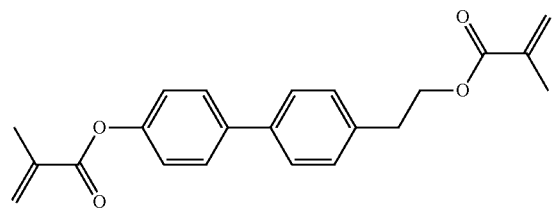 [SMILES: C=C(C)C(=O)OCCc1ccc(-c2ccc(OC(=O)C(=C)C)cc2)cc1] RM-8
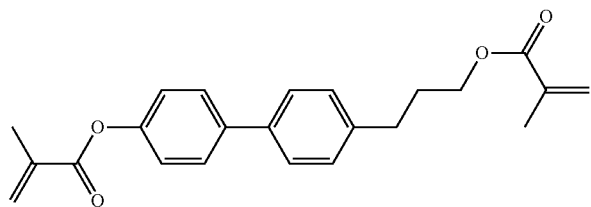 [SMILES: C=C(C)C(=O)OCCCc1ccc(-c2ccc(OC(=O)C(=C)C)cc2)cc1] RM-9
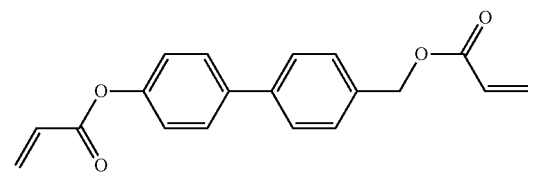 [SMILES: C=CC(=O)OCc1ccc(-c2ccc(OC(=O)C=C)cc2)cc1] RM-10

TABLE D-continued
Suitable reactive mesogens for use in the mixtures according to the invention, preferably in PSA and PS-VA applications are shown below:
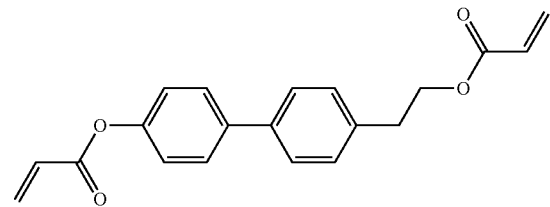 [SMILES: C=CC(=O)OCCc1ccc(-c2ccc(OC(=O)C=C)cc2)cc1] RM-11
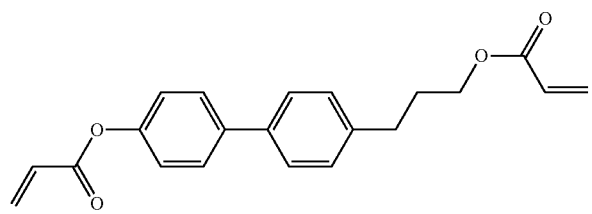 [SMILES: C=CC(=O)OCCCc1ccc(-c2ccc(OC(=O)C=C)cc2)cc1] RM-12
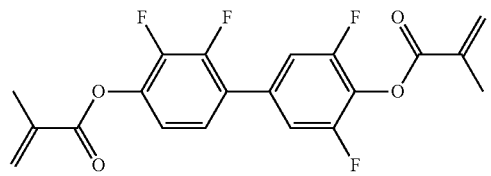 [SMILES: C=C(C)C(=O)Oc1ccc(-c2cc(F)c(OC(=O)C(=C)C)c(F)c2)c(F)c1F] RM-13
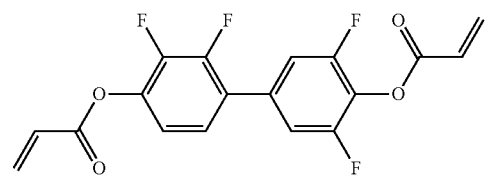 [SMILES: C=CC(=O)Oc1ccc(-c2cc(F)c(OC(=O)C=C)c(F)c2)c(F)c1F] RM-14
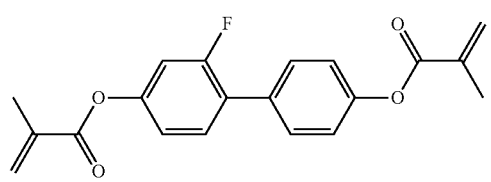 [SMILES: C=C(C)C(=O)Oc1ccc(-c2ccc(OC(=O)C(=C)C)cc2F)cc1] RM-15
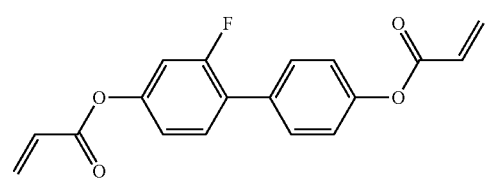 [SMILES: C=CC(=O)Oc1ccc(-c2ccc(OC(=O)C=C)cc2F)cc1] RM-16
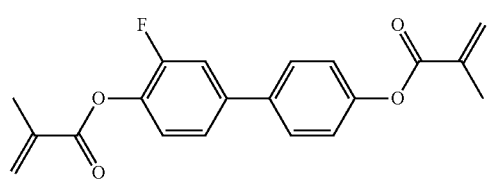 [SMILES: C=C(C)C(=O)Oc1ccc(-c2ccc(OC(=O)C(=C)C)c(F)c2)cc1] RM-17
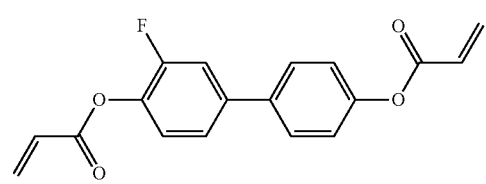 [SMILES: C=CC(=O)Oc1ccc(-c2ccc(OC(=O)C=C)c(F)c2)cc1] RM-18

TABLE D-continued
Suitable reactive mesogens for use in the mixtures according to the invention, preferably in PSA and PS-VA applications are shown below:
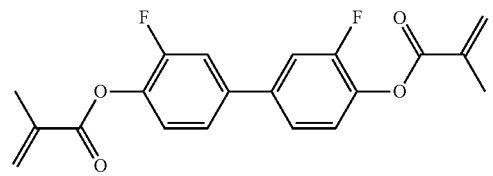 [SMILES: C=C(C)C(=O)Oc1ccc(-c2ccc(OC(=O)C(=C)C)c(F)c2)cc1F] RM-19
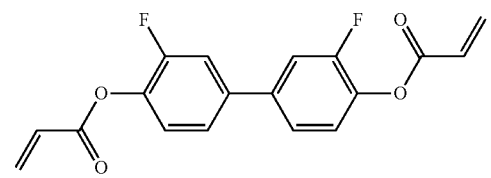 [SMILES: C=CC(=O)Oc1ccc(-c2ccc(OC(=O)C=C)c(F)c2)cc1F] RM-20
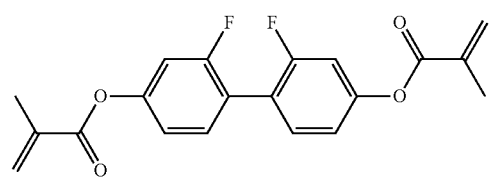 [SMILES: C=C(C)C(=O)Oc1ccc(-c2ccc(OC(=O)C(=C)C)cc2F)c(F)c1] RM-21
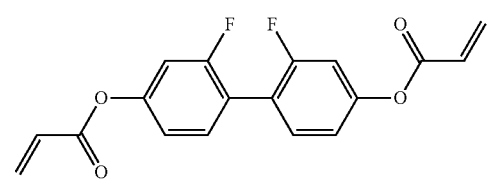 [SMILES: C=CC(=O)Oc1ccc(-c2ccc(OC(=O)C=C)cc2F)c(F)c1] RM-22
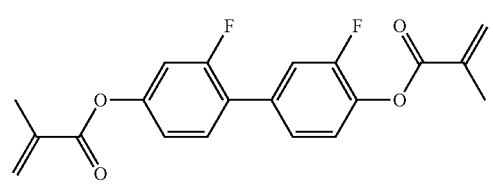 RM-23
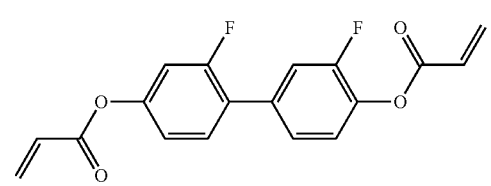 RM-24
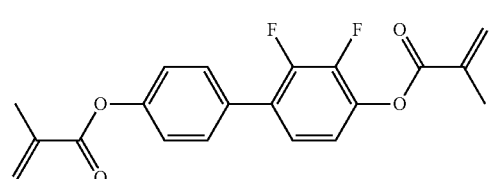 RM-25
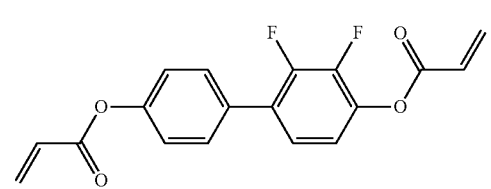 RM-26

TABLE D-continued
Suitable reactive mesogens for use in the mixtures according to the invention, preferably in PSA and PS-VA applications are shown below:
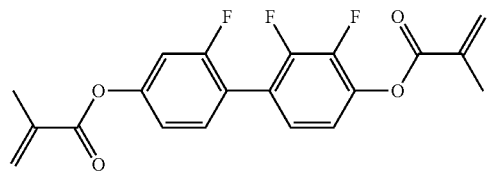 [SMILES: C=C(C)C(=O)Oc1ccc(-c2ccc(OC(=O)C(=C)C)c(F)c2F)c(F)c1] RM-27
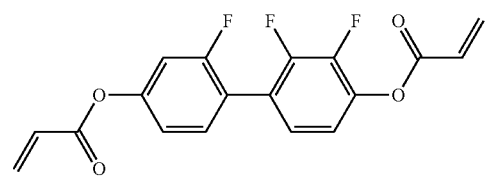 RM-28
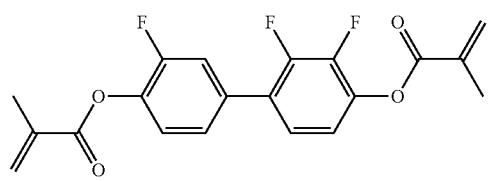 [SMILES: C=C(C)C(=O)Oc1ccc(-c2ccc(OC(=O)C(=C)C)c(F)c2F)cc1F] RM-29
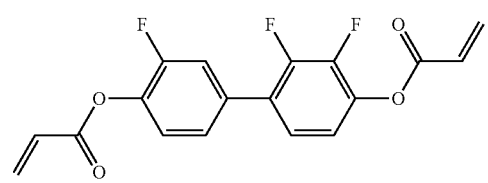 [SMILES: C=CC(=O)Oc1ccc(-c2ccc(OC(=O)C=C)c(F)c2F)cc1F] RM-30
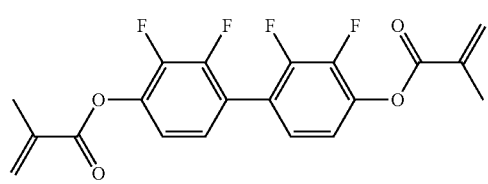 [SMILES: C=C(C)C(=O)Oc1ccc(-c2ccc(OC(=O)C(=C)C)c(F)c2F)c(F)c1F] RM-31
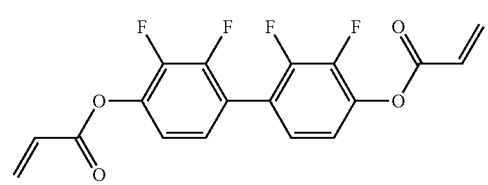 RM-32
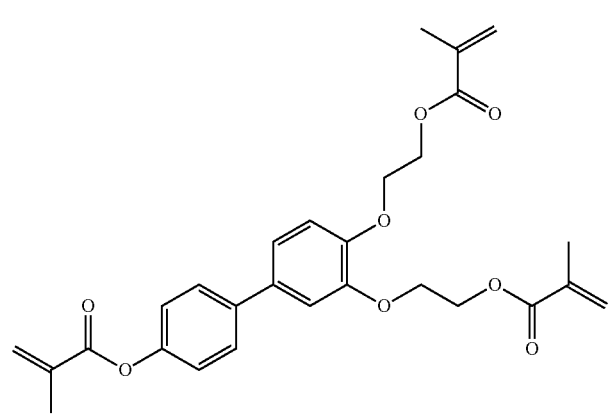 [SMILES: C=C(C)C(=O)OCCOc1ccc(-c2ccc(OC(=O)C(=C)C)cc2)cc1OCCOC(=O)C(=C)C] RM-33

TABLE D-continued
Suitable reactive mesogens for use in the mixtures according to the invention, preferably in PSA and PS-VA applications are shown below:
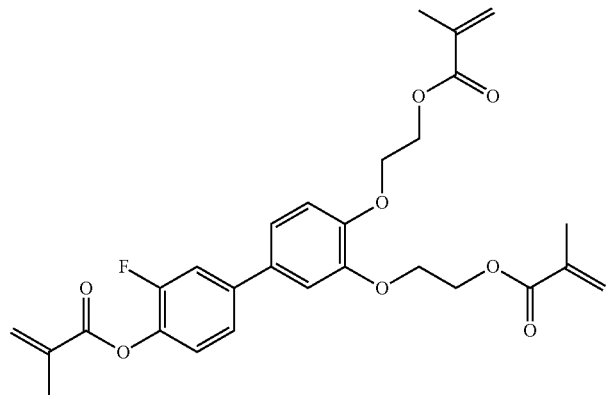 [SMILES: C=C(C)C(=O)OCCOc1ccc(-c2ccc(OC(=O)C(=C)C)c(F)c2)cc1OCCOC(=O)C(=C)C]
RM-34
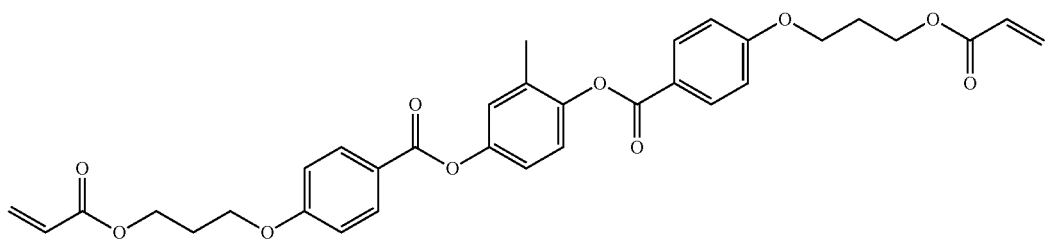 [SMILES: C=CC(=O)OCCCOc1ccc(C(=O)Oc2ccc(OC(=O)c3ccc(OCCCOC(=O)C=C)cc3)c(C)c2)cc1]
RM-35
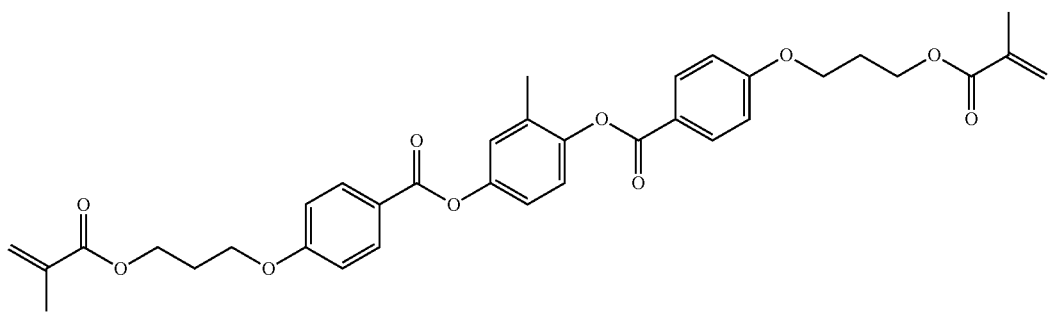 [SMILES: C=C(C)C(=O)OCCCOc1ccc(C(=O)Oc2ccc(OC(=O)c3ccc(OCCCOC(=O)C(=C)C)cc3)c(C)c2)cc1]
RM-36
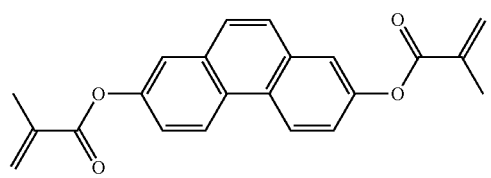
RM-37
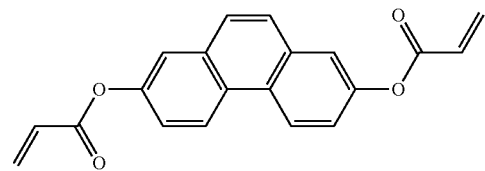 [SMILES: C=CC(=O)Oc1ccc2c(ccc3cc(OC(=O)C=C)ccc32)c1]
RM-38
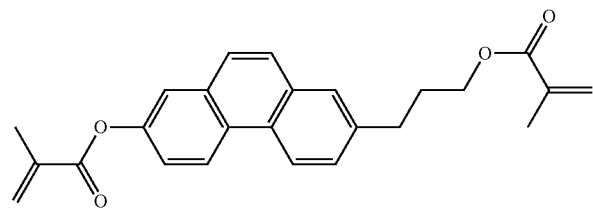 [SMILES: C=C(C)C(=O)OCCCc1ccc2c(ccc3cc(OC(=O)C(=C)C)ccc32)c1]
RM-39

TABLE D-continued
Suitable reactive mesogens for use in the mixtures according to the invention, preferably in PSA and PS-VA applications are shown below:
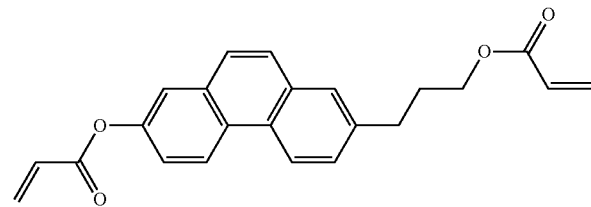 [SMILES: C=CC(=O)OCCCc1ccc2c(ccc3cc(OC(=O)C=C)ccc32)c1] RM-40
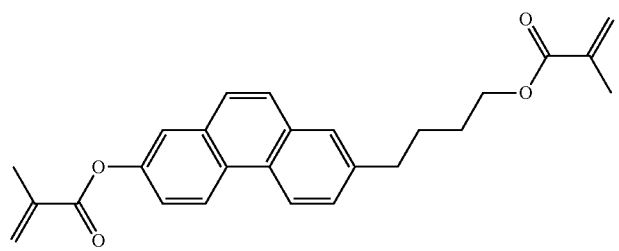 [SMILES: C=C(C)C(=O)OCCCCc1ccc2c(ccc3cc(OC(=O)C(=C)C)ccc32)c1] RM-41
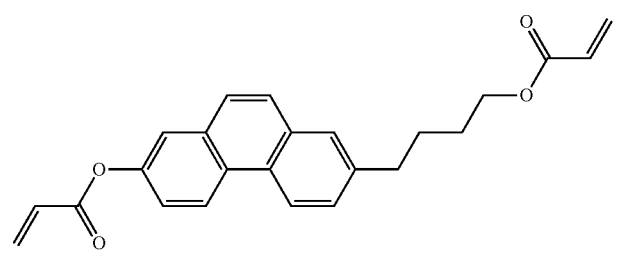 [SMILES: C=CC(=O)OCCCCc1ccc2c(ccc3cc(OC(=O)C=C)ccc32)c1] RM-42
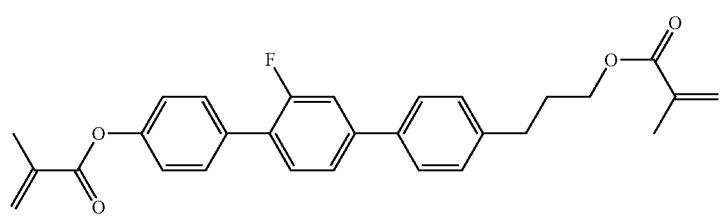 RM-43
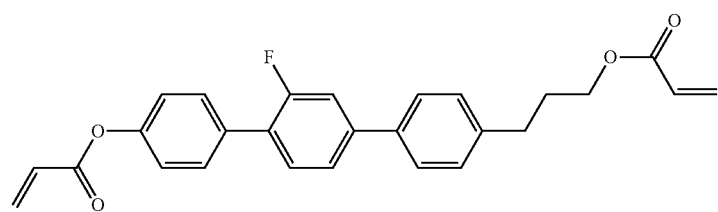 [SMILES: C=CC(=O)OCCCc1ccc(-c2ccc(-c3ccc(OC(=O)C=C)cc3)c(F)c2)cc1] RM-44
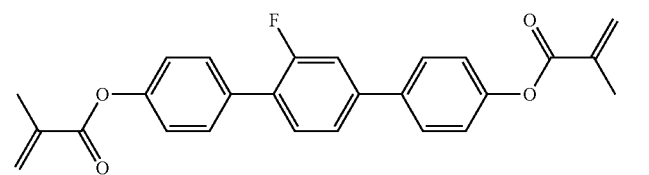 [SMILES: C=C(C)C(=O)Oc1ccc(-c2ccc(-c3ccc(OC(=O)C(=C)C)cc3)c(F)c2)cc1] RM-45
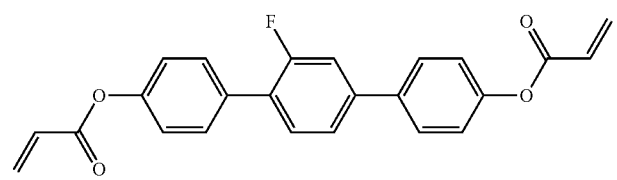 RM-46

TABLE D-continued
Suitable reactive mesogens for use in the mixtures according to the invention, preferably in PSA and PS-VA applications are shown below:
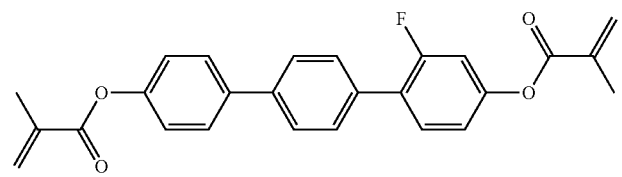 [SMILES: C=C(C)C(=O)Oc1ccc(-c2ccc(-c3ccc(OC(=O)C(=C)C)cc3F)cc2)cc1] RM-47
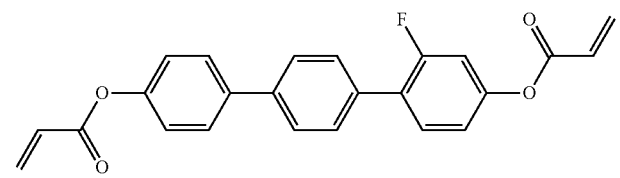 [SMILES: C=CC(=O)Oc1ccc(-c2ccc(-c3ccc(OC(=O)C=C)cc3F)cc2)cc1] RM-48
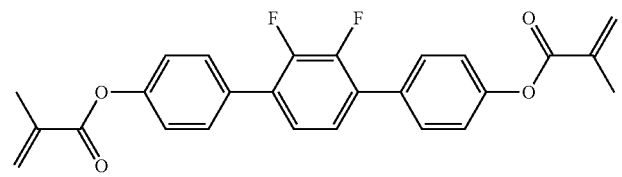 [SMILES: C=C(C)C(=O)Oc1ccc(-c2ccc(-c3ccc(OC(=O)C(=C)C)cc3)c(F)c2F)cc1] RM-49
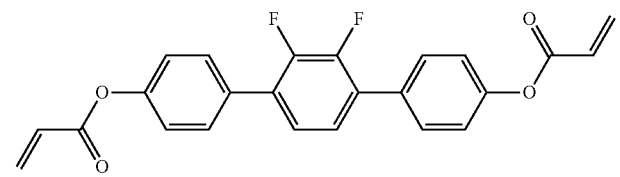 [SMILES: C=CC(=O)Oc1ccc(-c2ccc(-c3ccc(OC(=O)C=C)cc3)c(F)c2F)cc1] RM-50
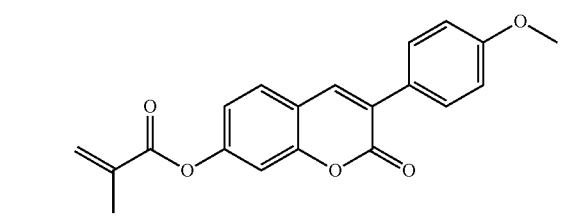 [SMILES: C=C(C)C(=O)Oc1ccc2cc(-c3ccc(OC)cc3)c(=O)oc2c1] RM-51
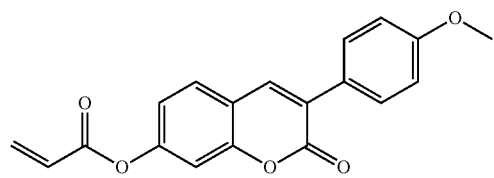 [SMILES: C=CC(=O)Oc1ccc2cc(-c3ccc(OC)cc3)c(=O)oc2c1] RM-52
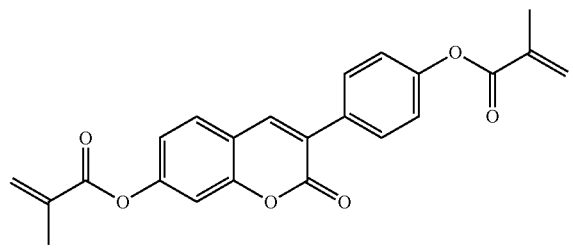 [SMILES: C=C(C)C(=O)Oc1ccc(-c2cc3ccc(OC(=O)C(=C)C)cc3oc2=O)cc1] RM-53
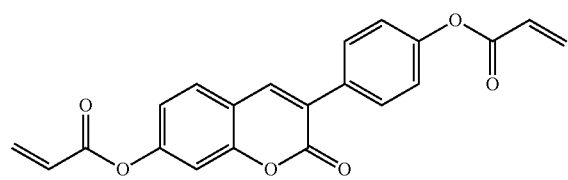 [SMILES: C=CC(=O)Oc1ccc(-c2cc3ccc(OC(=O)C=C)cc3oc2=O)cc1] RM-54

TABLE D-continued
Suitable reactive mesogens for use in the mixtures according to the invention, preferably in PSA and PS-VA applications are shown below:
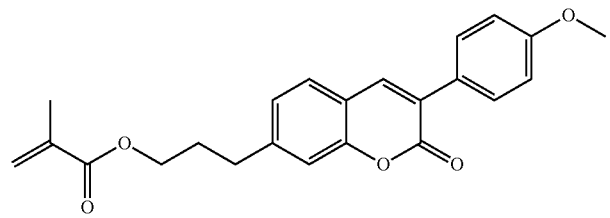 [SMILES: C=C(C)C(=O)OCCCc1ccc2cc(-c3ccc(OC)cc3)c(=O)oc2c1]
RM-55
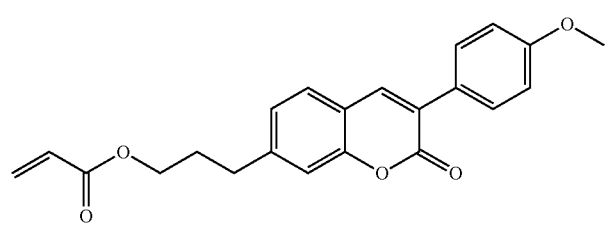 [SMILES: C=CC(=O)OCCCc1ccc2cc(-c3ccc(OC)cc3)c(=O)oc2c1]
RM-56
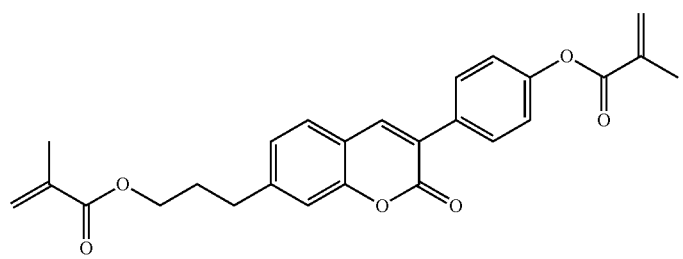 [SMILES: C=C(C)C(=O)OCCCc1ccc2cc(-c3ccc(OC(=O)C(=C)C)cc3)c(=O)oc2c1]
RM-57
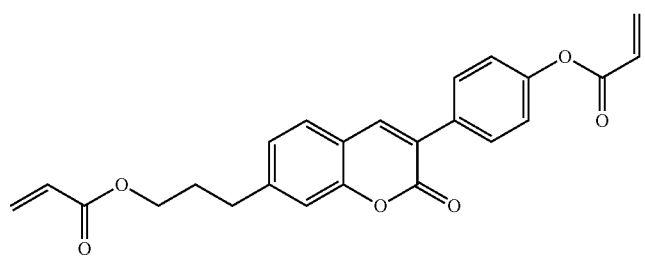 [SMILES: C=CC(=O)OCCCc1ccc2cc(-c3ccc(OC(=O)C=C)cc3)c(=O)oc2c1]
RM-58
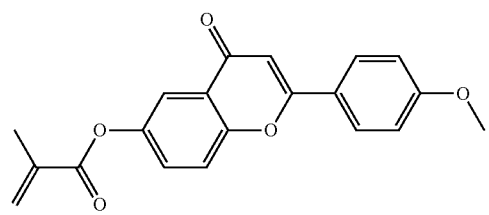 [SMILES: C=C(C)C(=O)Oc1ccc2oc(-c3ccc(OC)cc3)cc(=O)c2c1]
RM-59
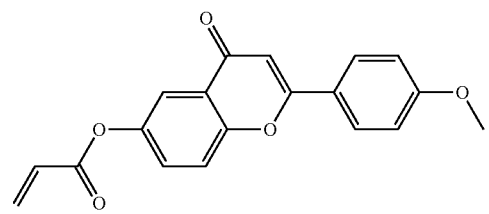 [SMILES: C=CC(=O)Oc1ccc2oc(-c3ccc(OC)cc3)cc(=O)c2c1]
RM-60

TABLE D-continued
Suitable reactive mesogens for use in the mixtures according to the invention, preferably in PSA and PS-VA applications are shown below:
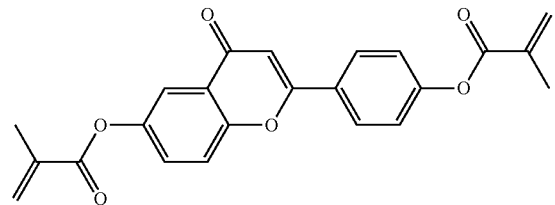 [SMILES: C=C(C)C(=O)Oc1ccc(-c2cc(=O)c3cc(OC(=O)C(=C)C)ccc3o2)cc1]
RM-61
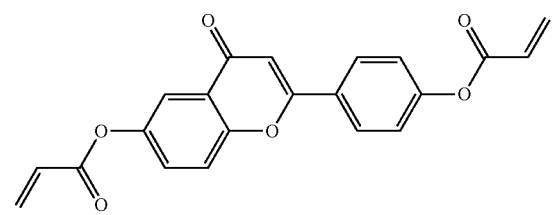 [SMILES: C=CC(=O)Oc1ccc(-c2cc(=O)c3cc(OC(=O)C=C)ccc3o2)cc1]
RM-62
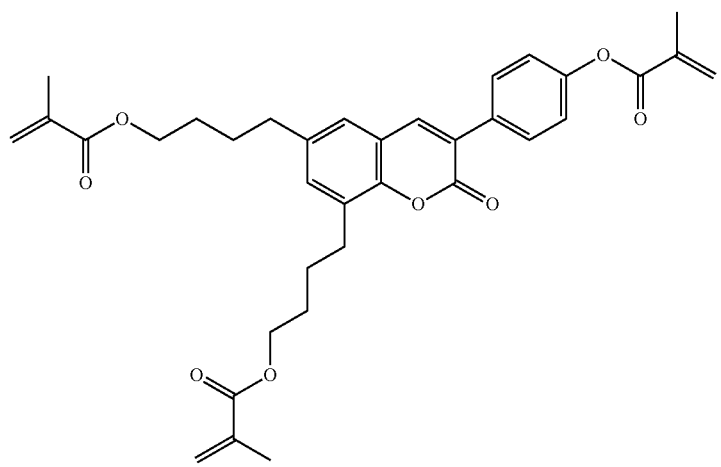 [SMILES: C=C(C)C(=O)OCCCCc1cc(CCCCOC(=O)C(=C)C)c2oc(=O)c(-c3ccc(OC(=O)C(=C)C)cc3)cc2c1]
RM-63
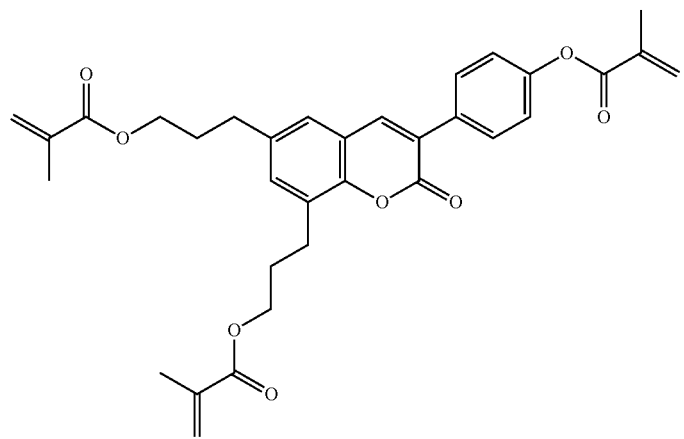 [SMILES: C=C(C)C(=O)OCCCc1cc(CCCOC(=O)C(=C)C)c2oc(=O)c(-c3ccc(OC(=O)C(=C)C)cc3)cc2c1]
RM-64

TABLE D-continued
Suitable reactive mesogens for use in the mixtures according to the invention, preferably in PSA and PS-VA applications are shown below:
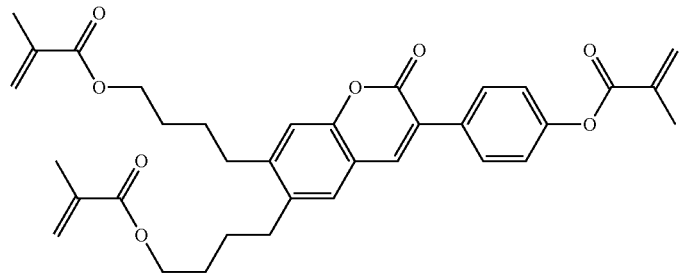 [SMILES: C=C(C)C(=O)OCCCCc1cc2cc(-c3ccc(OC(=O)C(=C)C)cc3)c(=O)oc2cc1CCCCOC(=O)C(=C)C]
RM-65
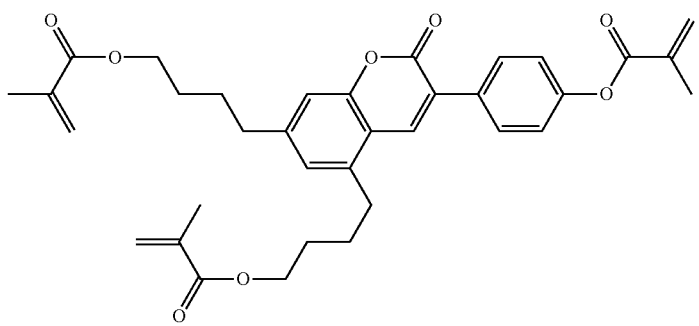 [SMILES: C=C(C)C(=O)OCCCCc1cc(CCCCOC(=O)C(=C)C)c2cc(-c3ccc(OC(=O)C(=C)C)cc3)c(=O)oc2c1]
RM-66
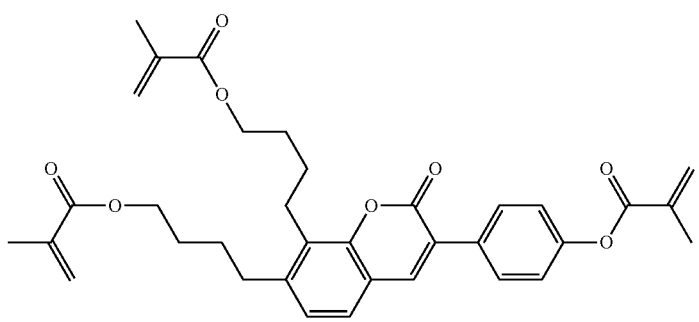 [SMILES: C=C(C)C(=O)OCCCCc1ccc2cc(-c3ccc(OC(=O)C(=C)C)cc3)c(=O)oc2c1CCCCOC(=O)C(=C)C]
RM-67
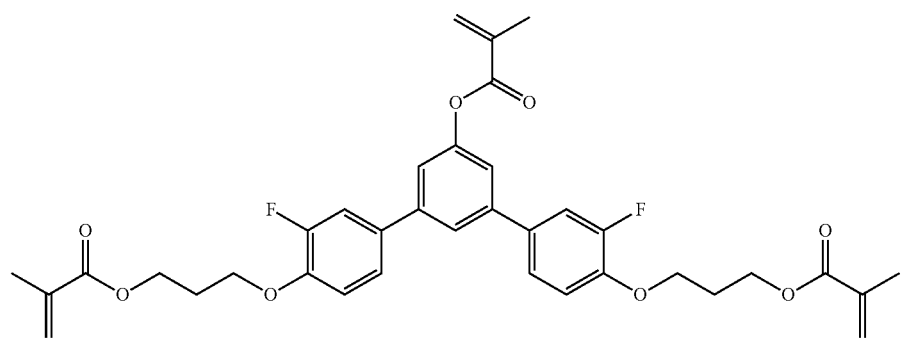 [SMILES: C=C(C)C(=O)OCCCOc1ccc(-c2cc(OC(=O)C(=C)C)cc(-c3ccc(OCCCOC(=O)C(=C)C)c(F)c3)c2)cc1F]
RM-68
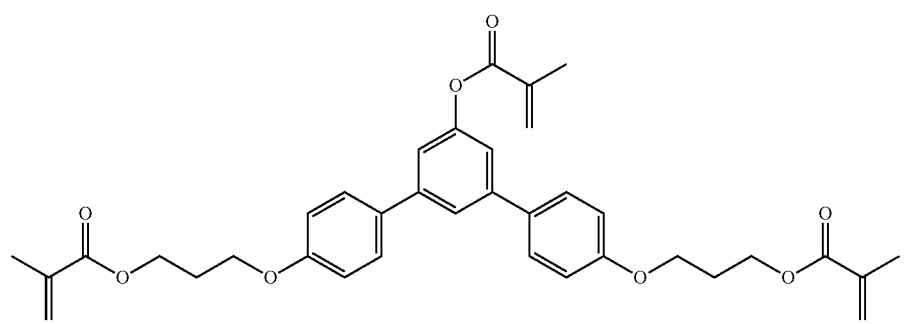 [SMILES: C=C(C)C(=O)OCCCOc1ccc(-c2cc(OC(=O)C(=C)C)cc(-c3ccc(OCCCOC(=O)C(=C)C)cc3)c2)cc1]
RM-69

TABLE D-continued
Suitable reactive mesogens for use in the mixtures according to the invention, preferably in PSA and PS-VA applications are shown below:
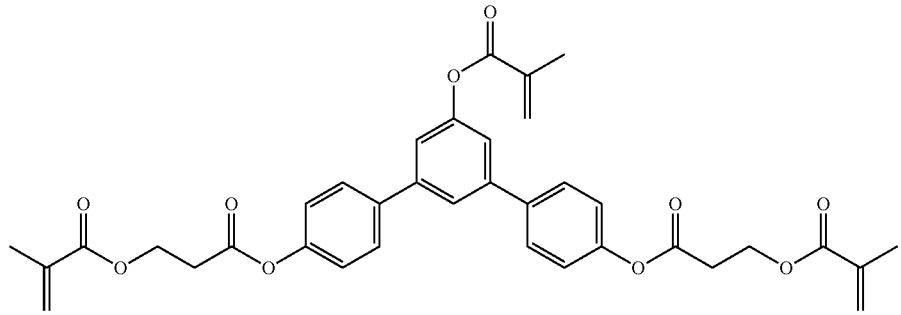 [SMILES: C=C(C)C(=O)OCCC(=O)Oc1ccc(-c2cc(OC(=O)C(=C)C)cc(-c3ccc(OC(=O)CCOC(=O)C(=C)C)cc3)c2)cc1]
RM-70
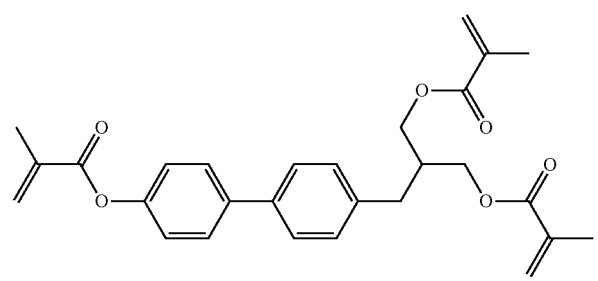 [SMILES: C=C(C)C(=O)OCC(COC(=O)C(=C)C)Cc1ccc(-c2ccc(OC(=O)C(=C)C)cc2)cc1]
RM-71
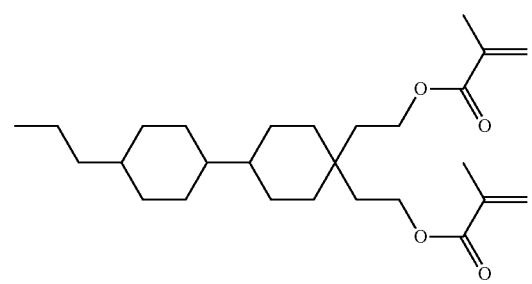 [SMILES: C=C(C)C(=O)OCCC1(CCOC(=O)C(=C)C)CCC(C2CCC(CCC)CC2)CC1]
RM-72
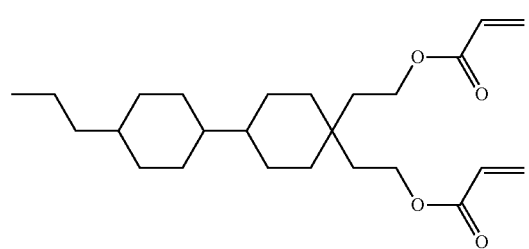 [SMILES: C=CC(=O)OCCC1(CCOC(=O)C=C)CCC(C2CCC(CCC)CC2)CC1]
RM-73
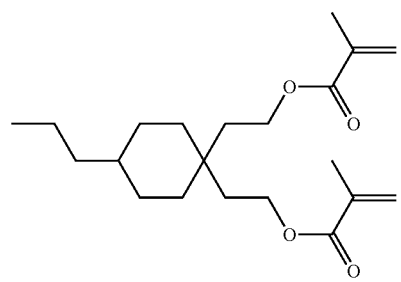 [SMILES: C=C(C)C(=O)OCCC1(CCOC(=O)C(=C)C)CCC(CCC)CC1]
RM-74

TABLE D-continued
Suitable reactive mesogens for use in the mixtures according to the invention, preferably in PSA and PS-VA applications are shown below:
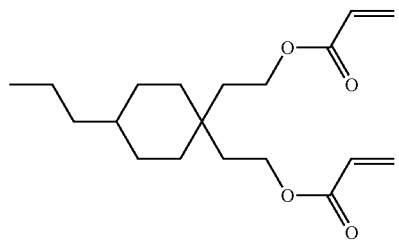 [SMILES: C=CC(=O)OCCC1(CCOC(=O)C=C)CCC(CCC)CC1] RM-75
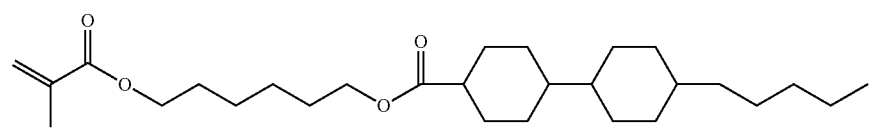 [SMILES: C=C(C)C(=O)OCCCCCCOC(=O)C1CCC(C2CCC(CCCCC)CC2)CC1] RM-76
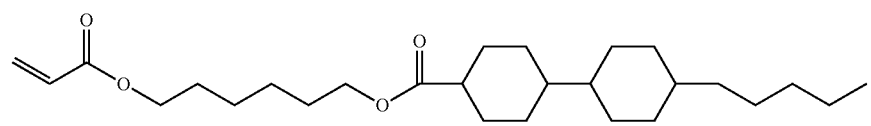 [SMILES: C=CC(=O)OCCCCCCOC(=O)C1CCC(C2CCC(CCCCC)CC2)CC1] RM-77
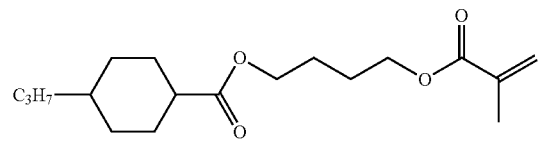 RM-78
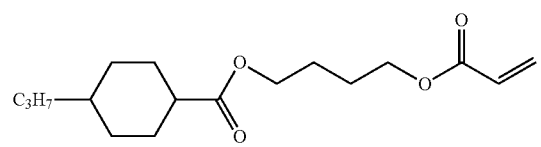 RM-79
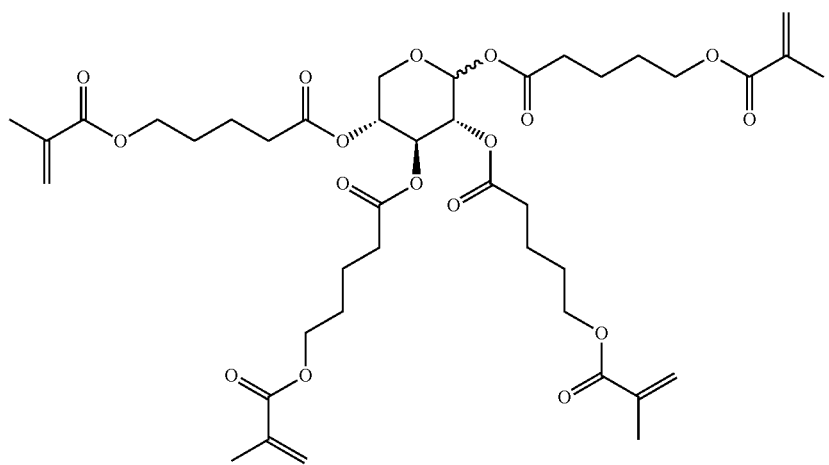 [SMILES: C=C(C)C(=O)OCCCCC(=O)OC1OC[C@@H](OC(=O)CCCCOC(=O)C(=C)C)[C@H](OC(=O)CCCCOC(=O)C(=C)C)[C@H]1OC(=O)CCCCOC(=O)C(=C)C] RM-80

TABLE D-continued
Suitable reactive mesogens for use in the mixtures according to the invention, preferably in PSA and PS-VA applications are shown below:
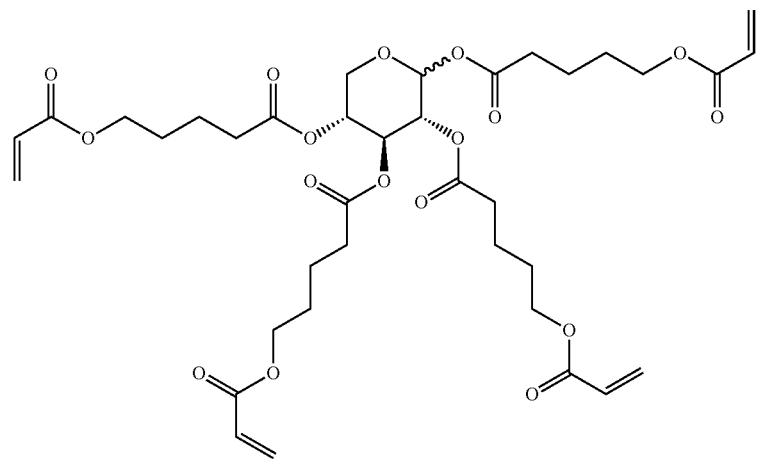 [SMILES: C=CC(=O)OCCCCC(=O)OC1OC[C@@H](OC(=O)CCCCOC(=O)C=C)[C@H](OC(=O)CCCCOC(=O)C=C)[C@H]1OC(=O)CCCCOC(=O)C=C]
RM-81
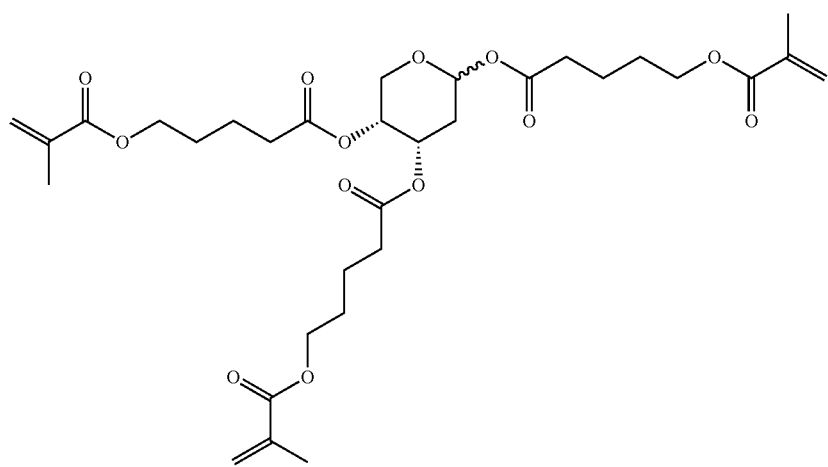 [SMILES: C=C(C)C(=O)OCCCCC(=O)OC1C[C@H](OC(=O)CCCCOC(=O)C(=C)C)[C@H](OC(=O)CCCCOC(=O)C(=C)C)CO1]
RM-82
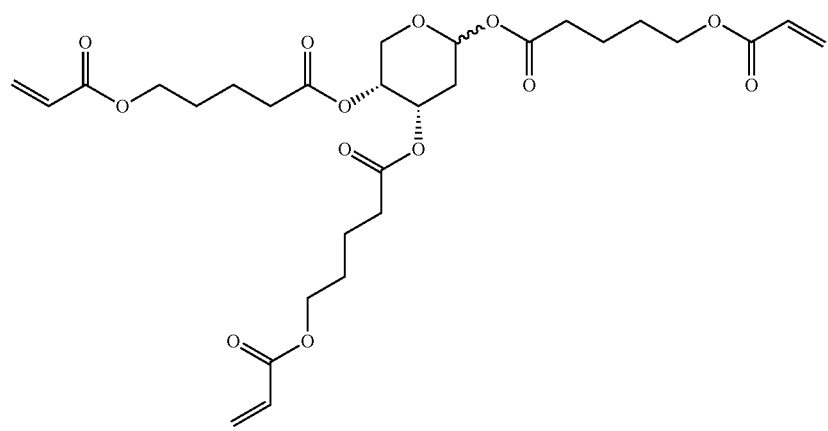 [SMILES: C=CC(=O)OCCCCC(=O)OC1C[C@H](OC(=O)CCCCOC(=O)C=C)[C@H](OC(=O)CCCCOC(=O)C=C)CO1]
RM-83

TABLE D-continued

Suitable reactive mesogens for use in the mixtures according to the invention, preferably in PSA and PS-VA applications are shown below:

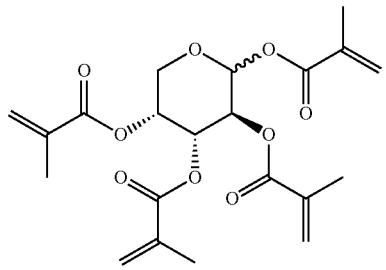 [SMILES: C=C(C)C(=O)OC1OC[C@@H](OC(=O)C(=C)C)[C@@H](OC(=O)C(=C)C)[C@@H]1OC(=O)C(=C)C]
RM-84

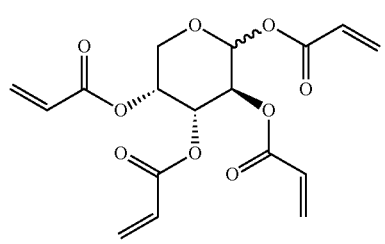 [SMILES: C=CC(=O)OC1OC[C@@H](OC(=O)C=C)[C@@H](OC(=O)C=C)[C@@H]1OC(=O)C=C]
RM-85

EXAMPLES

The following examples are intended to explain the invention without restricting it. In the examples, m.p. denotes the melting point and C denotes the clearing point of a liquid-crystalline substance in degrees Celsius; boiling points are denoted by b.p. Furthermore:

C denotes crystalline solid state, S denotes smectic phase (the index denotes the phase type), N denotes nematic state, Ch denotes cholesteric phase, I denotes isotropic phase, $T_g$ denotes glass transition temperature. The number between two symbols indicates the conversion temperature in degrees Celsius.

Conventional work-up means: water is added, the mixture is extracted with methylene chloride, the phases are separated, the organic phase is dried and evaporated, and the product is purified by crystallisation and/or chromatography.

Example 1

Step 1.1

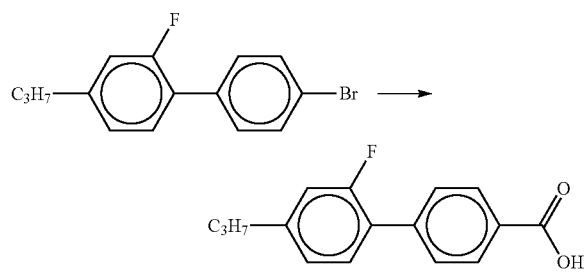

4-Propyl-4'-bromo-2-fluorobiphenyl is prepared according to WO89/03821

Step 1.2: 2'-Fluoro-4'-propyl-biphenyl-4-carboxylic acid

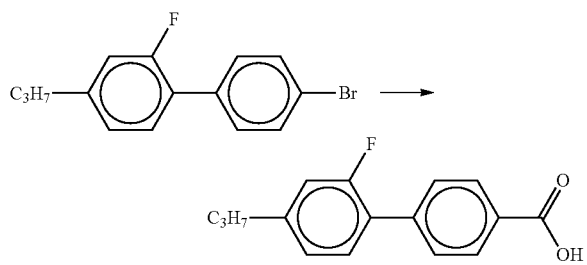

29.3 g (0.100 mol) 4-propyl-4'-bromo-2-fluorobiphenyl are dissolved in THF (800 ml) and cooled to −70° C. After addition of 66 ml (0.105 mol) n-butyl lithium the reaction is stirred for 30 min and then a $CO_2$ stream is passed through the solution until the exothermic reaction ceases. The reaction is warmed to −10° C., poured onto water and acidified with conc. hydrochloric acid. The mixture is extracted with methyl tert. butyl ether (MBT ether) and dried over sodium sulfate. The solvent is evaporated and the residue is recrystallised from n-heptane to give 2'-fluoro-4'-propyl-biphenyl-4-carboxylic acid as colourless crystals.

Step 1.3: (2'-Fluoro-4'-propyl-biphenyl-4-yl)-methanol

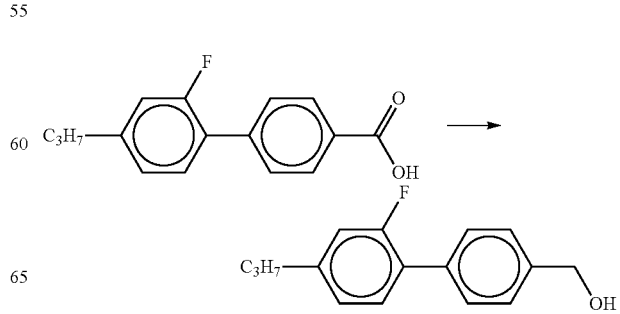

1.45 g (38 mmol) lithiumaluminium hydride are placed in a flask under toluene (10 ml) and a solution of 12.0 g (46.0 mmol) 2'-fluoro-4'-propylbiphenyl-4-carboxylic acid in THF (250 ml) is added dropwise. The reaction is stirred at room temperature over night and is then hydrolised carefully with 2M hydrochloric acid (100 ml) under ice-cooling. After addition of MTB-ether (50 ml) the aqueous layer was separated and extracted tree times with MTB-ether. The combined organic layers are washed saturated sodium bicarbonate solution and dried over sodium sulfate. The solvent is evaporated and the crude product filtered through silica with heptane/ethyl acetate (8:2). Crystallisation from n-heptane gives (2'-fluoro-4'-propyl-biphenyl-4-yl)-methanol as colourless crystals.

K 50 1

Above and below, $V_0$ denotes the threshold voltage, capacitive [V] at 20° C.
$\Delta n$ denotes the optical anisotropy measured at 20° C. and 589 nm
$\Delta \epsilon$ denotes the dielectric anisotropy at 20° C. and 1 kHz
cl.p. denotes the clearing point [° C.]
$K_1$ denotes the elastic constant, "splay" deformation at 20° C. [pN]
$K_3$ denotes the elastic constant, "bend" deformation at 20° C. [pN]
$\gamma_1$ denotes the rotational viscosity measured at 20° C. [mPa·s], determined by the rotation method in a magnetic field
LTS denotes the low-temperature stability (nematic phase), determined in test cells The display used for measurement of the threshold voltage has two plane-parallel outer plates at a separation of 20 μm and electrode layers with overlying alignment layers of JALS-2096 on the insides of the outer plates, which effect a homeotropic alignment of the liquid crystals.

All concentrations in this application relate to the corresponding mixture or mixture component, unless explicitly indicated otherwise. All physical properties are determined as described in "Merck Liquid Crystals, Physical Properties of Liquid Crystals", status November 1997, Merck KGaA, Germany, and apply for a temperature of 20° C., unless explicitly indicated otherwise.

Unless indicated otherwise, parts or percent data denote parts by weight or percent by weight.

Mixture Examples

For the production of the examples according to the present invention the following host mixtures H1 to H9 are used:

| H1: Nematic host-mixture | | | |
|---|---|---|---|
| CY-3-O2 | 15.50% | Clearing point [° C.]: | 75.1 |
| CCY-3-O3 | 8.00% | $\Delta n$ [589 nm, 20° C.]: | 0.098 |
| CCY-4-O2 | 10.00% | $\Delta \epsilon$ [1 kHz, 20° C.]: | -3.0 |
| CPY-2-O2 | 5.50% | $\epsilon_\parallel$ [1 kHz, 20° C.]: | 3.4 |
| CPY-3-O2 | 11.50% | $\epsilon_\perp$ [1 kHz, 20° C.]: | 6.4 |
| CCH-34 | 9.25% | $K_1$ [pN, 20° C.]: | 13.1 |
| CCH-23 | 24.50% | $K_3$ [pN, 20° C.]: | 13.3 |
| PYP-2-3 | 8.75% | $\gamma_1$ [mPa·s, 20° C.]: | 113 |
| PCH-301 | 7.00% | $V_0$ [20° C., V]: | 2.22 |
| H2: Nematic host-mixture | | | |
| CY-3-O4 | 14.00% | Clearing point [° C.]: | 80.0 |
| CCY-3-O2 | 9.00% | $\Delta n$ [589 nm, 20° C.]: | 0.090 |
| CCY-3-O3 | 9.00% | $\Delta \epsilon$ [1 kHz, 20° C.]: | -3.3 |
| CPY-2-O2 | 10.00% | $\epsilon_\parallel$ [1 kHz, 20° C.]: | 3.4 |
| CPY-3-O2 | 10.00% | $\epsilon_\perp$ [1 kHz, 20° C.]: | 6.7 |
| CCY-3-1 | 8.00% | $K_1$ [pN, 20° C.]: | 15.1 |
| CCH-34 | 9.00% | $K_3$ [pN, 20° C.]: | 14.6 |
| CCH-35 | 6.00% | $\gamma_1$ [mPa·s, 20° C.]: | 140 |
| PCH-53 | 10.00% | $V_0$ [20° C., V]: | 2.23 |
| CCH-301 | 6.00% | | |
| CCH-303 | 9.00% | | |
| H3: Nematic host-mixture | | | |
| CC-3-V1 | 9.00% | Clearing point [° C.]: | 74.7 |
| CCH-23 | 18.00% | $\Delta n$ [589 nm, 20° C.]: | 0.098 |
| CCH-34 | 3.00% | $\Delta \epsilon$ [1 kHz, 20° C.]: | -3.4 |
| CCH-35 | 7.00% | $\epsilon_\parallel$ [1 kHz, 20° C.]: | 3.5 |
| CCP-3-1 | 5.50% | $\epsilon_\perp$ [1 kHz, 20° C.]: | 6.9 |
| CCY-3-O2 | 11.50% | $K_1$ [pN, 20° C.]: | 14.9 |
| CPY-2-O2 | 8.00% | $K_3$ [pN, 20° C.]: | 15.9 |
| CPY-3-O2 | 11.00% | $\gamma_1$ [mPa·s, 20° C.]: | 108 |
| CY-3-O2 | 15.50% | $V_0$ [20° C., V]: | 2.28 |
| PY-3-O2 | 11.50% | | |
| H4: Nematic host-mixture | | | |
| CC-3-V | 37.50% | Clearing point [° C.]: | 74.8 |
| CC-3-V1 | 2.00% | $\Delta n$ [589 nm, 20° C.]: | 0.099 |
| CCY-4-O2 | 14.50% | $\Delta \epsilon$ [1 kHz, 20° C.]: | -2.9 |
| CPY-2-O2 | 10.50% | $\epsilon_\parallel$ [1 kHz, 20° C.]: | 3.7 |
| CPY-3-O2 | 9.50% | $\epsilon_\perp$ [1 kHz, 20° C.]: | 6.6 |
| CY-3-O2 | 15.00% | $K_1$ [pN, 20° C.]: | 12.2 |
| CY-3-O4 | 4.50% | $K_3$ [pN, 20° C.]: | 13.4 |
| PYP-2-4 | 5.50% | $\gamma_1$ [mPa·s, 20° C.]: | 92 |
| PPGU-3-F | 1.00% | $V_0$ [20° C., V]: | 2.28 |
| H5: Nematic host-mixture | | | |
| CCH-23 | 20.00% | Clearing point [° C.]: | 74.8 |
| CCH-301 | 6.00% | $\Delta n$ [589 nm, 20° C.]: | 0.105 |
| CCH-34 | 6.00% | $\Delta \epsilon$ [1 kHz, 20° C.]: | -3.2 |
| CCP-3-1 | 3.00% | $\epsilon_\parallel$ [1 kHz, 20° C.]: | 3.5 |
| CCY-3-O2 | 11.00% | $\epsilon_\perp$ [1 kHz, 20° C.]: | 6.8 |
| CPY-2-O2 | 12.00% | $K_1$ [pN, 20° C.]: | 12.7 |
| CPY-3-O2 | 11.00% | $K_3$ [pN, 20° C.]: | 13.6 |
| CY-3-O2 | 14.00% | $\gamma_1$ [mPa·s, 20° C.]: | 120 |
| CY-3-O4 | 4.00% | $V_0$ [20° C., V]: | 2.16 |
| PCH-301 | 4.00% | | |
| PYP-2-3 | 9.00% | | |
| H6: Nematic host-mixture | | | |
| CC-4-V | 17.00% | Clearing point [° C.]: | 106.1 |
| CCP-V-1 | 15.00% | $\Delta n$ [589 nm, 20° C.]: | 0.120 |
| CCPC-33 | 2.50% | $\Delta \epsilon$ [1 kHz, 20° C.]: | -3.6 |
| CCY-3-O2 | 4.00% | $\epsilon_\parallel$ [1 kHz, 20° C.]: | 3.5 |
| CCY-3-O3 | 5.00% | $\epsilon_\perp$ [1 kHz, 20° C.]: | 7.0 |
| CCY-4-O2 | 5.00% | $K_1$ [pN, 20° C.]: | 16.8 |
| CLY-3-O2 | 3.50% | $K_3$ [pN, 20° C.]: | 17.3 |
| CLY-3-O3 | 2.00% | $\gamma_1$ [mPa·s, 20° C.]: | 207 |
| CPY-2-O2 | 8.00% | $V_0$ [20° C., V]: | 2.33 |
| CPY-3-O2 | 10.00% | | |
| CY-3-O4 | 17.00% | | |
| PYP-2-3 | 11.00% | | |
| H7: Nematic host-mixture | | | |
| CY-3-O2 | 15.00% | Clearing point [° C.]: | 75.5 |
| CCY-4-O2 | 9.50% | $\Delta n$ [589 nm, 20° C.]: | 0.108 |
| CCY-5-O2 | 5.00% | $\Delta \epsilon$ [1 kHz, 20° C.]: | -3.0 |
| CPY-2-O2 | 9.00% | $\epsilon_\parallel$ [1 kHz, 20° C.]: | 3.5 |
| CPY-3-O2 | 9.00% | $\epsilon_\perp$ [1 kHz, 20° C.]: | 6.5 |
| CCH-34 | 9.00% | $K_1$ [pN, 20° C.]: | 12.9 |
| CCH-23 | 22.00% | $K_3$ [pN, 20° C.]: | 13.0 |
| PYP-2-3 | 7.00% | $\gamma_1$ [mPa·s, 20° C.]: | 115 |
| PYP-2-4 | 7.50% | $V_0$ [20° C., V]: | 2.20 |
| PCH-301 | 7.00% | | |
| H8: Nematic host-mixture | | | |
| CY-3-O2 | 15.00% | Clearing point [° C.]: | 74.7 |
| CY-5-O2 | 6.50% | $\Delta n$ [589 nm, 20° C.]: | 0.108 |
| CCY-3-O2 | 11.00% | $\Delta \epsilon$ [1 kHz, 20° C.]: | -3.0 |
| CPY-2-O2 | 5.50% | $\epsilon_\parallel$ [1 kHz, 20° C.]: | 3.6 |
| CPY-3-O2 | 10.50% | $\epsilon_\perp$ [1 kHz, 20° C.]: | 6.6 |
| CC-3-V | 28.50% | $K_1$ [pN, 20° C.]: | 12.9 |
| CC-3-V1 | 10.00% | $K_3$ [pN, 20° C.]: | 15.7 |
| PYP-2-3 | 12.50% | $\gamma_1$ [mPa·s, 20° C.]: | 97 |
| PPGU-3-F | 0.50% | $V_0$ [20° C., V]: | 2.42 |

-continued

| H9: Nematic host-mixture | | | |
|---|---|---|---|
| CCH-35 | 9.50% | Clearing point [° C.]: | 79.1 |
| CCH-501 | 5.00% | Δn [589 nm, 20° C.]: | 0.091 |
| CCY-2-1 | 9.50% | Δε [1 kHz, 20° C.]: | −3.6 |
| CCY-3-1 | 10.50% | ε∥ [1 kHz, 20° C.]: | 3.5 |
| CCY-3-O2 | 10.50% | ε⊥ [1 kHz, 20° C.]: | 7.1 |
| CCY-5-O2 | 9.50% | $K_1$ [pN, 20° C.]: | 14.6 |
| CPY-2-O2 | 12.00% | $K_3$ [pN, 20° C.]: | 14.5 |
| CY-3-O4 | 9.00% | $γ_1$ [mPa · s, 20° C.]: | 178 |
| CY-5-O4 | 11.00% | $V_0$ [20° C., V]: | 2.12 |
| PCH-53 | 13.50% | | |

Example M1

The compound of the formula I-2a-1 (3.5%) is added to the nematic host mixture H1. The resulting mixture is homogenised and filled into an "alignment-free" test cell (cell thickness d~4.0 μm, ITO coating on both sides (structured ITO in case of a multi-domain switching), no alignment layer and no passivation layer).

The LC-mixture shows a spontaneous homeotropic (vertical) orientation with respect to the surface of the substrates. The orientation is stable until the clearing point and the resulting VA-cell can be reversibly switched. Crossed polarizers are needed to display the switching.

By using additives like the compound of the formula I-2a-1, no alignment layer (e.g. no PI coating) is required anymore for PVA, MVA, and other analogue display technologies based on the combination Δε<0 and homeotropic orientation.

Example 1P a)

Polymer Stabilization of the LC Mixture of Example M1

The polymerizable derivative RM-1 (0.3%) is added to the nematic LC-mixture of Example M1. The resulting mixture is homogenised and filled into an "alignment-free" test cell (cell thickness d~4.0 μm, ITO coating on both sides (structured ITO in case of a multi-domain switching), no alignment layer and no passivation layer).

The LC-mixture shows a spontaneous homeotropic (vertical) orientation, with respect to the surface of the substrates. The resulting VA-cell is treated with UV-light (15 min, 100 mW/cm$^2$) after having applied to the cell a voltage higher than the optical threshold. The polymerizable derivative polymerizes and, as a consequence, the homeotropic self-orientation is stabilized and the tilt of the mixture is tuned. The resulting PSA-VA-cell can be reversibly switched even at high temperatures. The switching times are reduced, compared to the not polymerized system.

Additives like Irganox 1076 (BASF) may be added (e.g. 0.001%) for preventing spontaneous polymerization. UV-cut filter may be used during polymerization for preventing damage of the mixtures (e.g. 340 nm cut-filter).

By using additives like the compound of the formula I-2a-1 in combination with RM-1, no alignment layer is required anymore for PSA, PS-VA, and other analogue display technologies based on the combination Δε<0 and homeotropic orientation.

Example 1P b)

Polymer Stabilization of the LC Mixture of Example M1

The polymerizable derivative RM-43 (0.3%) is added to the nematic LC-mixture of Example M1. The resulting mixture is homogenised and filled into an "alignment-free" test cell (cell thickness d~4.0 μm, ITO coating on both sides (structured ITO in case of a multi-domain switching), no alignment layer and no passivation layer). The resulting cell is treated according to Example 1P a) and similar results are obtained.

By using additives like the compound of the formula I-2a-1 in combination with RM-43, no alignment layer is required anymore for PSA, PS-VA, and other analogue display technologies based on the combination Δε<0 and homeotropic orientation.

Examples M2 to M9 and 2P a) to 9P b)

The compound of the formula I-2a-1 (3.5%) is added to the nematic host mixtures H2-H9. The resulting 8 mixtures are homogenised and filled into an "alignment-free" test cell (cell thickness d~4.0 μm, ITO coating on both sides (structured ITO in case of a multi-domain switching), no alignment layer and no passivation layer).

The LC-mixtures show a spontaneous homeotropic (vertical) orientation with respect to the surface of the substrates. The orientation is stable until the clearing point and the resulting VA-cell can be reversibly switched. Crossed polarizers are needed to display the switching.

The polymerizable derivative RM-1 (0.3%) or RM-43 (0.3%) is added to the nematic LC mixtures of Examples M2-M9. The resulting mixtures are homogenised and filled into an "alignment-free" test cell (cell thickness d 4.0 μm, ITO coating on both sides (structured ITO in case of a multi-domain switching), no alignment layer and no passivation layer). The resulting cell is treated according to example 1P a). Equivalent results are obtained.

Examples 1P c) to 9 P f)

Analogues mixtures like 1P a) to 9 P b) are obtained by mixing the nematic LC mixtures M1 to M9 with RM34 (0.3%), RM37 (0.3%), RM64 (0.3%) or RM71 (0.3%), obtaining mixtures 1P c) to 9 P f). These mixtures are treated according to Example 1P a). In all cases an improvement of the switching times is found.

The invention claimed is:
1. Liquid-crystalline medium comprising a mixture of polar compounds which contains at least one compound of the formula I,

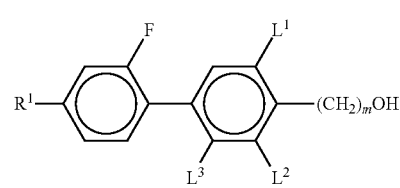

in which
R$^1$ denotes an alkyl or alkoxy radical having 1 to 15 C atoms, where one or more CH$_2$ groups in these radicals are optionally replaced, independently of one another, by —C≡C—, —CF$_2$O—, —CH═CH—,

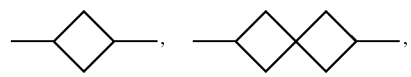

—O—, —CO—O—, —O—CO— in such a way that O atoms are not linked directly to one another, and in which one or more H atoms are optionally replaced by halogen, L¹, L² and L³ each, independently of one another, denote H, F, Cl, CF₃, CHF₂ or alkyl with 1-5 carbon atoms, and m is 0, 1, 2, 3, 4, 5 or 6,
wherein the mixture contains 0.01 to 10% by weight of the compounds of the formula I based on the mixture as a whole.

2. Liquid-crystalline medium according to claim 1 which contains at least one compound of the formula I and at least one polymerisable compound.

3. Liquid-crystalline medium according to claim 1 wherein the compound of the formula I is selected from the following group of compounds of the formula I-1a to I-3a,

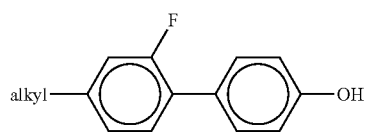   I-1a

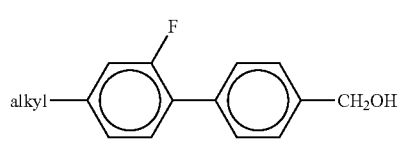   I-2a

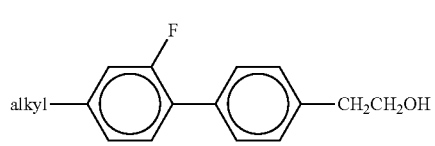   I-3a in which
alkyl denotes a straight-chain alkyl radical having 1 to 7 carbon atoms.

4. Liquid-crystalline medium according to claim 2, wherein the polymerisable compound is selected from the compounds of the formula M

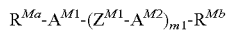   M in which the individual radicals have the following meanings:
$R^{Ma}$ and $R^{Mb}$ each, independently of one another, denote P, P-Sp-, H, halogen, SF₅, NO₂, an alkyl, alkenyl or alkynyl group,
P denotes a polymerisable group,
Sp denotes a spacer group or a single bond,
$A^{M1}$ and $A^{M2}$ each, independently of one another, denote an aromatic, heteroaromatic, alicyclic or heterocyclic group having 4 to 25 ring atoms, which may also encompass or contain fused rings, and which may optionally be mono- or polysubstituted by L,
L denotes P, P-Sp-, OH, CH₂OH, F, Cl, Br, I, —CN, —NO₂, —NCO, —NCS, —OCN, —SCN, —C(=O)N(Rˣ)₂, —C(=O)Y¹, —C(=O)Rˣ, —N(Rˣ)₂, optionally substituted silyl, optionally substituted aryl having 6 to 20 C atoms, or straight-chain or branched alkyl, alkoxy, alkylcarbonyl, alkoxycarbonyl, alkylcarbonyloxy or alkoxycarbonyloxy having 1 to 25 C atoms, in which one or more H atoms are optionally replaced by F, Cl, P or P-Sp-,
Y¹ denotes halogen,
$Z^{M1}$ denotes —O—, —S—, —CO—, —CO—O—, —OCO—, —O—CO—O—, —OCH₂—, —CH₂O—, —SCH₂—, —CH₂S—, —CF₂O—, —OCF₂—, —CF₂S—, —SCF₂—, —(CH₂)ₙ₁—, —CF₂CH₂—, —CH₂CF₂—, —(CF₂)ₙ₁—, —CH=CH—, —CF=CF—, —C≡C—, —CH=CH—, —COO—, —OCO—CH=CH—, CR⁰R⁰⁰ or a single bond,
R⁰ and R⁰⁰ each, independently of one another, denote H or alkyl having 1 to 12 C atoms,
Rˣ denotes P, P-Sp-, H, halogen, straight-chain, branched or cyclic alkyl having 1 to 25 C atoms, in which one or more non-adjacent CH₂ groups are optionally replaced by —O—, —S—, —CO—, —CO—O—, —O—CO—, —O—CO—O— in such a way that O and/or S atoms are not linked directly to one another, and in which one or more H atoms are optionally replaced by F, Cl, P or P-Sp-, an optionally substituted aryl or aryloxy group having 6 to 40 C atoms, or an optionally substituted heteroaryl or heteroaryloxy group having 2 to 40 C atoms,
m1 denotes 0, 1, 2, 3 or 4, and
n1 denotes 1, 2, 3 or 4,
where at least one of the radicals from the group $R^{Ma}$, $R^{Mb}$ and the substituents L present denotes a group P or P-Sp- or contains at least one group P or P-Sp-.

5. Liquid-crystalline medium according to claim 4 wherein the polymerisable compound of the formula M is selected from the group of compounds of the formula M1 to M41,

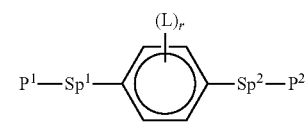   M1

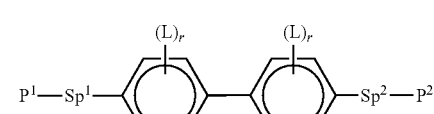   M2

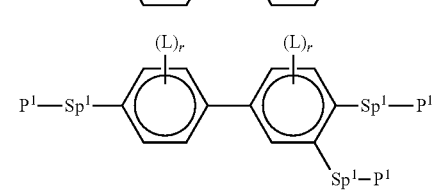   M3

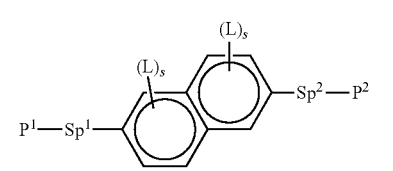   M4

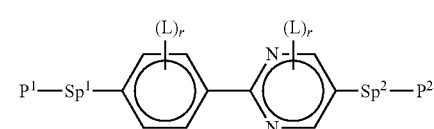   M5

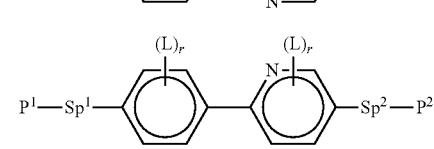   M6

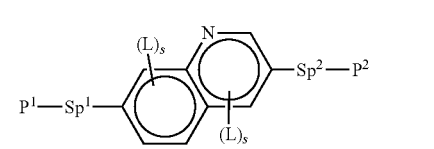   M7

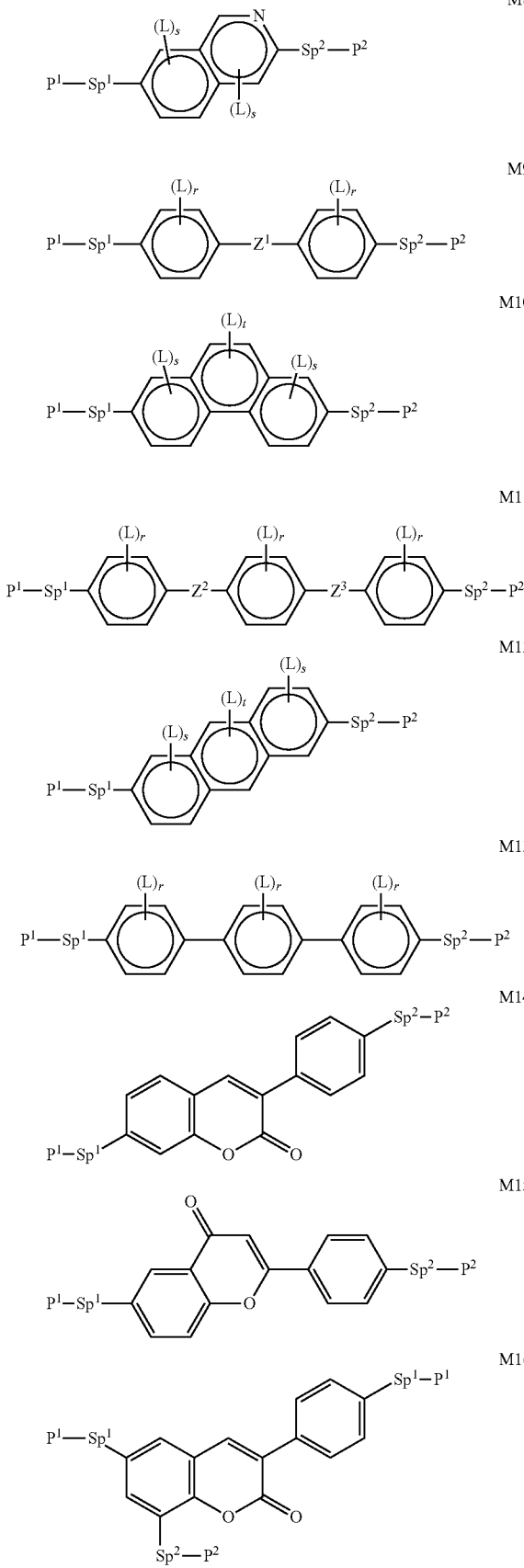
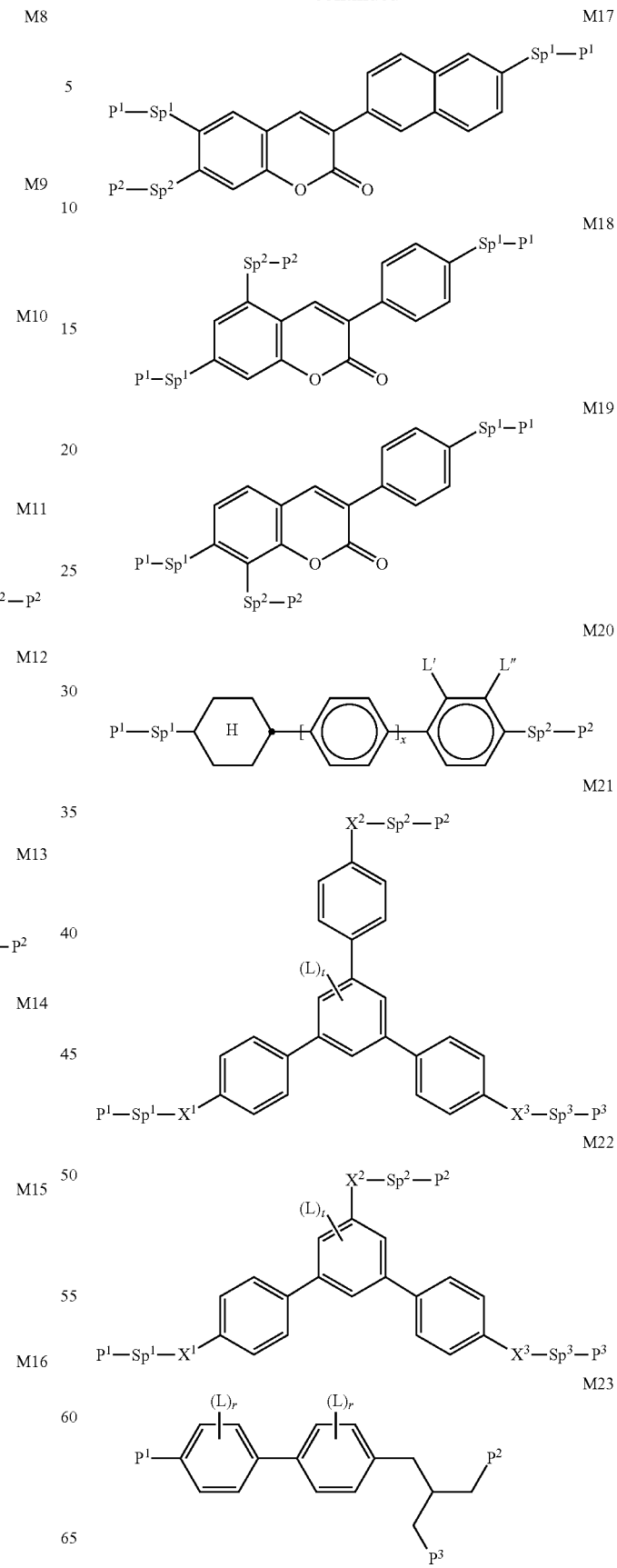

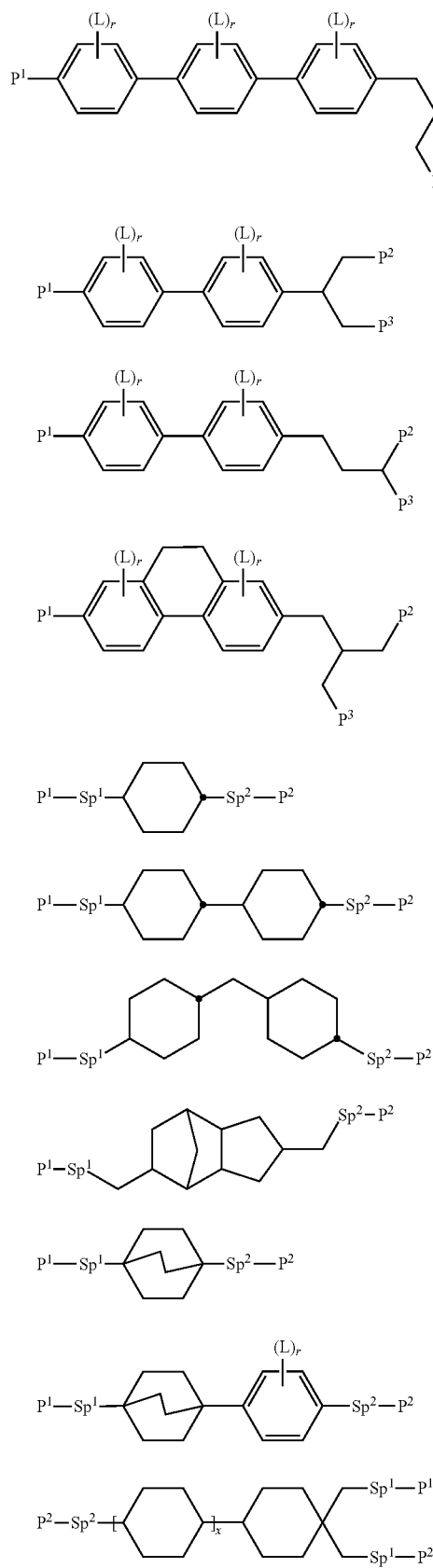

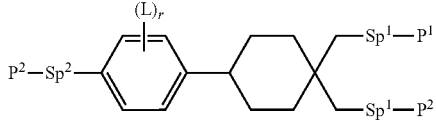

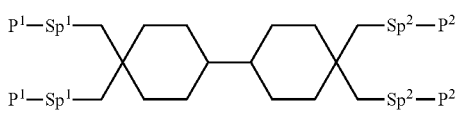

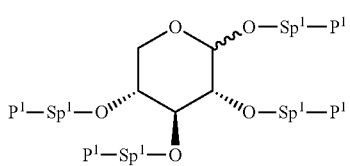

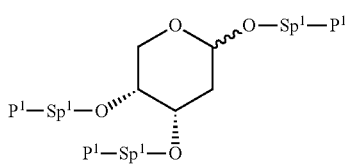

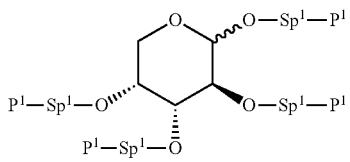

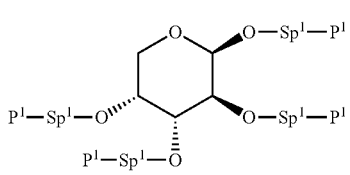

in which the individual radicals have the following meanings:

P¹, P² and P³ each, independently of one another, denote a polymerisable group,

Sp¹, Sp² and Sp³ each, independently of one another, denote a single bond or a spacer group, where, in addition, one or more of the radicals P¹-Sp¹-, P²-Sp² and P³-Sp³- may denote $R^{aa}$, with the proviso that at least one of the radicals P¹-Sp¹-, P²-Sp²- and P³-Sp³- present does not denote $R^{aa}$, $R^{aa}$ denotes H, F, Cl, CN or straight-chain or branched alkyl having 1 to 25 C atoms, in which one or more non-adjacent $CH_2$ groups are optionally replaced, independently of one another, by $C(R^0)=C(R^{00})-$, $-C\equiv C-$, $-N(R^0)-$, $-O-$, $-S-$, $-CO-$, $-CO-O-$, $-O-CO-$, $-O-CO-O-$ in such a way that O and/or S atoms are not linked directly to one another, and in which one or more H atoms are optionally replaced by F, Cl, CN or P¹-Sp¹-, $R^0$ and $R^{00}$ each, independently of one another and identically or differently on each occurrence, denote H or alkyl having 1 to 12 C atoms, $R^y$ and $R^z$ each, independently of one another, denote H, F, $CH_3$ or $CF_3$, $X^1$, $X^2$ and $X^3$ each, independently of one another, denote —CO—O—, —O—CO— or a single bond, $Z^1$ denotes —O—, —CO—, —C($R^y R^z$)— or —$CF_2 CF_2$—, $Z^2$ and $Z^3$ each, independently of one another, denote —CO—O—, —O—CO—, —$CH_2$O—, —O$CH_2$—, —$CF_2$O—, —O$CF_2$— or —$(CH_2)_n$—, where n is 2, 3 or 4, L on each occurrence, identically or differently, denotes F, Cl, CN or straight-chain or branched, optionally mono- or polyfluorinated alkyl, alkoxy, alkenyl, alkynyl, alkylcarbonyl, alkoxycarbonyl, alkylcarbonyloxy or alkoxycarbonyloxy having 1 to 12 C atoms, L' and L" each, independently of one another, denote H, F or Cl, r denotes 0, 1, 2, 3 or 4, s denotes 0, 1, 2 or 3, t denotes 0, 1 or 2, and x denotes 0 or 1.

6. Liquid-crystalline medium according to claim 1, which additionally contains one or more compounds selected from the group of the compounds of the formulae IIA, IIB and IIC

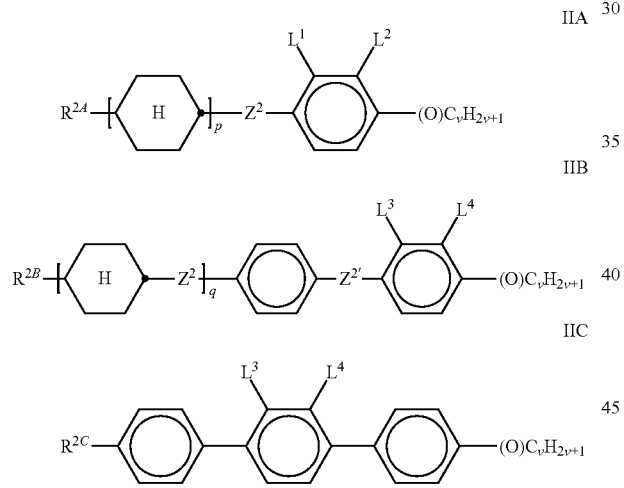

in which $R^{2A}$, $R^{2B}$ and $R^{2C}$ each, independently of one another, denote H, an alkyl radical having up to 15 C atoms which is unsubstituted, monosubstituted by CN or $CF_3$ or at least monosubstituted by halogen, where one or more $CH_2$ groups in these radicals are optionally replaced by —O—, —S—,

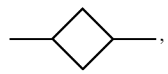

—C≡C—, —$CF_2$O—, —O$CF_2$—, —OC—O— or —O—CO— in such a way that O atoms are not linked directly to one another, $L^{1-4}$ each, independently of one another, denote F, Cl, $CF_3$ or $OCF_2$ $Z^2$ and $Z^{2'}$ each, independently of one another, denote a single bond, —$CH_2CH_2$—, —CH═CH—, —$CF_2$O—, —O$CF_2$—, —$CH_2$O—, —O$CH_2$—, —COO—, —OCO—, —$C_2F_4$—, —CF═CF—, —CH═CH$CH_2$O—, (O)$C_v H_{2v+1}$ denotes O$C_v H_{2v+1}$ or $C_v H_{2v+1}$ p denotes 1 or 2, q denotes 0 or 1, and v denotes 1 to 6.

7. Liquid-crystalline medium according to claim 1, which additionally comprises one or more compounds of the formula III,

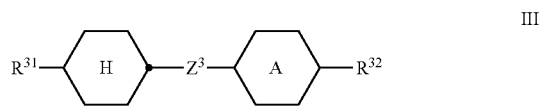

in which $R^{31}$ and $R^{32}$ each, independently of one another, denote a straight-chain alkyl, alkoxyalkyl or alkoxy radical having up to 12 C atoms, and

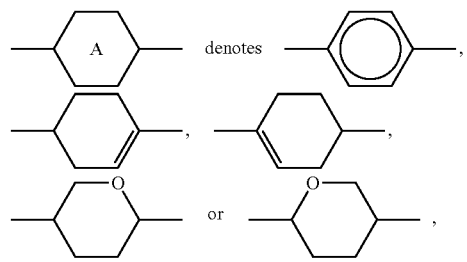

and $Z^3$ denotes a single bond, —$CH_2CH_2$—, —CH═CH—, —$CF_2$O—, —O$CF_2$—, —$CH_2$O—, —O$CH_2$—, —COO—, —OCO—, —$C_2F_4$—, —$C_4H_9$—, or —CF═CF—.

8. Liquid-crystalline medium according to claim 1, wherein the medium additionally comprises at least one compound of the formulae L-1 to L-11,

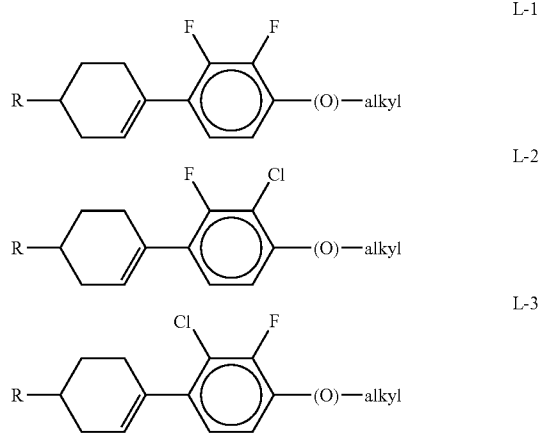

-continued

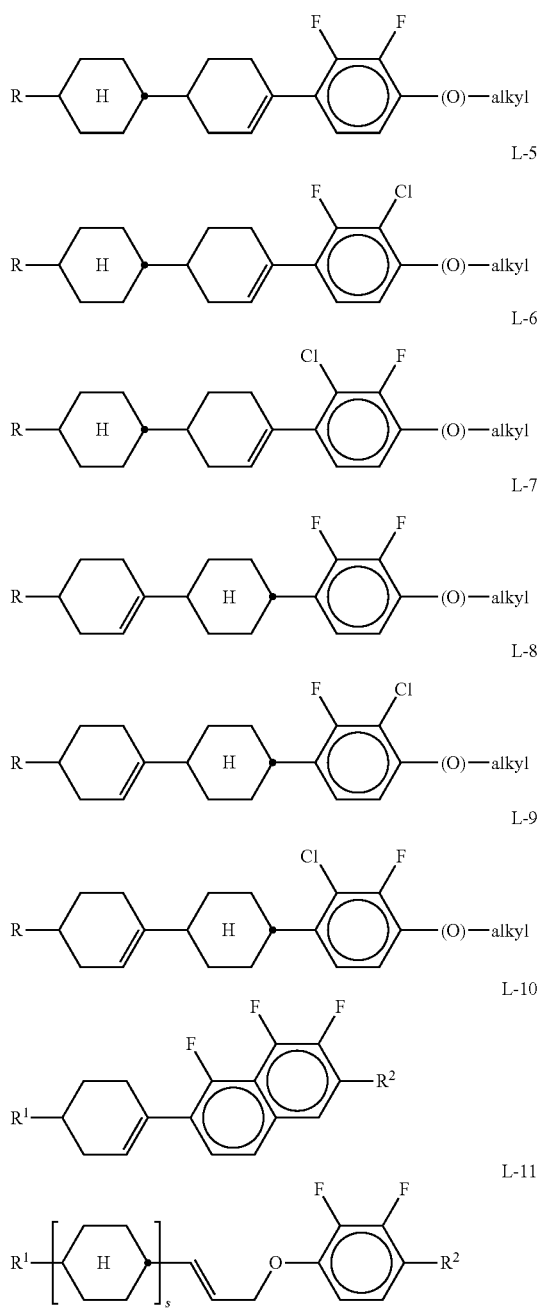

in which
R, $R^1$ and $R^2$ each, independently of one another, denote H, an alkyl radical having up to 15 C atoms which is unsubstituted, monosubstituted by CN or $CF_3$ or at least monosubstituted by halogen, where one or more $CH_2$ groups in these radicals are optionally replaced by —O—, —S—,

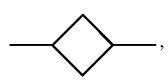

—C≡C—, —$CF_2$O—, —O$CF_2$—, —OC—O— or —O—CO— in such a way that O atoms are not linked directly to one another, alkyl denotes an alkyl radical having 1-6 C atoms,
(O)-alkyl denotes O-alkyl or alkyl, and
s denotes 1 or 2.

9. Liquid-crystalline medium according to claim 1, wherein the medium additionally comprises one or more terphenyls of the formulae T-1 to T-21,

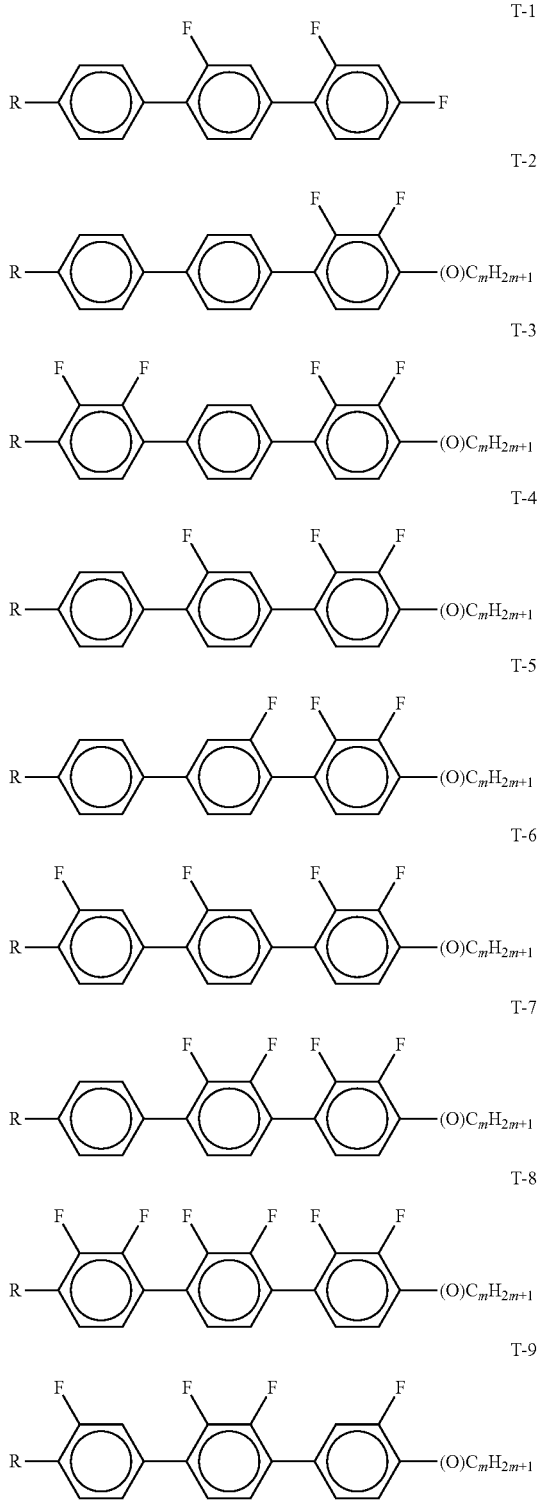

T-10 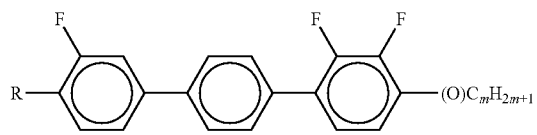
T-11 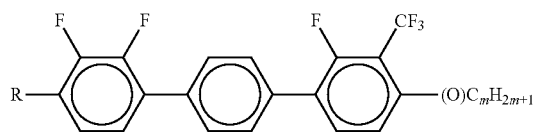
T-12 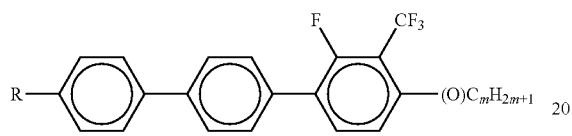
T-13 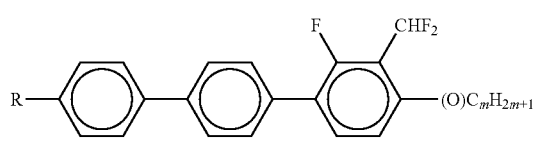
T-14 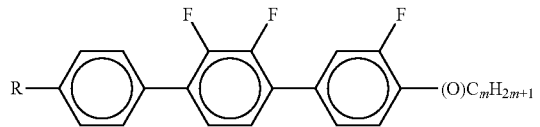
T-15 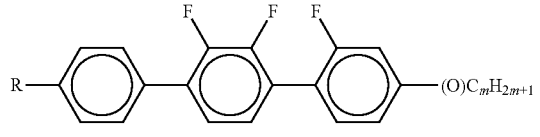
T-16 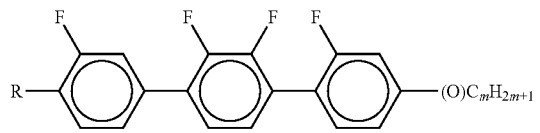
T-17 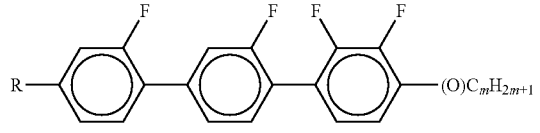
T-18 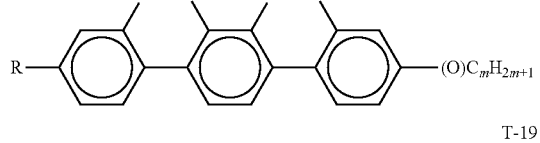
T-19 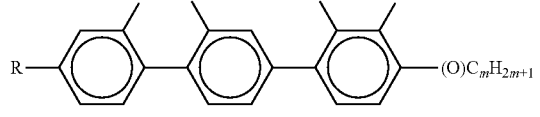
T-20 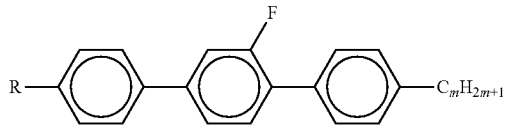
T-21 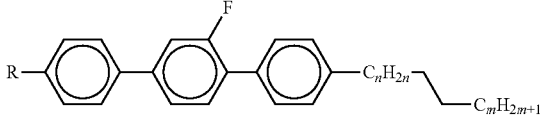
in which
R denotes a straight-chain alkyl or alkoxy radical having 1-7 C atoms,
$(O)C_mH_{2m+1}$ denotes $OC_mH_{2m+1}$ or $C_mH_{2m+1}$, and
m denotes 1-6.
10. Liquid-crystalline medium according to claim 1, wherein the medium additionally comprises one or more compounds of the formulae O-1 to O-17,
O-1 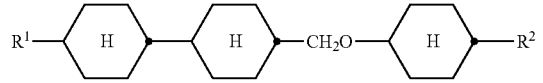
O-2 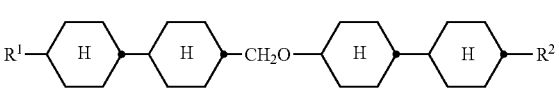
O-3 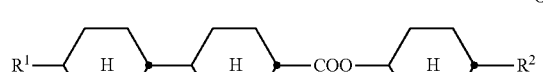
O-4 
O-5 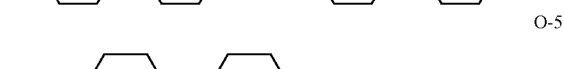
O-6 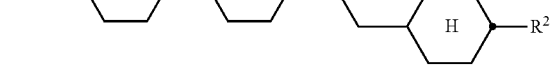
O-7 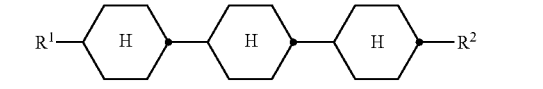
O-8 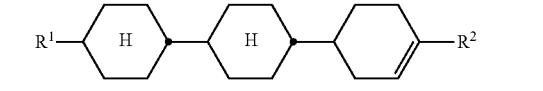
O-9 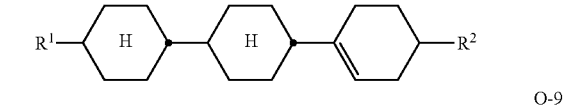

-continued

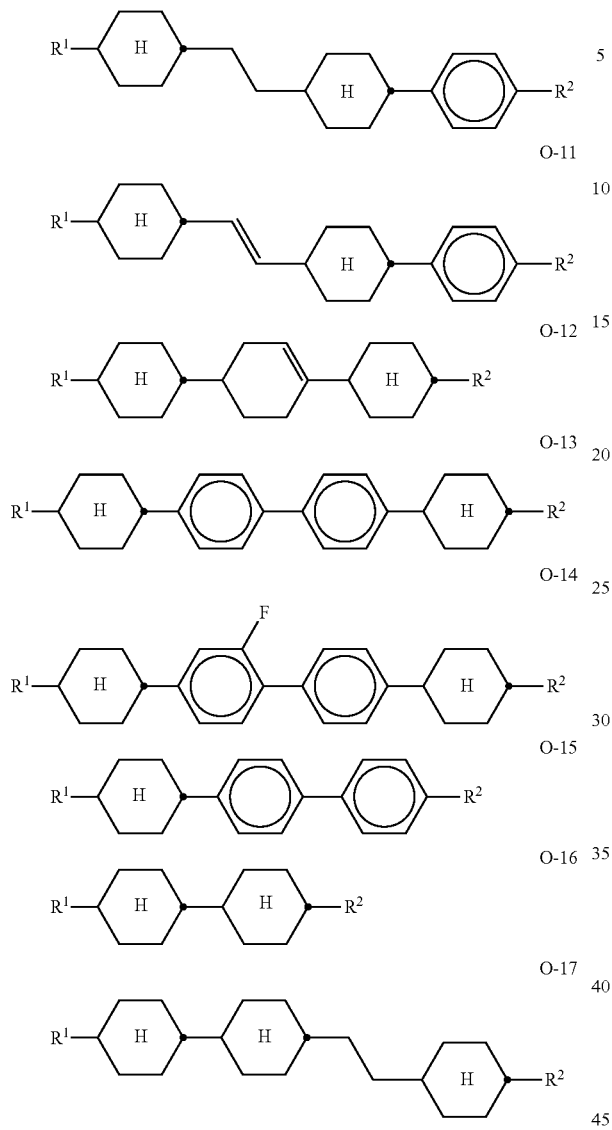

in which
R¹ and R² each, independently of one another, denote H, an alkyl radical having up to 15 C atoms which is unsubstituted, monosubstituted by CN or CF₃ or at least monosubstituted by halogen, where one or more CH₂ groups in these radicals are optionally replaced by —O—, —S—,

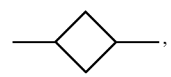

—C≡C—, —CF₂O—, —OCF₂—, —OC—O— or —O—CO— in such a way that O atoms are not linked directly to one another.

11. Liquid-crystalline medium according to claim 1, wherein the medium additionally contains one or more indane compounds of the formula In,

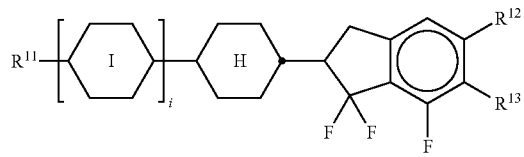

in which
R¹¹, R¹², R¹³ denote a straight-chain alkyl, alkoxy, alkoxyalkyl or alkenyl radical having 1-5 C atoms,
R¹² and R¹³ additionally also denote H or halogen,

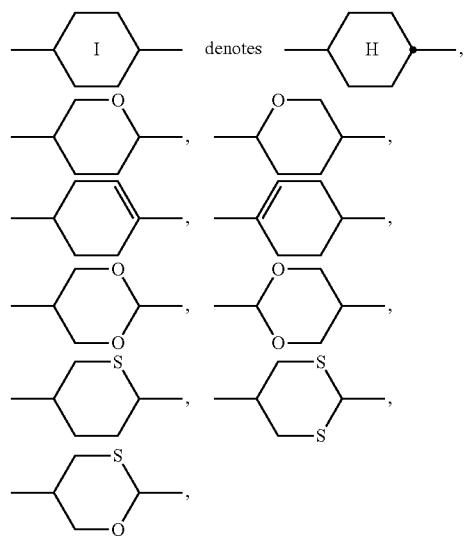

i denotes 0, 1 or 2.

12. Process for the preparation of a liquid-crystalline medium according to claim 1, comprising mixing at least one compound of the formula I with at least one polar liquid-crystalline compound, and optional with at least one polymerisable compound and optionally with one or more additives.

13. Electro-optical display having active-matrix addressing, which contains, as dielectric, a liquid-crystalline medium according to claim 1.

14. Electro-optical display according to claim 13, which is a VA, PSA or PS-VA display.

15. A compound selected from the group of the compounds of the formula I-2 to I-36

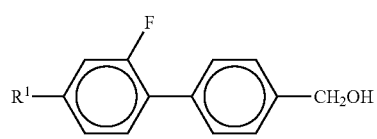

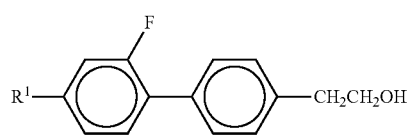

I-4
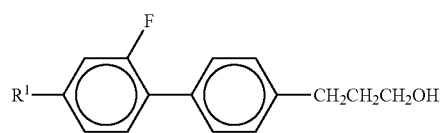
I-5
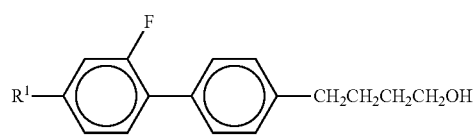
I-6
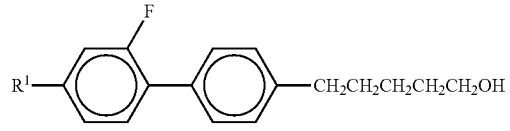
I-7
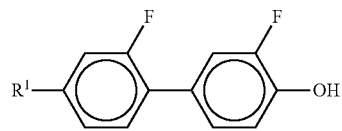
I-8
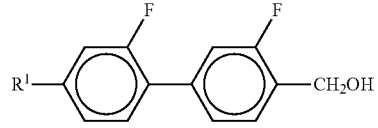
I-9
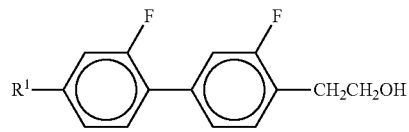
I-10
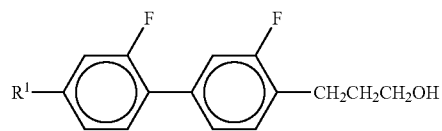
I-11
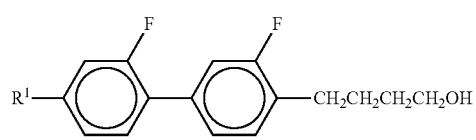
I-12
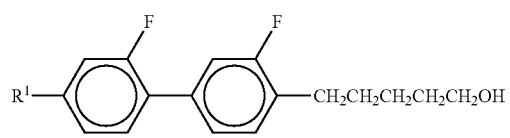
I-13
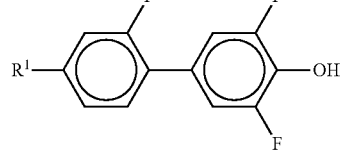
I-14
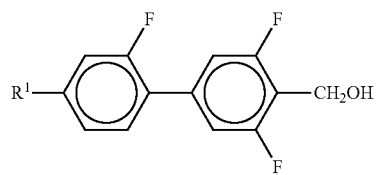
I-15
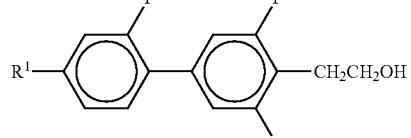
I-16
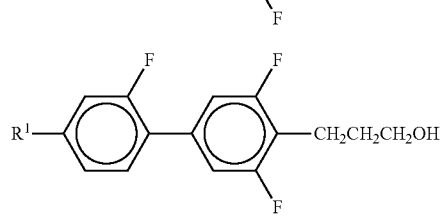
I-17
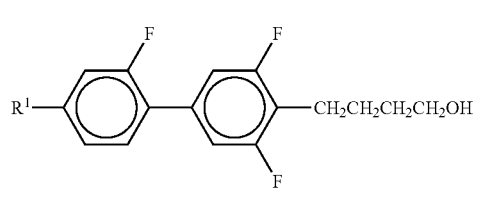
I-18
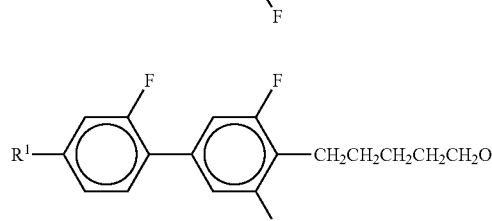
I-19
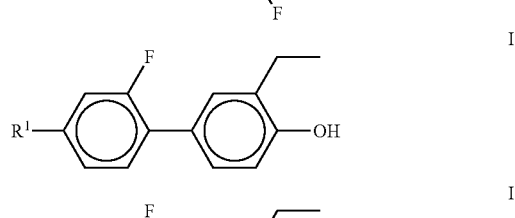
I-20
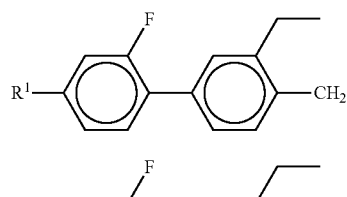
I-21
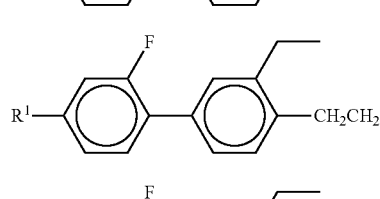
I-22
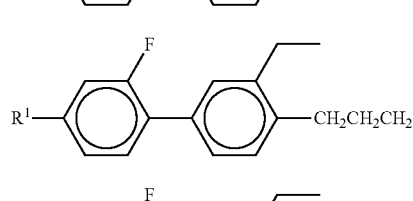
I-23
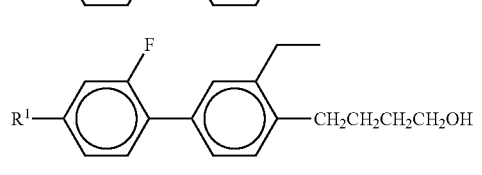

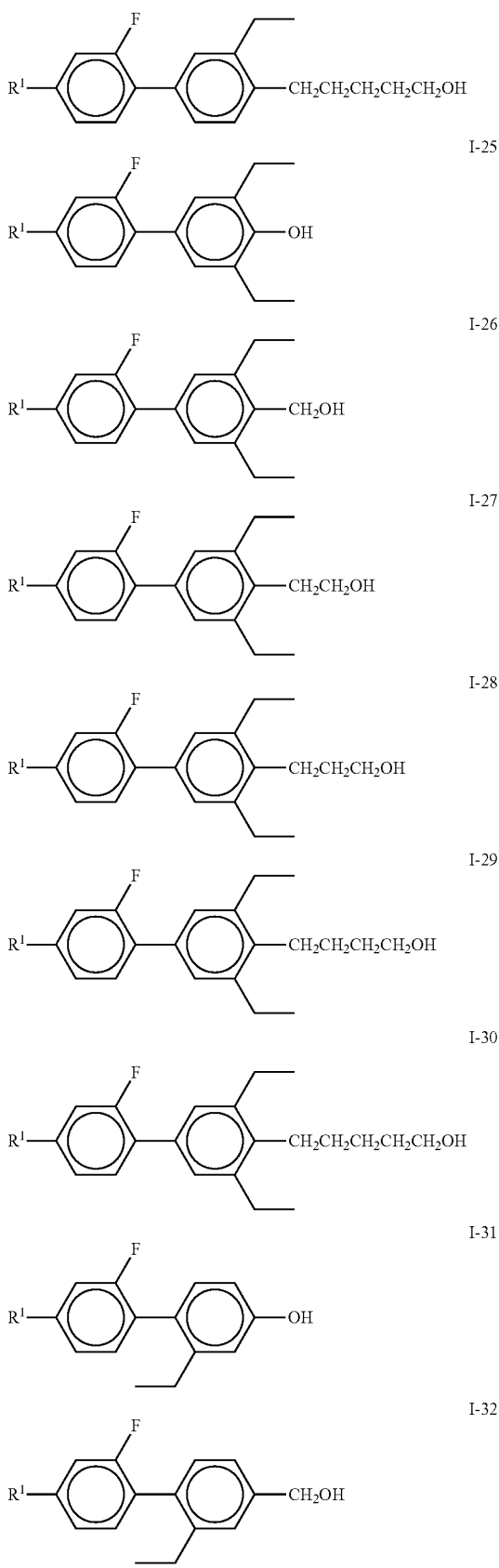

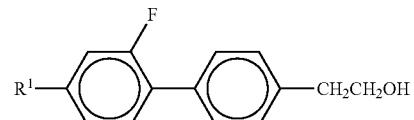

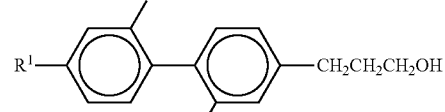

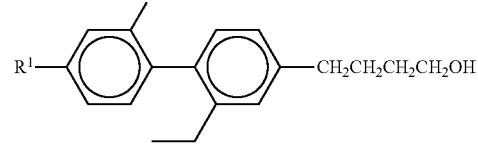

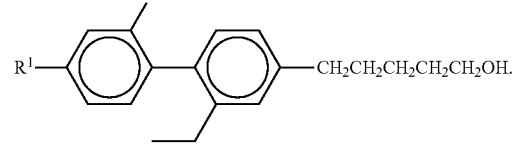

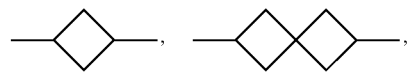

in which $R^1$ is an alkyl or alkoxy radical having 1 to 15 C atoms, where one or more $CH_2$ groups in these radicals are optionally replaced, independently of one another, by —C≡C—, —$CF_2$O —, —CH=CH —, —O—, —CO—O—, or —O—CO —in such a way that O atoms are not linked directly to one another, and in which one or more H atoms are optionally replaced by halogen.

16. An electro-optical display comprising a liquid-crystalline medium of claim 1.

17. An electro-optical display of claim 16 having a self-aligning VA mode.

18. Liquid-crystalline medium according to claim 1, wherein, in the compounds of formula I, $L^1$, $L^2$ and $L^3$, each independently of one another, denote F or alkyl with 1-5 carbon atoms.

19. Liquid-crystalline medium according to claim 4, wherein, in the compounds of formula M:

$R^{Ma}$ and $R^{Mb}$ each, independently of one another, denote P, P-Sp-, H, halogen, $SF_5$, $NO_2$, an alkyl, alkenyl or alkynyl group, where at least one of the radicals $R^{Ma}$ and $R^{Mb}$ denotes or contains a group P or P-Sp-, $A^{m1}$ and $A^{M2}$ each, independently of one another, denote an aromatic or alicyclic group having 4 to 25 ring C atoms, which may also encompass or contain fused rings, and which is optionally mono- or polysubstituted by L, and L denotes P, P-Sp-, H, OH, $CH_2OH$, halogen, $SF_5$, $NO_2$, an alkyl, alkenyl or alkynyl group.

20. Liquid-crystalline medium according to claim 4, wherein, in the compounds of formulae M1 to M41:

$P^1$, $P^2$ and $P^3$ each, independently of one another, denote an acrylate, methacrylate, fluoroacrylate, oxetane, vinyl, vinyloxy or epoxide group, $Sp^1$, $Sp^2$ and $Sp^3$ each, independently of one another, denote $-(CH_2)_{p1}-$, $-(CH_2)_{p1}-O-$, $-(CH_2)_{p1}-CO-O-$ or $-(CH_2)_{p1}-O-CO-O-$, in which p1 is an integer from 1 to 12, and where the linking to the adjacent ring in the last-mentioned groups takes place via the O atom, where, in addition, one or more of the radicals $P^1$-$Sp^1$-, $P^2$-$Sp^2$ and $P^3$-$Sp^3$- may denote $R^{aa}$, with the proviso that at least one of the radicals $P^1$-$Sp^1$-, $P^2$-$Sp^2$- and $P^3$-$Sp^3$- present does not denote $R^{aa}$, and $R^{aa}$ denotes a straight-chain or branched, optionally mono- or polyfluorinated alkyl, alkoxy, alkenyl, alkynyl, alkylcarbonyl, alkoxycarbonyl, alkylcarbonyloxy or alkoxycarbonyloxy having 1 to 12 C atoms, where the alkenyl and alkynyl radicals have at least two C atoms and the branched radicals have at least three C atoms.

\* \* \* \* \*